(12) United States Patent
Dolgoff

(10) Patent No.: US 7,688,347 B2
(45) Date of Patent: Mar. 30, 2010

(54) HIGH-EFFICIENCY DISPLAY SYSTEM UTILIZING AN OPTICAL ELEMENT TO RESHAPE LIGHT WITH COLOR AND BRIGHTNESS UNIFORMITY

(76) Inventor: Eugene Dolgoff, 139 Linden Ave., Westbury, NY (US) 11590

(*) Notice: Subject to any disclaimer, the term of this patent is extended or adjusted under 35 U.S.C. 154(b) by 2034 days.

(21) Appl. No.: 10/115,279

(22) Filed: Apr. 3, 2002

(65) Prior Publication Data
US 2003/0076423 A1    Apr. 24, 2003

Related U.S. Application Data

(60) Continuation of application No. 09/183,795, filed on Oct. 30, 1998, which is a continuation of application No. 08/963,016, filed on Nov. 3, 1997, now Pat. No. 5,900,982, which is a continuation-in-part of application No. 08/384,720, filed on Feb. 6, 1995, and a division of application No. 08/223,479, filed on Apr. 4, 1994, which is a continuation-in-part of application No. 07/659,596, filed on Feb. 21, 1991, now Pat. No. 5,300,942.

(51) Int. Cl.
H04N 13/00 (2006.01)
G02B 27/10 (2006.01)

(52) U.S. Cl. .................................. 348/44; 359/619
(58) Field of Classification Search ............... 348/44, 348/42, 40, 49, 51, 54, 88; 355/1; 362/554; 359/503, 640; 369/126; 358/146; 349/5; 385/133, 146; 345/146
See application file for complete search history.

(56) References Cited

U.S. PATENT DOCUMENTS 3,170,980 A * 2/1965 Pritchard .................. 385/133
3,832,029 A * 8/1974 Bryngdahl ................. 385/133
3,913,872 A * 10/1975 Weber ....................... 362/554
4,045,133 A * 8/1977 Carlson ........................ 355/1
4,686,519 A * 8/1987 Yoshida et al. ................ 345/88

(Continued)

Primary Examiner—Gims S Philippe
(74) Attorney, Agent, or Firm—Gerry J. Elman; Elman Technology Law, P.C.

(57) ABSTRACT

A light valve such as an active matrix LCD between crossed polarizers, utilizing, for instance, individual transistors to control each "pixel area" of the LCD and storage elements to store video signal data for each pixel, with optically shielded "dead spaces" between pixels to eliminate electric field crosstalk and non-information-bearing light bleed-through, is illuminated with a bright independent light source which creates a video image projected via specialized projection optics onto an internal or external screen without distortions, regardless of the angle of projection onto the screen. Use of heat sinks, IR reflective coatings, heat absorbing optics, optional fluid and a thermistor controlled pixel transistor bias voltage injection servo circuit stabilizes image performance, maintaining accurate color and contrast levels as the LCD changes temperature. In one embodiment of the invention, use of a multi-color LCD with a stepped cavity, producing different thicknesses of LCD for the different wavelengths that pass through it, allows a linear correspondence between the wavelengths passing through the LCD to produce true black, high contrast and CRT-like color rendition. A dichroic mirror arrangement is used to overlap differently colored pixels in the projected image. Use of striped mirrors duplicate pixels, where necessary, eliminating spaces between pixels, creating a continuous image with no apparent stripes or dots. A special venetian-blind type of screen is also disclosed and methods for using the system to view three-dimensional video are also explained.

73 Claims, 49 Drawing Sheets

U.S. PATENT DOCUMENTS

| | | | | |
|---|---|---|---|---|
| 4,744,615 A | * | 5/1988 | Fan et al. | 385/146 |
| 5,029,156 A | * | 7/1991 | Kuehnle | 369/126 |
| 5,059,013 A | * | 10/1991 | Jain | 359/503 |
| 5,303,084 A | * | 4/1994 | Pflibsen et al. | 359/503 |
| 5,602,679 A | * | 2/1997 | Dolgoff et al. | 359/640 |
| 5,625,738 A | * | 4/1997 | Magarill | 385/146 |
| 5,801,793 A | * | 9/1998 | Faris et al. | 349/5 |

* cited by examiner

FIG. 4
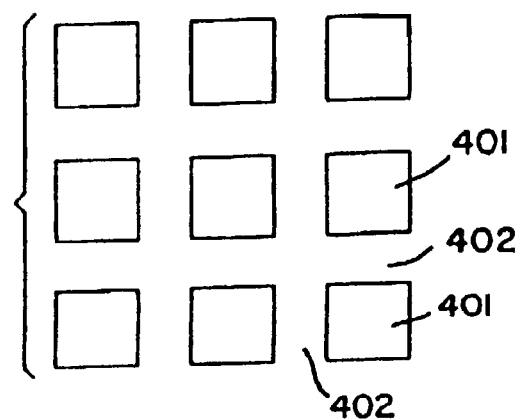
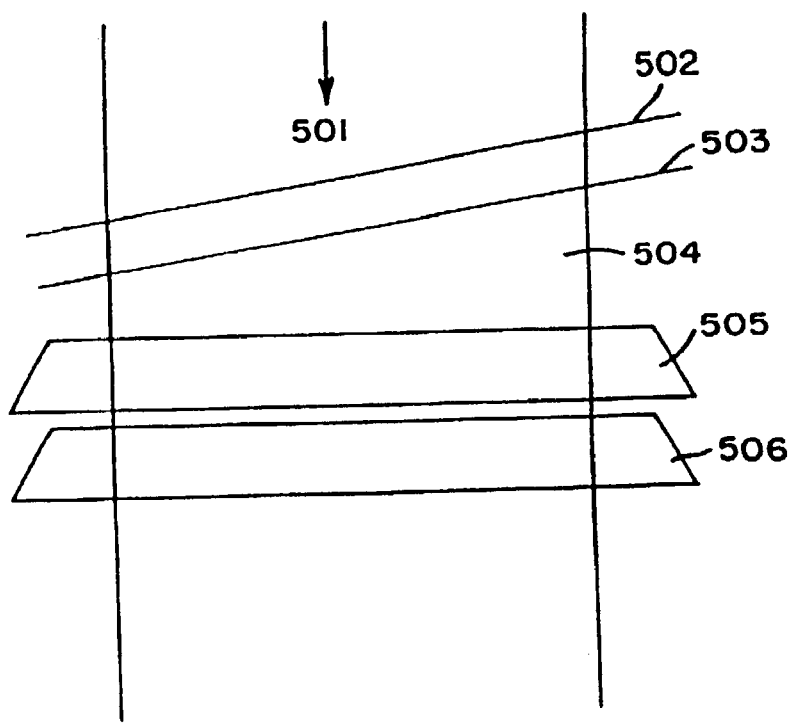
FIG. 5

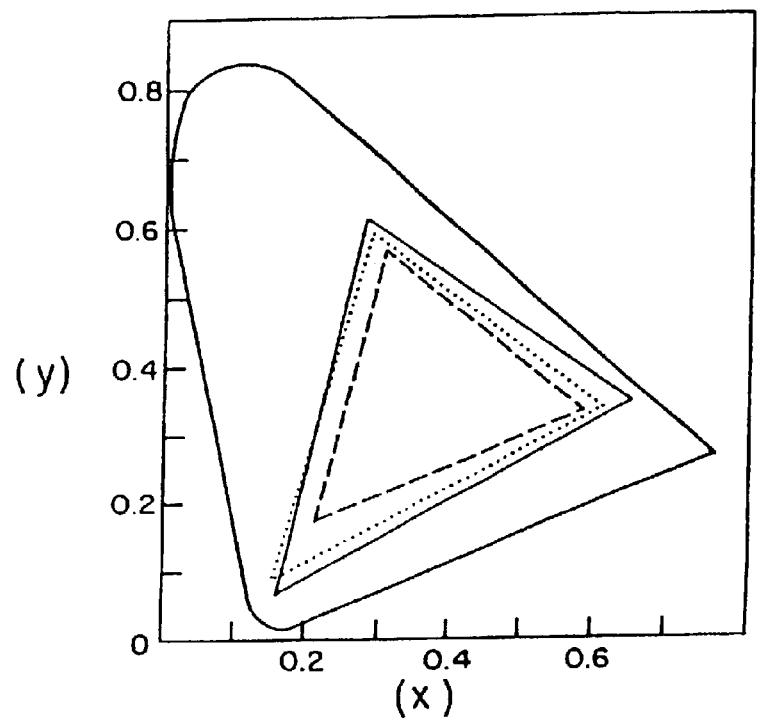
F I G. 13
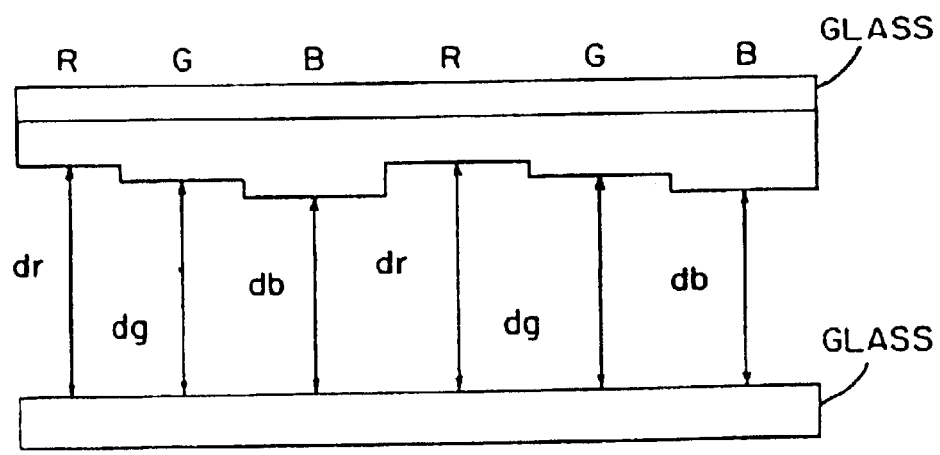
F I G. 12

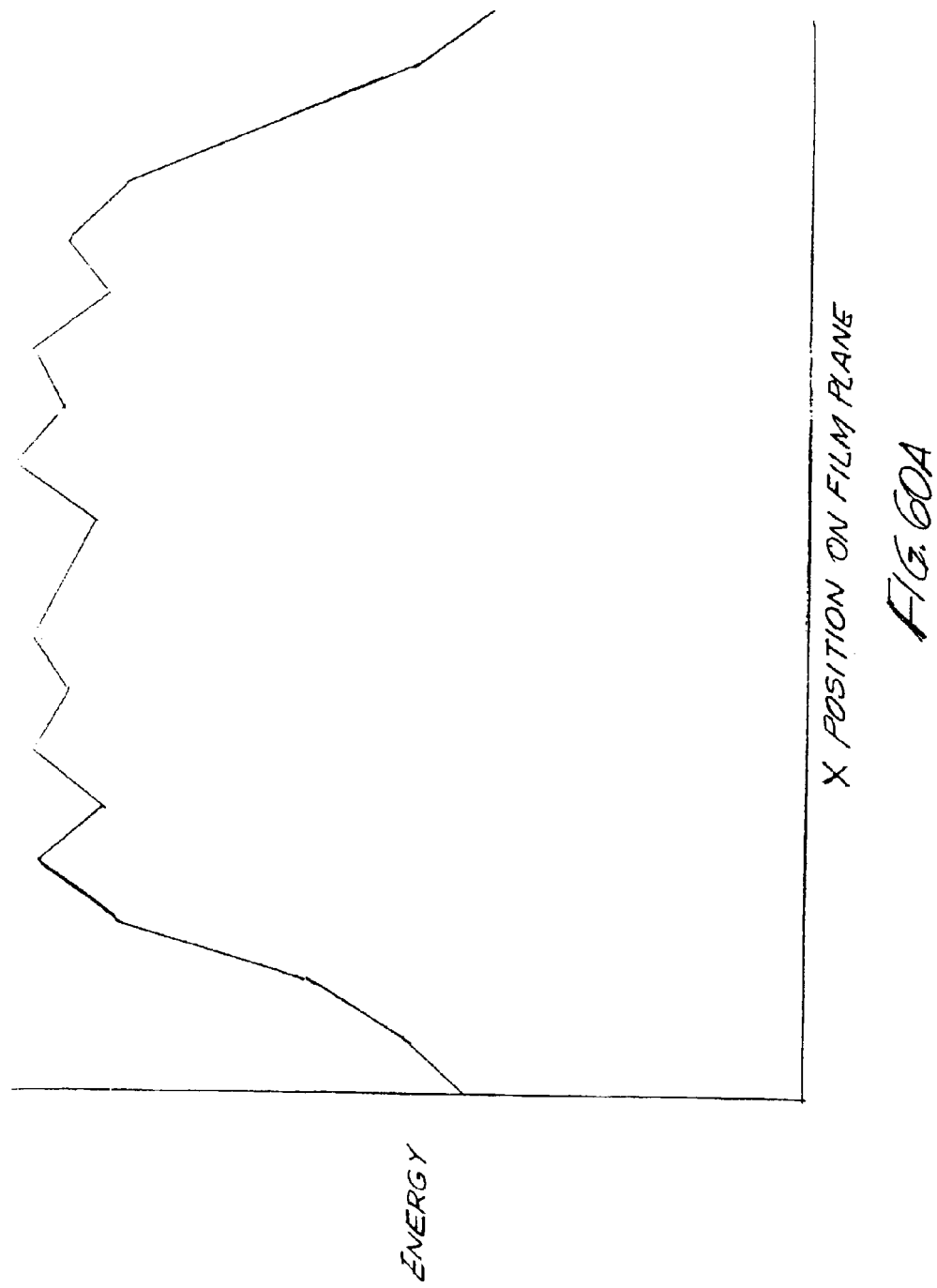

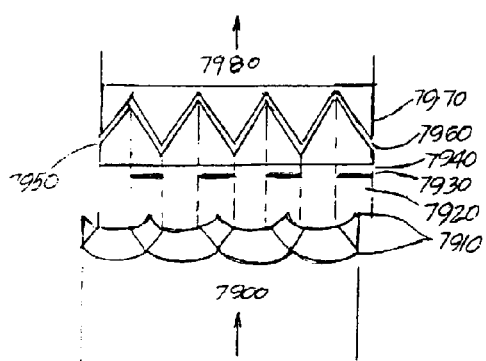
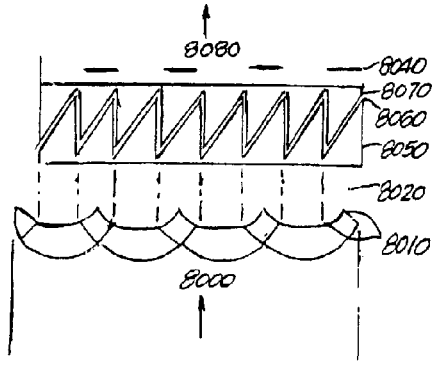
FIG 79
FIG. 80
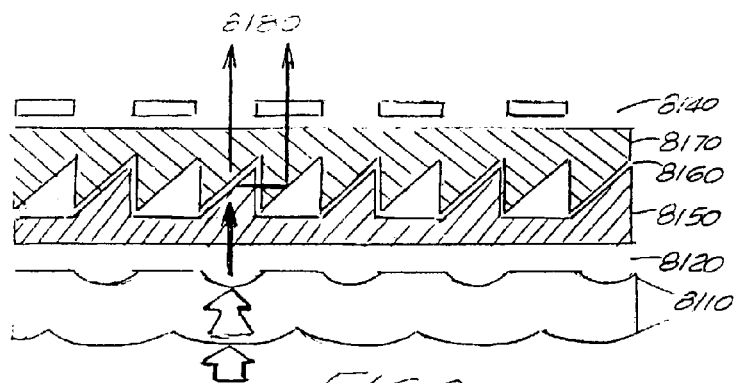
FIG. 81
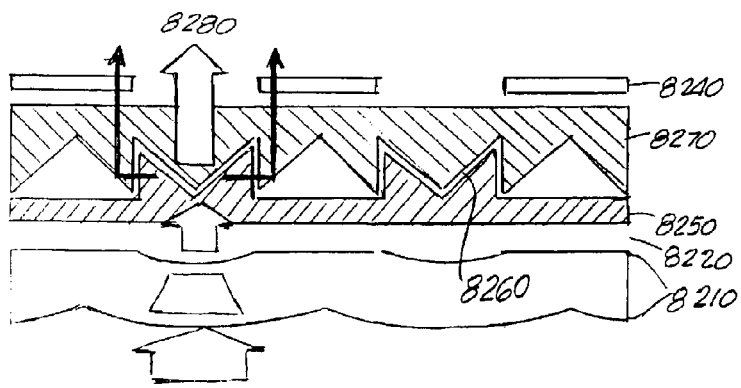
FIG. 82

HIGH-EFFICIENCY DISPLAY SYSTEM UTILIZING AN OPTICAL ELEMENT TO RESHAPE LIGHT WITH COLOR AND BRIGHTNESS UNIFORMITY

CROSS-REFERENCE TO RELATED APPLICATIONS

This is a continuation application of U.S. patent application Ser. No. 09/183,795, filed Oct. 30, 1998, which is a continuing application in the nature of a divisional of U.S. patent application Ser. No. 08/963,016, filed Nov. 3, 1997, now U.S. Pat. No. 5,900,982. U.S. Pat. No. 5,900,982 is a continuation-in-part of U.S. patent application Ser. No. 08/384,720, filed Feb. 6, 1995, and a divisional application of U.S. patent application Ser. No. 08/223,479, filed Apr. 4, 1994, which is a continuation-in-part of U.S. patent application Ser. No. 07/659,596, filed Feb. 21, 1991, now U.S. Pat. No. 5,300,942.

The inventor hereby incorporates by reference the disclosure of U.S. Pat. Nos. 5,012,274, 5,300,942, and 5,900,982, and the contents of the prosecution histories of each of the applications cited in the preceding paragraph, and pertinent disclosure of any other publications and patents of the present inventor.

FIELD OF THE INVENTION

The present invention relates generally to video and data display devices and more particularly to an improved video display system employing light valves such as an active matrix LCD in conjunction with novel projection optics.

BACKGROUND OF THE INVENTION

The mainstay of electronic imaging, since its beginning, has been the cathode ray tube (CRT) or kinescope. Although CRT technology has progressed over the years, several major drawbacks remain. Picture size is still limited, making group viewing difficult. CRT picture tubes larger than about 30" (measured diagonally) become impractical because of size, weight, expense and danger of implosion because of the high vacuum used. To achieve high brightness they use dangerously high voltages and may produce health hazards from x-rays and electromagnetic fields.

Image quality of CRT-based video displays may be degraded by color distortion, image shape distortions, color impurity from the influence of the earth's magnetic field, and color misconvergence. In addition, CRT displays are subject, particularly when viewed at close range, to visual artifacts such as scanning lines and discrete phosphor dots or stripes, which are inherent in such TV displays. These visual artifacts provide a poorer image quality than images in movie theaters.

Research has been continuing on for many years to develop other types of light emissive displays which would overcome some of these drawbacks. Plasma, electroluminescent (EL) and cold cathode phosphor displays are among the most promising candidates, although they have not proved themselves to be practical. Furthermore, it is highly questionable whether these other emissive displays, if and when successful, would provide any advances over current CRT brightness or size in practical applications. "Pocket Tvs" with a picture size of 2"3" are constructed today using liquid crystal displays which are addressed via electronic multiplexing or active matrix addressing. Creating a large picture for direct viewing however poses many problems which have heretofore not been overcome. Simple multiplexing cannot produce a satisfactory image because of cross-talk. An active matrix relieves the cross-talk problems, but has so many more production steps and so many switching and storage elements that must be deposited over a large surface area that production of large, defect-free active matrix displays for direct viewing has not been possible and may never be economically feasible for very large displays.

Demand for large video imaging systems and for thin profile or "flat screen" imaging systems, both large and small, has increased significantly in recent years and is expected to increase dramatically with the advent of high definition television broadcasts. "Projection televisions" have been developed and commercialized in recent years. Unfortunately, such projection display devices have exacerbated many of the problems associated with earlier video display systems and have created new problems. Projection televisions are more expensive than standard direct-view televisions and are more cumbersome, heavier, and larger so that portability is impractical. Two types of projection television systems have become popular: one using three CRTs with projection lenses and the other using an oil film scanned by an electron beam.

The CRT-based projection system remains relatively dim, requiring a dimly-lit viewing environment and a costly special screen which provides a very limited viewing angle. The three CRTs produce images in the primary colors, blue, green, and red and are driven with higher anode voltage than conventional systems to obtain as much brightness out of them as possible. The higher anode voltage lowers tube life and increases the radiation hazards and other problems associated with high voltage. The three tubes also increase the danger of tube implosion. The standard oil-based system, referred to as an Eidophor, has three "scanned oil elements" which have a relatively short life and use external light sources. In either system, all three color images utilizing three sets of optics must be precisely converged onto the viewing screen, in addition to requiring adjustments of hue, saturation, vertical and horizontal size and linearity, and minimization of pincushion and barrel distortion. Proper alignment in either system is therefore beyond the abilities of the average person. Proper convergence is not easily achieved and often requires up to a half hour of additional set-up time because of the curvature of the lenses and variations in the performance of the circuits in either system. If the projector or screen is moved, the convergence procedure must be repeated.

Experimentation has also been performed on laser systems which scan out an image on a viewing screen in the same way an electron beam scans the image onto the face of a CRT. The laser systems developed thus far are much too large to be portable, very complex to use and maintain, extremely expensive, potentially dangerous and have proven too dim for large images.

Many attempts have been made to solve the above-mentioned problems, resulting in experimentation on several novel "light valve" based systems. This type of system uses an external light source which can theoretically be as bright as desired, with a "light valve" to modulate the light carrying the picture information. The research and experimentation to develop a workable light valve system has been primarily directed to using different optical, electronic, physical and other effects and finding or producing various materials to accomplish the desired results. The various light-valve system attempts have mainly utilized crystals (such as quartz, Potassium Di-Hydrogen Phosphate, Lithium Niobate, Barium Strontium Niobate, Yttrium, Aluminum, Garnet and Chromium Oxide), liquids (such as Nitro Benzene) or liquid crystals (of the smectic or nematic type or a suspension of particles such as iodoquinine sulphate in a liquid carrier) or other similar materials to take advantage of one or more optical effects including electro-optical effects, such as creating a rotated plane of polarization or altering the index of refraction of the material due to an applied electric field, magneto-optical effects using an applied magnetic field, electro-striction effects, piezo-optical effects, electrostatic particle orientation, photoconductivity, acousto-optical effects, photochromic effects and laser-scan-induced secondary electron emission. Except for liquid crystal light valves, such light valves proved impossible to manufacture economically and with a sufficiently large aperture and have often been toxic, dangerous, and inconsistent in production quality.

In all light valves, different areas must be supplied different information or "addressed," so that a different amount of light emerges through each area, adding up to a complete picture across the total beam of light. Techniques for addressing different picture elements (or "pixels") of a light valve have included methods for deflecting a laser or electron beam to that area or the use of a tiny criss-cross of electrically conductive paths, i.e., a matrix, deposited on or adjacent to the material to be addressed in order to activate that area of the matrix. In scanning beam systems, problems have included outgassing and erosion of material. The electrical matrix system has proved difficult to engineer, requiring deposition with extremely high precision of a transparent material having good conductivity characteristics. Further, such matrices must be driven by extremely fast switching circuits, which are impractical at the high voltages required to activate a given area of most materials.

The most frequently used system for addressing small areas is often referred to as electronic multiplexing. Electronic multiplexing works well with only low voltage-requiring materials such as liquid crystals. With this method, all pixel addresses are x and y coordinates on the conductive grid. To activate a given pixel area a specific amount, different voltages must be applied to the x and y conductors so that, where they meet, they together exceed a threshold voltage and modulate the area. A major drawback to such multiplexing is cross-talk, where surrounding areas are affected by the electric field, causing false data to influence surrounding pixels, reducing contrast and resolution, as well as color saturation and accuracy. The cross-talk problem increases when resolution increases because liquid crystal materials respond fairly linearly to applied voltage. Since all pixels are interconnected within the same system, all pixels are given partial voltage and are, thus, partially activated when any one pixel is addressed. Non-linear materials can be added to the liquid crystal mix, but this still doesn't allow for more than about 160 lines of resolution before cross-talk significantly degrades the image.

An "active matrix" light valve in which all pixels from the matrix are selectively disconnected except for those pixels which are addressed at any given time eliminates the cross-talk problem, regardless of the number of pixels or lines in a display. Recently, active matrix displays have been made utilizing transistors, diodes, or an ionizing gas as the switching element to disconnect the pixels.

Since liquid crystal light valves have very little persistence and one pixel or line of pixels is activated at a time, substantially less light is projected to the screen to be ultimately viewed since all pixels are "off" most of the time. This characteristic wastes light, produces a dimmer image with poorer contrast and generates more heat because of the brighter source necessary to compensate for the dim image. High refresh rates are impractical because they would require faster switching times and faster responding material.

Active matrix displays, however, also utilize a storage element, such as a capacitor, connected to each pixel, which allows each pixel to retain the proper charge, and thus, the proper transmissivity after the pixel has been addressed and disconnected from the system. Thus, each pixel remains "on" the correct amount all the time. This increases light throughput and eliminates flicker.

If high-wattage light sources are used in order to achieve very bright displays, heat sensitivity can cause a decrease in contrast and color fidelity. Absorption of high intensity light by color filters and polarizers (if used), even if little or no infrared light is present, results in heating of these elements which can also degrade image quality and may even damage the light valve. Use of fan cooling causes objectionable noise, especially in quiet environments when source volume is kept low.

Another inherent problem of light valve projection systems relates to the fact that each pixel of the frame is surrounded by an opaque border that contains addressing circuitry or physical structure. This results in visibly discrete pixels and contributes an objectionable "graininess" to the image that become progressively more annoying when viewed at close distance or on large screens. The problem is amplified if a single full-color light valve is used in which the individual red, green, and blue color elements of each pixel are not converged or blended and are visible to the viewer.

Consequently, projection by means of a small light valve provides the most practical and economical way to produce a large, bright image. Unfortunately, such light valve projectors have, up to the present, exhibited several shortcomings which fall generally into at least four broad categories, namely:

1) light valve restrictions;
2) light source limitations;
3) optical system inefficiencies; and
4) screen performance weaknesses.

These problems must be addressed to allow for the successful production of acceptable quality, practical display systems, capable of large projection imagery and display of small or large images from a device with a "thin profile."

To address these and other problems associated with prior art video display systems, it is an object of the present invention to provide an adjustable size video image which can be very large, yet possesses high quality and sufficient brightness to be visible from wide viewing angles without distortions, in a normally lit room as well as in environments with high ambient light.

Furthermore, an object of the invention is to create a video display system which utilizes a light valve such as a specially constructed LCD light valve, an independent light source with a long life, high brightness, average luminance, and color temperature, and novel optics, providing for high light efficiency for front or rear projection and which operates without excess heat or fan noise.

Another object of the invention is to produce such a system with high resolution and contrast (eliminating the appearance of stripes, pixels, or lines), with highly accurate color rendition (equal to or better than that of a CRT).

An additional object of the invention is to produce a display that reduces eye strain by the elimination of flicker and glare and by the broadening of color peaks.

A further object of the invention is to produce a small, lightweight, portable system, having a long maintenance-free operating life, which is operable in conjunction with or without a special screen and can be mass-produced relatively inexpensively.

Yet another object of the invention is to produce a system which requires no convergence or other difficult adjustments prior to viewing.

Still another object of the present invention is to produce a system with greatly reduced radiation and hazard of tube implosion and operates with relatively low voltage.

An additional object of the invention is to produce a system which does not require a special screen, can be easily projected onto a wall or ceiling, and can be viewed comfortably at relatively wide angles.

A further objective of the invention is to produce such a system capable of three-dimensional projection.

Additional objects of the invention include the creation of a system which will overcome drawbacks associated with CRTs in terms of weight, bulk, high voltage, radiation, implosion hazard and convergence difficulty in 3-CRT projection systems.

Further objects will include increasing image contrast, color reproducibility, resolution and yield while reducing color pixel visibility, flicker, heat sensitivity, image artifacts, system cooling noise and bleed-through of non-image bearing light, while decreasing the cost and complexity of light valve systems.

Additional objects of the invention involve creating a system to overcome and improve upon light source limitations by increasing brightness efficiency, average luminance and color temperature, while lengthening bulb life and reducing the weight and bulk of the power supply.

Yet additional objects of the invention involve creating a system with improved light collection, decreased light losses due to color selection and polarization, decreased light valve aperture ratio losses and other non-image light waste.

Further objects of the invention involve creating a system which involves improving performance by use of particular screen materials with reduced light absorption, while reducing lenticular-lens-pattern image degradation, off-axis projection distortion and off-axis brightness fall-off, while reducing the effect of glare and ambient light to image visibility.

Moreover, it is an object of the invention to create a system which minimizes and virtually eliminates the wasted space of projection distance and enables three-dimensional projection.

Other objects will become evident from the disclosure.

SUMMARY OF TH INVENTION

These and other objects of the invention which will become apparent hereafter are achieved by "A HIGH EFFICIENCY LIGHT VALVE PROJECTION SYSTEM" employing a light valve, such as a liquid crystal display (LCD) device, for the formation of an image utilizing an "active matrix" for electronically addressing and activating each of the liquid crystal elements in the matrix. The matrix is "active" in that a separate transistor or other suitable material is located adjacent to each picture element or "pixel" to control each pixel and a storage element, such as a capacitor, which is employed to store the respective pixel video signal. The system further comprises a direct projection optics arrangement which includes a light source for illuminating the light valve, optics which collimate light from the source and improve light throughput efficiency and quality of the projected image and a lens system for projecting and focusing an image from the light valve onto a viewing surface.

An important aspect of one embodiment of the invention is the use of a dichroic mirror system to superpose color pixel triads from a single, multicolored LCD to form full-colored pixels with spaces between them.

Another aspect of one embodiment of the invention relates to the filling of spaces between pixels. These spaces may be filled using a four-mirror system, in which a first striped mirror pair duplicates each pixel and the image is shifted horizontally into the spaces which previously existed between pixels. A second mirror pair duplicates the newly created rows of pixels and shifts the original and the duplicated pixel images vertically to fill the remaining spaces between pixels.

Other methods are described for the filling of spaces between adjacent pixels through the use of an expanding lens array and a collimating lens or a second collimating lens array to expand and collimate individual images of the pixels.

The invention will be better understood by the Detailed Description of the Preferred Embodiment in conjunction with the appended drawings, of which:

BRIEF DESCRIPTION OF THE DRAWINGS

FIG. 4 is a schematic view of a projected image of superposed "full-color pixels";

FIG. 5 is a schematic view of a four mirror system depicting a method of filling in spaces between adjacent pixels;

FIG. 12 is a magnified schematic view of a "stepped thickness" LCD cavity showing the different thicknesses of LCD through which the red, green, and blue lights traverse;

FIG. 13 is a CIE chromaticity diagram comparing color ranges of a CRT display, a conventional color LCD display with a fixed cavity thickness and a "stepped thickness" LCD cavity in accordance with the present invention;

FIGS. 60A and 60B depict plots of light intensity in the X and Y directions of a sample system on the screen obtained with the arrangement of FIG. 59.

FIG. 79 depicts another type of "Fresnel MacNeille Polarizer";

FIG. 80 depicts yet another type of "Fresnel MacNeille Polarizer";

FIG. 81 depicts still another type of "Fresnel MacNeille Polarizer";

FIG. 82 depicts a further another type of "Fresnel MacNeille Polarizer";

DETAILED DESCRIPTION OF THE PREFERRED AND ALTERNATE EMBODIMENTS

The present invention is directed to A HIGH EFFICIENCY LIGHT VALVE PROJECTION SYSTEM. This overall system was devised to overcome the problems of video display systems and to meet the objectives delineated in the "Background of the Invention" section.

The most promising technology available to circumvent CRT problems is light valve technology. This technology uses an external light source and a "light valve," which modulates the light source, imposing image or data information on the light beam, so that the beam can be projected onto a viewing surface. Utilizing the same strategy as in a CRT projection system, a light valve projection system can be constructed to produce a brighter image than a CRT projection system. Such a system could also be produced to display black and white, monochromatic, or full-color images.

Of all known light valve video display systems, the one which presents the greatest potential for solving the problems associated with CRTs is the LCD with a conductive matrix for addressing, utilized in transmissive or reflective mode, taking advantage of the polarization/rotation, birefringence, or scattering capabilities of the liquid crystals. Various changes must however be made to current video display designs which use electronic multiplexing to eliminate the current problems. Although LCD technology is preferred at this time, most of the present invention is applicable to light valve technology in general and is to be interpreted with that broader view in mind.

Figure 1:
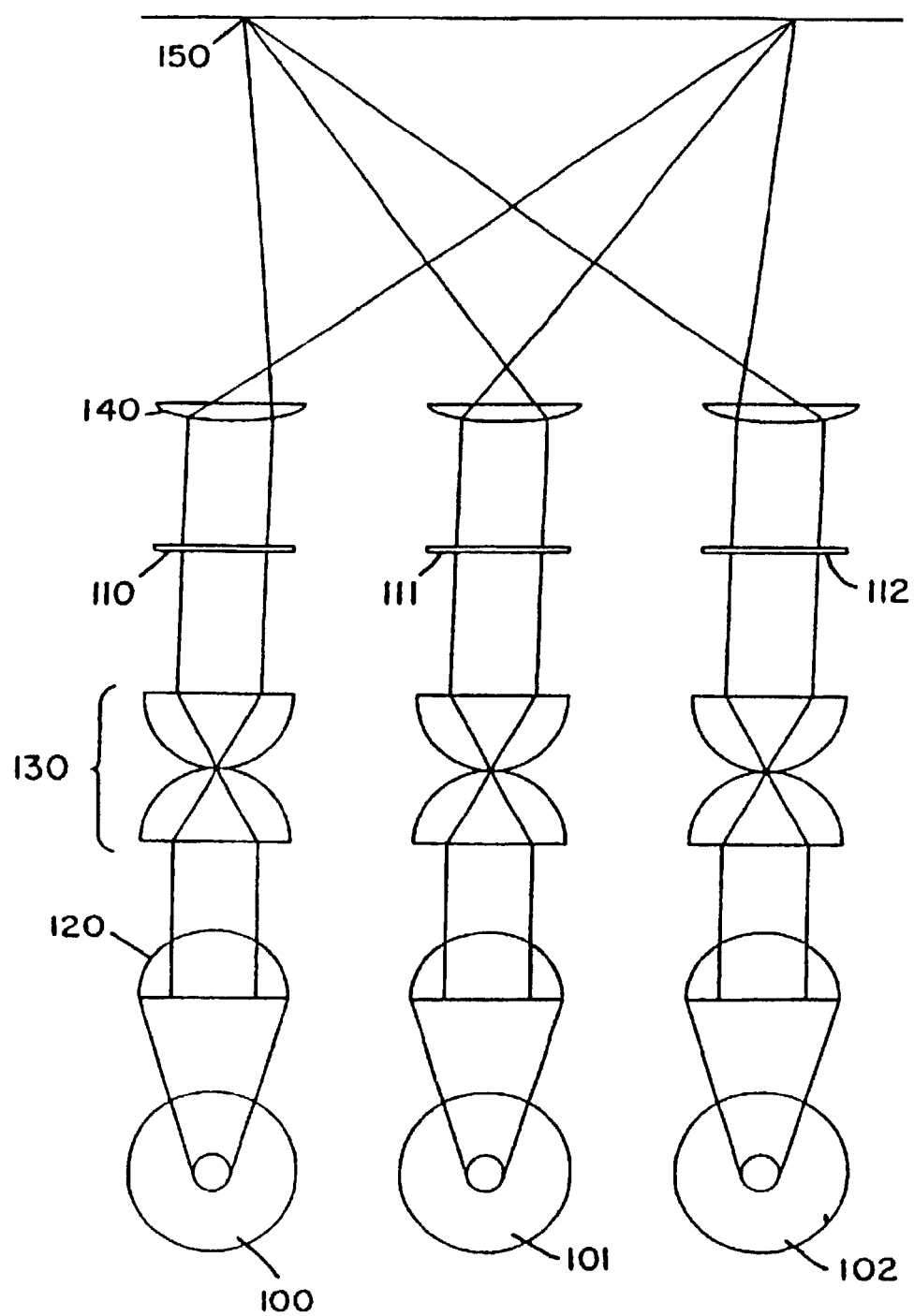
FIG. 1 is a schematic view of the invention depicting three LCDs projecting their image onto one common screen.
Figure 2:
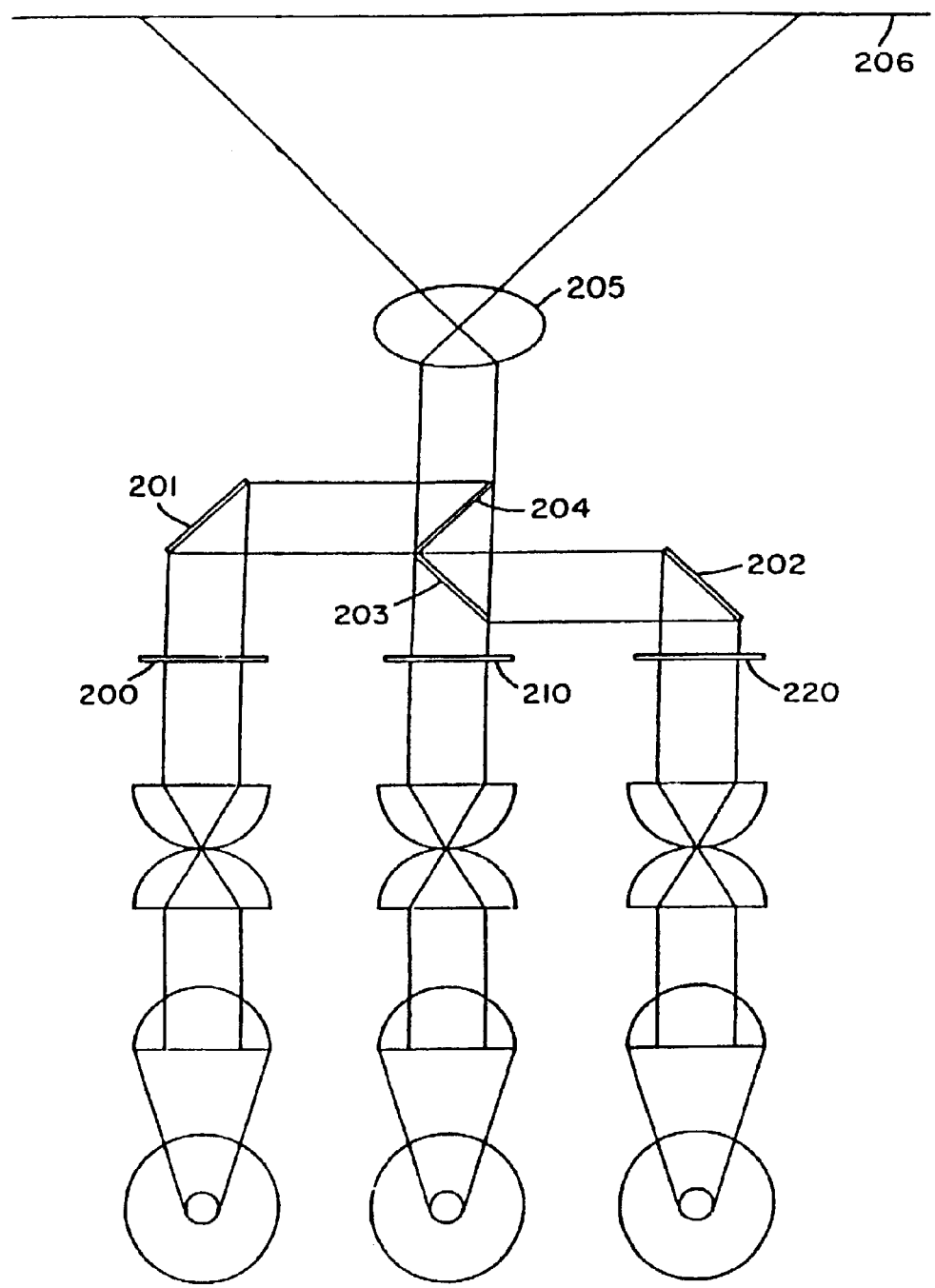
FIG. 2 is a schematic view of a modified embodiment of the present invention in which the images of three LCDs are internally superposed and projected onto a common screen employing one set of projection optics.

FIG. 1 shows three light valves, one displaying red 110, one green 111 and one blue 112 picture data, each light valve illuminated with light of the appropriate color (100, 101, 102). The red light from source 100 is collected by condenser 120, collimated by collimating optics 130 and projected by projection optics 140 which focuses a red image on screen 150. Similarly, the green and blue images are projected and made to converge on the screen, forming a full-color image. The disadvantage of this full-color system, however, is that adjustments must be made to the optics to converge the images whenever the projector or screen is moved. The need for convergence is eliminated in the present invention by the use of dichroic mirrors and a single projection lens as schematically shown in FIG. 2. Red image information from light valve 200 reflects off front-surface mirror 201 to dichroic mirror 204 which reflects red light but passes blue and green light. Blue image information from LCD 220 reflects off front surface mirror 202 and then off dichroic mirror 203, which reflects blue light but permits green light to pass and then passes through dichroic mirror 204. A totally registered full-color image is thus projected by projection optics 205 onto screen 206. Convergence is always perfect, regardless of repositioning of the projector or screen. The same invention can be applied to making a CRT projector alleviate convergence problems.

If a picture is to be a mosaic of red, blue and green pixels, each pixel must acquire a precise amount of current to reproduce the brightness of each picture element's originally broadcast brightness, as well as its color rendition. Although present LCD TV displays using electronic multiplexing produce a satisfactory small image, when such images are projected to a large picture, the transmitted light never reaches zero, causing low contrast. Additionally, with electronic multiplexing, cross-talk and electronic "bleed-through" to neighboring pixels reduces resolution and color fidelity. Furthermore, light is wasted and the picture appears dim with each pixel being turned on for only part of a scanning field. The image cannot be refreshed sufficiently and so flicker, as well as brightness efficiency, is dependent on the persistence of the LCD, which is not adjustable.

To solve the above problems, applicant's system can include a light valve in which the data used to address each pixel is stored, causing that pixel of the light valve to remain activated the desired amount of time until new data is received, dictating a different value for that pixel. The data may be stored by various means, but preferably in a capacitor which is disconnected from the charging circuit immediately after it is charged so as to remove the path for capacitive discharge.

Network analysis shows that when a given pixel is addressed through its X and Y conductors, one-third of its addressing voltage will also appear across other pixels. Since liquid crystal materials are fairly linear, this results in partial activation of incorrect pixels with false data. This can be alleviated by adding means to restrict the liquid crystal from being activated by increasing the threshold voltage of the liquid crystal, making its response to voltage non-linear, or by adding a switching mechanism to disconnect the pixel from the circuit until it is to be addressed. The preferred way to accomplish this is by adding a "switch" to each pixel, creating what is known as an "active matrix" addressing system.

Figure 18:
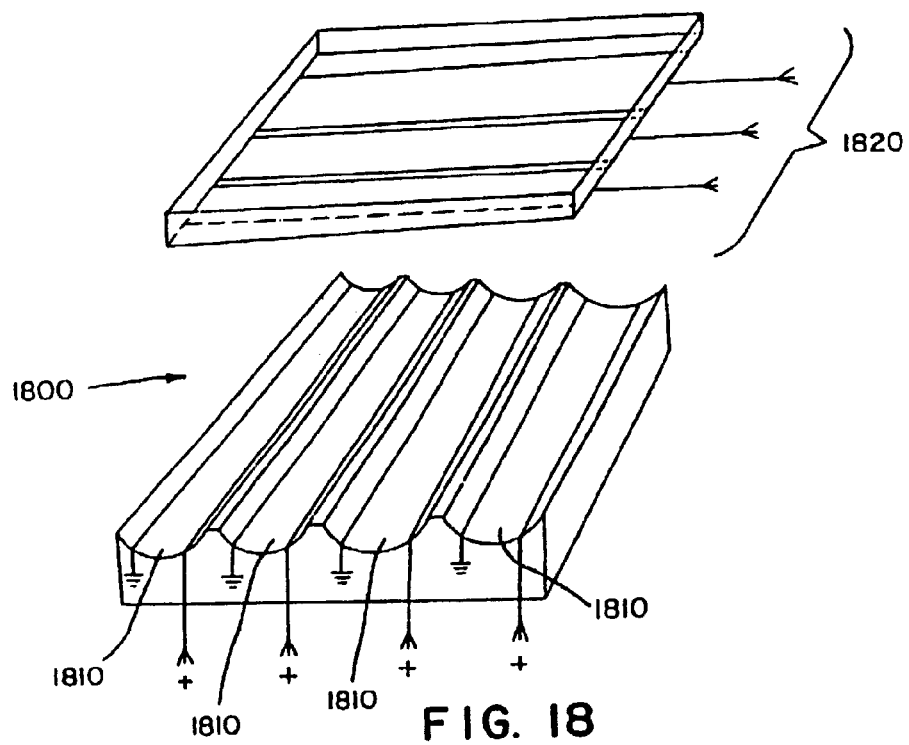
FIG. 18 is a schematic view of an active matrix liquid crystal display which utilizes a gas as a switching element to disconnect pixels from the circuit.

For instance, as shown in FIG. 18, an X-Y matrix of pixels made of transparent conductive material, such as indium tin oxide, is coated on the inner faces of a glass container which is filled with liquid crystal material 1800. Each pixel in a given horizontal row on one face is put in contact with a gas such as helium in a reservoir 1810 which requires a threshold voltage to ionize it and create a path for current flow to the pixel electrodes in the row. The corresponding pixel electrodes 1820 on the opposite glass plate are connected, for instance, to video signal inputs along vertical lines. When a threshold voltage is reached at which the gas for a given row on the first glass plate becomes ionized, the video signals applied in vertical columns to the corresponding pixel electrodes on the opposite glass plate charge those pixel electrodes, the liquid crystal material between the plates acting as a dielectric to form a capacitor. Immediately thereafter, removal of the threshold voltage necessary to ionize the gas leaves the pixel electrode capacitors along the horizontal row charged the required amount to maintain the polarization rotation through the liquid crystal material along that row until new data is available to replace the data already stored.

Alternately, an "active matrix" can be created by the deposition of a thin film transistor next to each pixel and by using a storage element at each pixel. Each transistor receives a gate signal, turning it on and allowing the conduction of a video signal voltage to the pixel associated with the transistor that is turned on. When the transistor is switched off (by removing the gate signal), the pixel electrodes with liquid crystal material between them act as a capacitor storing the charge and maintaining the state of activation of the liquid crystal material until changed by a new signal. An additional capacitor can be added to maintain the charge if the liquid crystal material has too much charge leakage.

This way, each pixel can be addressed, turned on (to transmit or reflect light) and will remain on until data for the next frame is presented. With this system, flicker can be eliminated as in a progressively scanned picture. Each pixel will be on for the entire length of a frame, immediately changing to the appropriate level of transmissivity or reflectivity for the pixel in the next frame. Each pixel will be on (the desired amount) all the time, allowing the highest throughput of light from the external light source. State of the art methods of deposition of semiconductor material can be utilized to mass-produce such an active matrix system. Similarly, in addition to active matrix addressing of light valves such as LCDS, other methods, including scanned electron and scanned laser beam addressing can be utilized in a light valve within a projector.

The light valve can be used in conjunction with direct projection optics. A general overview of the present invention is depicted schematically in FIG. 17 as comprising a light source 1700 from which emerges a beam of light, collimating optics 1710 which collimates the beam, including a spherical or parabolic reflector 1720 which reflects the beam, a condensing lens 1730 which focuses the beam forward and collimating lenses 1740 which again collimate the beam. The light valve (or light valves) 1750 is illuminated by the collimated beam, creating a full-color optical image thereupon. Projection optics 1780 then focuses this image onto a viewing surface 1790. To improve the quality of the projected image as explained further herein, subsystem 1760 is used to superpose pixels of color triads forming full-color pixels with spaces between them and subsystem 1770, also explained herein, may be used to fill in the spaces between pixels.

An active matrix light valve made by the deposition of thin film transistors also has significant drawbacks. The chances for defects such as shorts and opens abound because of the small feature dimensions, the many layers of deposition and the high density of conductive paths, transistors, and other features in such light valves. A simple defect can cause an entire row of pixels to be permanently on or permanently off and can render an entire display useless since defects projected onto a screen become very noticeable and unacceptable. The display yield accordingly goes down dramatically as the resolution and/or size of the display increases and the cost of an acceptable display dramatically increases. Techniques such as redundant transistors at each pixel, redundant conductive pathways and the use of a laser to eliminate shorted transistors or pathways have been devised to compensate for such defects. However, even with these techniques, many defects are not correctable, keeping yield low and costs high.

Figure 19:
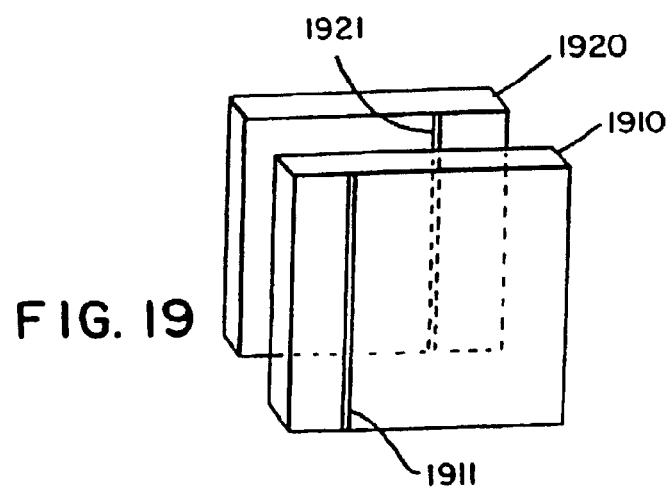
FIG. 19 is a schematic view of an embodiment of the electronic image projection system in which two light valves are placed together where one light valve would compensate for defective pixels in the other light valve.

Applicant's technique of placing two otherwise unacceptable displays back-to-back with appropriate display drivers greatly increases the yield and reduces the cost of producing active matrix displays. (See FIG. 19.) Although each display 1910 and 1920 separately is unacceptable because of its relatively few uncorrectable defects, 1911 and 1921, respectively, two rejected displays can be combined where the defects in one do not correspond to the defects of the other. The output faces or the input faces of the two displays must be facing one another in a conventional LCD which has a twist angle of 90 degrees (unless a half wave plate is placed between them). This way, vertically polarized light, for instance, entering the input face of the first display is rotated 90 degrees by the liquid crystal material when no current is applied, exiting as horizontally polarized light. It can now enter the output face of the second display and be rotated by the liquid crystal material to become vertically polarized and exit the input face of the second display. Consequently, no polarizer need be placed between the displays.

Although transmission light valves are preferred in applicant's system, reflection light valves could be used as well. When utilizing liquid crystals as the active medium, use of the twisted nematic effect is currently the most common method of modulating the light to produce a satisfactory image. However, use of the twisted nematic effect does not work well in a reflection light valve. This is because polarized light which enters the light valve (polarized, for example, in the vertical direction) will rotate 90 degrees, hit the rear reflector and rotate back 90 degrees upon passing a second time through the twisted nematic cell. Thus the light will exit predominantly as it went in with the initial polarization. When there is a signal causing a voltage to be imposed on the liquid crystal material, the nematic liquid crystals will become perpendicular to the cell faces to some degree (depending on voltage), losing their twisted orientation with respect to the light. Thus, light entering the cell will pass through the cell and reflect back out unaltered. Thus, whether or not a voltage is applied, light comes out of a reflective cell unaffected by the twisted nematic effect.

A reflective liquid crystal cell can work utilizing scattering or the birefringence of the liquid crystals. A reflective active matrix light valve can be constructed in many ways. For instance, a single silicon chip can be made into an active matrix utilizing state of the art silicon chip fabrication technology such as proposed by Hughes in the 1970s with reflective pixel electrodes on the silicon chip made of a material such as aluminum. The opposite faces of the cell can be made of glass with transparent indium tin oxide pixel electrodes.

Figure 20:
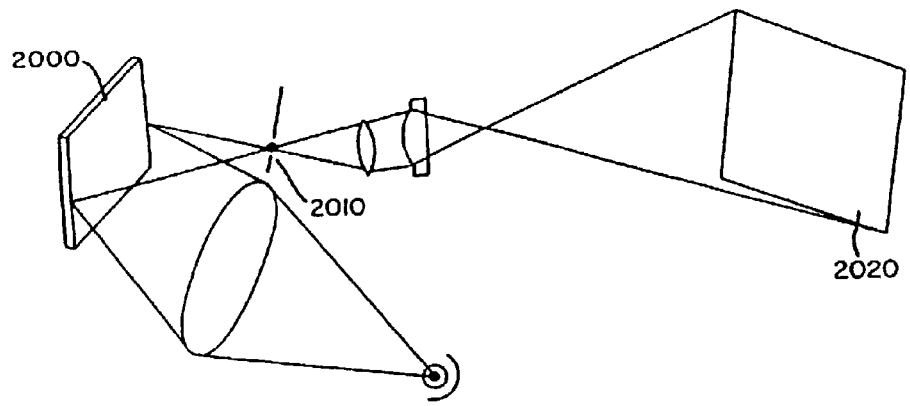
FIG. 20 is a schematic view of a projection arrangement utilizing a reflective light valve.

Utilizing the scattering effect (see FIG. 20), light which enters the cell 2000 can hit a specularly reflecting back surface and reflect out of the cell for focusing, for instance, through an aperture 2010, as in a Schlieren type optical system. When a voltage is applied in a given area, light is scattered in proportion to the voltage, preventing it from being focused through the aperture on to the screen 2020. To make use of the birefringence of liquid crystal molecules, a cell can be constructed wherein the liquid crystal dipoles are oriented either parallel or perpendicular to the faces of the cell or somewhere in between, depending upon the applied voltage. In this case, polarized molet entering the cell when the molecules are oriented perpendicular to the faces of the cell, will emerge from the cell after reflection from a rear reflective surface with its polarization unchanged. However, with the proper cell thickness when the dipole molecules are completely or partially parallel to the cell's faces, the birefringence of the liquid crystal molecules will cause the liquid crystal material to act like a quarter wave plate of varying efficiency. Thus, after passage in and out of such a reflective cell, polarized light will have its plane of polarization rotated, to some degree (up to 90 degrees) depending upon the voltage applied (double passage through the cell making the cell operate as a half wave plate).

Heat and IR radiation generated by the required projection bulb are sources of lowered resolution and contrast, as well as color and gray-level distortion, and could damage the light valve. Heat and IR, like the light, irradiates the light valve in a Gaussian-like pattern, causing a "hot spot" in the center of the light valve. Even if the damage threshold is not reached, image degradation could still occur because the light valve expands, increasing the distance light must travel through it. When the polarization rotation effect is used, the rotation of the plane of polarization of the light passing through the light valve could change, throwing off contrast, resolution and color and gray-level rendition in a Gaussian-like pattern.

Several steps may be taken to deal with the detrimental effects of heating of the light valve. First, all optics including the light valve, should be mounted with good contact to large heat sinks, as is done, for instance, with power transistors. Optics in the system, including the light valve windows, can be made of or coated with substances such as diamond and sapphire, which have excellent optical qualities and unusually high heat conductive capabilities. Additionally, all optics can be coated with material of proper thickness, such as is done for dichroic reflectors to reflect the infrared (IR) spectrum. IR reflecting mirrors and heat absorbing glass can also be used in the optical path. Additionally, a fluid means such as a liquid or gas in a container, consisting of a large body of index-matched high-boiling-point fluid (liquid or gas), can be used for further cooling. This fluid may be static or circulating within a contained area and placed in contact with the components to be cooled. Alternatively, instead of transmissive optics, reflective optics such as optics made of metal can be utilized for further heat sinking and to suppress reflection at IR wavelengths (with anti-reflection coating for the IR).

Anti-reflection (AR) coatings can, of course, be used on all optical surfaces to reduce light losses due to reflection at those surfaces. Such surfaces include surfaces of lenses, hot mirrors, heat absorbers, polarizers, prisms and light valves such as LCDs, including the internal surfaces of the glass faces of the light valves to reduce reflections at glass—ITO boundaries glass—liquid crystal boundaries, ITO liquid crystal boundaries, etc.

Figure 16:
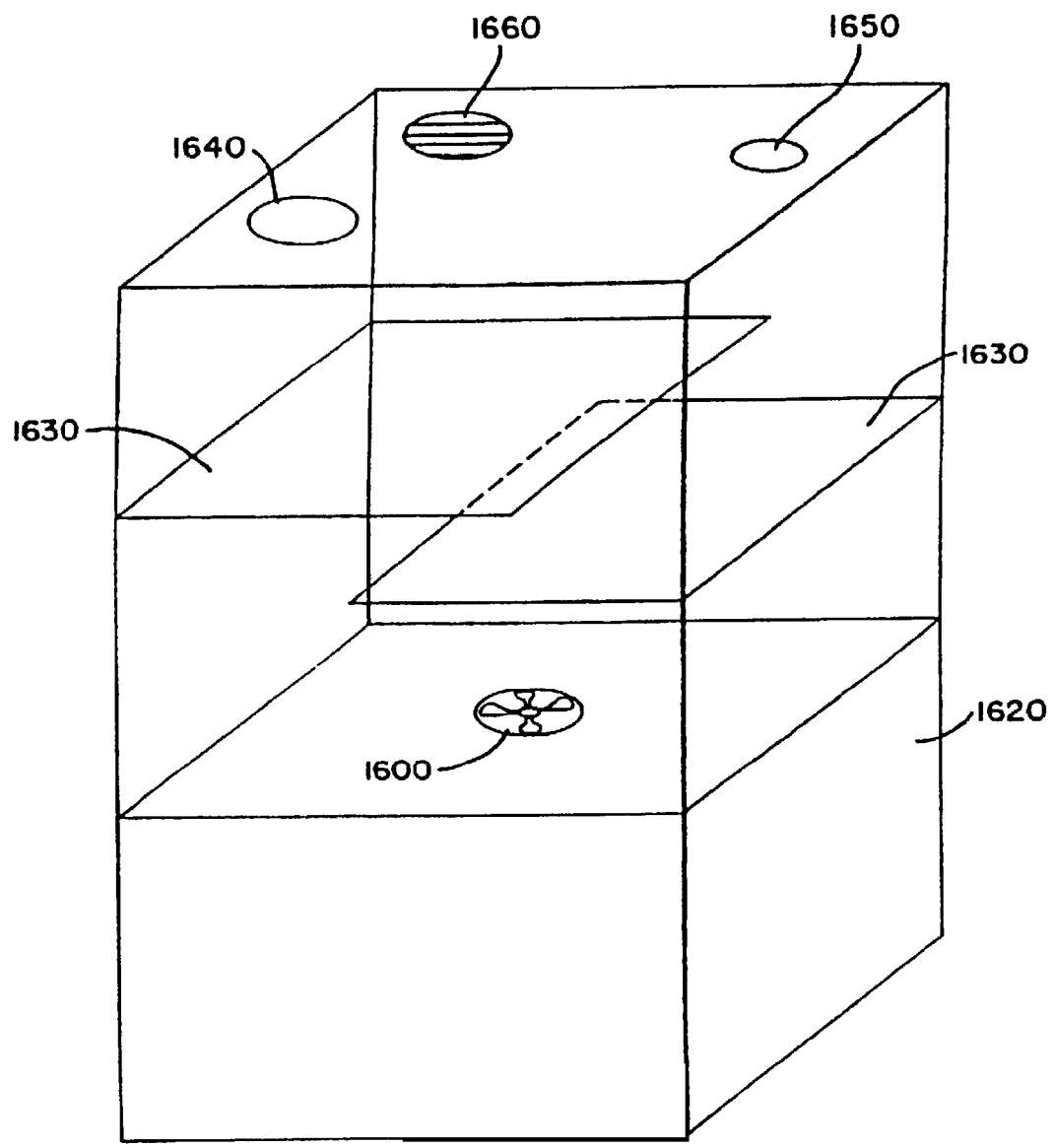
FIG. 16 is an open perspective view of a sound suppression system which may be adapted to the present invention.

Cooling fans may be used to cool the light valve as well as the other components of the system. Ducts and narrow tubes can be used to provide cooling to specific spots. However, a fan can pose a noise problem, particularly noticeable when the audio volume of the system is at a low level, particularly in a small room. To suppress the noise, an "air baffle" may be used between the fan and the outlet of, for example, a housing for various components of the invention. FIG. 16 shows a sound suppression system, comprising fan 1600 resting on platform 1620. Airflow blockers 1630 force the air to traverse a curved path with deflection prior to exiting the housing through outlet 1640. The surfaces from which the air and sound reflects are covered with sound absorbing materials, greatly reducing the noise entering the listening environment. Since some noise will still be present at outlet 1640, a further measure may be taken for noise reduction. This measure could comprise microphone 1650 which picks up the remaining noise and sends it to an amplifier which inverts the phase of the noise by 180 degrees. The inverted noise is played back through speaker 1660. By properly adjusting the volume and phasing of the amplifier, the remaining perceived fan noise could be substantially reduced and made practically inaudible.

Depending upon the brightness of the light source utilized and the physical and economic constraints of a given system, some significant Gaussian-like heat pattern could remain at the light valve and could change with time as overall heat builds up during operation. An electronic approach can therefore be used in conjunction with the other recited remedies to eliminate the problem. Modifying the electronic field in opposition to temperature effects will substantially cancel the distortion resultant from such effects, since the degree of rotation of the plane of polarization of the light is not only dependent on the thickness of the light valve that it passes through, but also upon the amount of applied electric field. The result will be uniform performance across the light valve. Such a system would use a bias voltage applied differently to different pixels, distributed in a Gaussian-like pattern across the light valve. A thermistor or other temperature-sensing device, placed at the light valve, can monitor overall average light valve temperature, adjusting the Gaussian-like bias voltage distribution as the temperature fluctuates, using an electronic feedback circuit. For even more accurate temperature control, a thermistor-type device can be deposited next to each pixel in the space between the pixels to independently control the heat-compensating bias of each pixel.

An "active matrix" will allow for more brightness in the projected image than a multiplexed array and less heat will be generated for a given level of brightness. Addressing each pixel separately in this way eliminates cross-talk. However, all the conductive pathways, transistors, and capacitors create substantial "dead space" between pixels. These dead spaces are generally in the area of "overlap" where electric fields from neighboring pixels could co-mingle and produce false data, reducing contrast and distorting the color mix. Placing an opaque, black, reflective or other covering over these areas serves at least three purposes: it stops passage of improperly modulated and unmodulated light from passage to the screen, protects the semiconductors from damage due to irradiation from the intense light and heat and reduces the chance of discharge of pixels. The covered area may be a fraction of the size of a pixel.

As an alternative to using three light valves in a projection system to produce full-color, there are several ways to construct a full-color projection system using a single light valve. A simple, compact and inexpensive full-color video projection system may be constructed using a single "full-color" light valve. Previously full-color, direct-view video image displays not using projection had been constructed with a single "full-color" LCD. When such images were enlarged by projection, however, several problems explained herein become apparent.

Figure 15B:
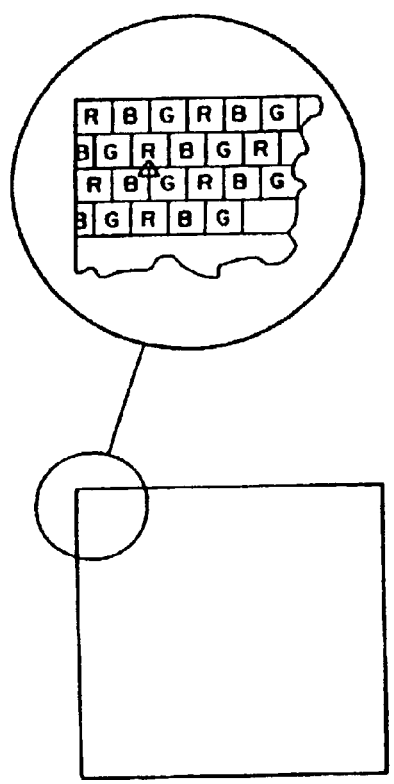
FIG. 15b is a schematic view of an alternate arrangement of pixels in which three pixels of a color triad are indicated by a triangle.
Figure 15A:
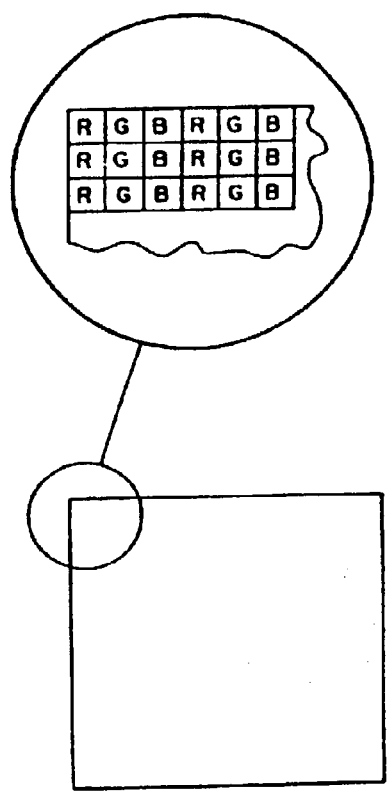
FIG. 15a is a schematic view of color filters on corresponding color-pixel areas in a full-color LCD.

In a standard CRT-based TV system, red, blue and green pixel data are sent to adjacent red, blue and green phosphor spots on the CRT face. Analogously, in a direct-view full-color LCD TV system, red, blue and green pixel data are sent to adjacent areas of the LCD. These areas are then covered by red, blue and green filters to appropriately color the light passing through those LCD pixel elements. FIG. 15*a* depicts a simple arrangement of color pixels in which pixels of a given color are located above one another creating vertical color stripes. Three horizontally adjacent pixel areas make up a pixel triad which represents a single, full-color pixel from the actual image. FIG. 15*b* depicts an alternate arrangement of pixels in which the three pixels of a color triad are arranged to form a triangle. In the preferred single light valve embodiment, such a full-color light valve can be placed at position 1750 in FIG. 17 to produce a full-color image.

Figure 21:
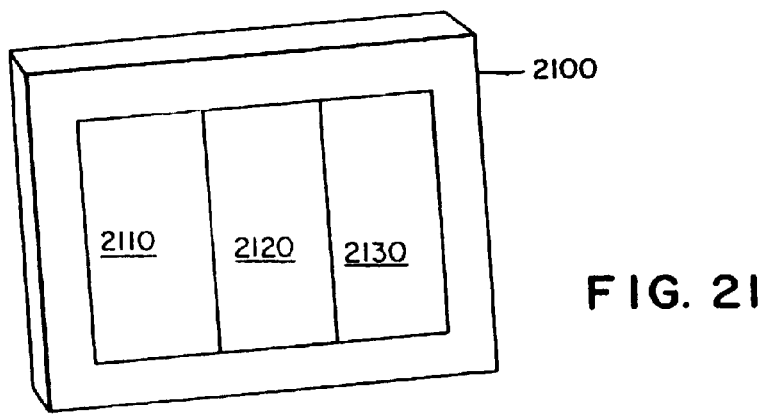
FIG. 21 is a schematic view of a single light valve divided into three sections for use in full-color projection.
Figure 22:
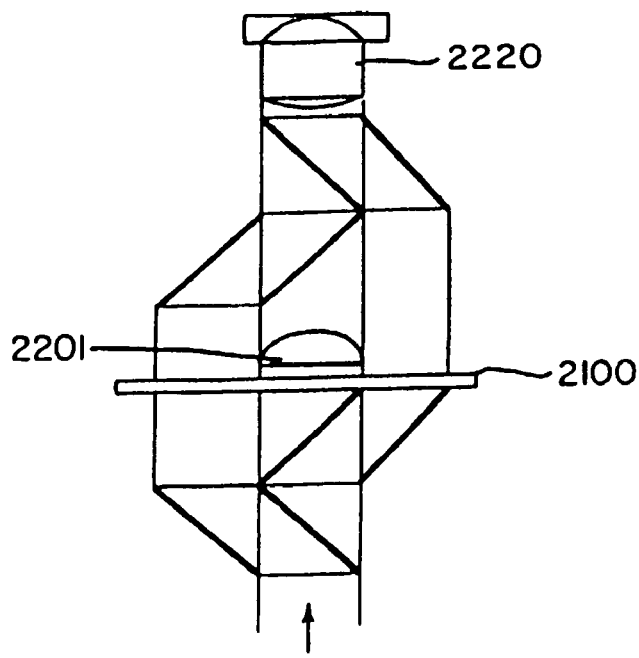
FIG. 22 is a schematic view of a method of matching the path lengths of beams travelling from a light valve to a projection lens utilizing a path length compensation lens.
Figure 23:
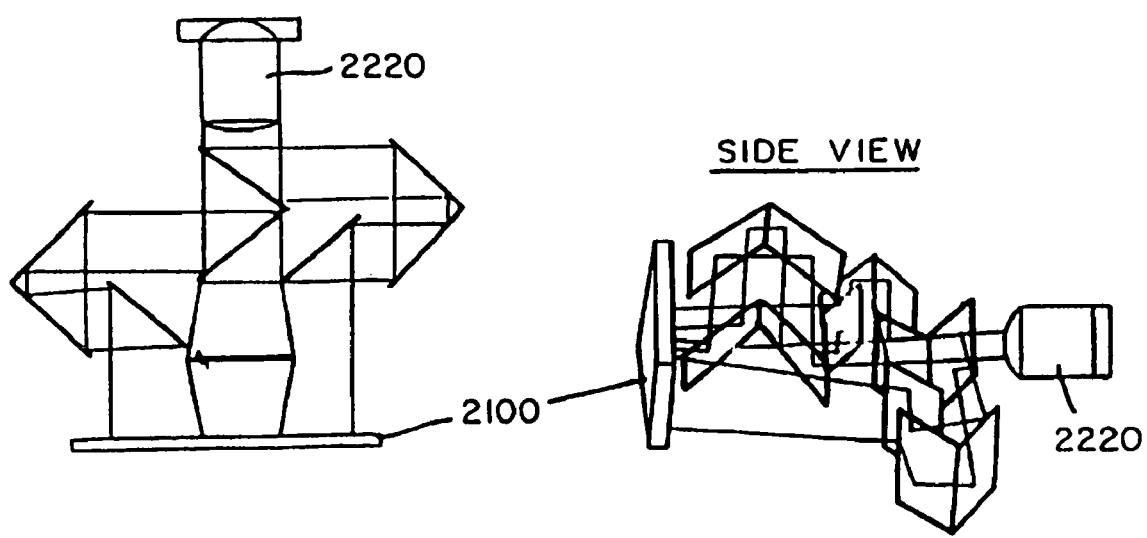
FIG. 23 is a schematic view of a technique utilizing mirrors to compensate for path length differences of beams travelling from the light valve to the projection lens in an embodiment of the present invention.
Figure 24:
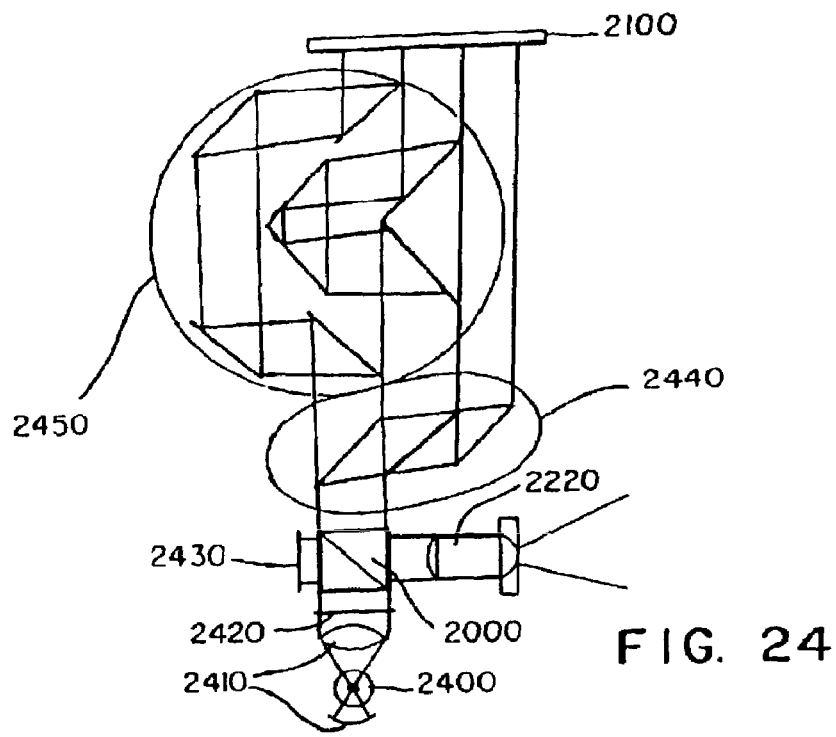
FIG. 24 is an alternate embodiment of the electronic image projection system utilizing a reflective light valve to produce a full-color image and a MacNeille prism for polarizing and analyzing beams.

In one embodiment, a single light valve 2100 may be divided into three sections. The red image for instance, can be made to electronically address the left ⅓ of the light valve panel 2110, while the electronic data corresponding to the green component of the image addresses the center ⅓ of the light valve 2120, and the electronic data representing the blue component of the image can address the right ⅓ of the light valve 2130. (See FIG. 21.) Light from these three images can then be overlapped and projected through projection optics to the screen. Since the projection lens 2220 has a given focal length, it must be placed approximately its focal length away from each. color component image. (It must be optically equidistant from each image.) This can be accomplished in a number of ways. One or more lenses can be positioned just after the light valve 2100 to adjust the focus of one or more of the three images through the same projection lens even though the three images may traverse different light paths. (See FIG. 22.) For instance, correction lens 2201 can correct for the distance difference in the straight-through path as compared to the reflected paths. Alternatively, path lengths can be matched by the appropriate use of mirrors, as for example, depicted in FIG. 23 or, preferably, FIG. 75. In FIG. 75, 7510, 7520, 7530, and 7540 represent first-surface mirrors or prisms to reflect the beams while 7550 and 7560 are dichroic mirrors. Light from IFE 7570 is expanded by lenses 7580 to create an image with the desired aspect ratio. Proper selection of angles (such as A1=67.38 degrees and A2=36.87 degrees) will allow all beams to traverse equal paths for combination into a single full-color beam. Obviously, the IFE could be divided into sections in different ways, such as into horizontal sections or divided in half with one section divided in half again, etc. As mentioned earlier, reflection optics, including a reflection light valve, can be used to produce the full-color video image. An example of this type of set-up with a single light valve is shown in FIG. 24.

In this set-up, light from light source 2400 is collected and collimated by condenser optics 2410. After passage through a quarter wave plate 2420, the light enters a MacNeille beam splitter cube 2000. S-polarized light reflects from the internal face within the cube to front-surface mirror 2430. This reflects the S-polarized light back through the cube, through the quarter wave plate, back through the condenser optics and light bulb, and back through the quarter wave plate. At this point, the S-polarized light, having passed twice through the quarter wave plate is rotated 90 degrees to become P-polarized light. It can now pass through the cube, resulting in utilization of a majority of the source light, even though plane polarization is performed.

Dichroic mirror set-up 2440 separates the light into red, green and blue beams which reflect from path equalization mirrors 2450 and illuminate three sections of light valve 2100, which is addressed with three color-component images. The light reflects from the light valve and retraces its path to the MacNeille prism. Light which should appear in the projected image is converted by the light valve from P-polarized light to S-polarized light. It therefore reflects from the inner surface of the cube and exits through the projection lens 2220 to the screen. Non-image light remains P-polarized and passes through the cube and is reinjected into the system, making the projected image somewhat brighter. A birefringence transmission light valve with a mirror behind it could also be used in this arrangement.

In conventionally made LCDs, color filters are deposited within the cavity of the LCD. This must be done because any difference in physical location of the actual LCD pixels and the color filters coloring them will produce a parallax difference which will be perceived as misregistered or incorrect colors when viewing a direct-view LCD from any angle aside from head-on.

Since the space between the glass plates forming an LCD is typically less than 10 microns, the deposition of color filters requires a high degree of thickness control as well as color transmissivity and overall transmissivity uniformity in such thin coating thicknesses. In addition, high efficiency filtering must be used to eliminate the possibility of contaminating particulate matter in the coating chemicals which may be on the order of or larger than the space in between the glass plates.

Projection, however, presents the unique situation in which a light valve can be illuminated with substantially collimated light and viewed on a screen from all angles even though light passes through the light valve substantially in a parallel direction eliminating any possible parallax error. This means that the making of full-color light valves specifically for their use in projection will allow the use of external color filters whose thicknesses do not have to be as precisely controlled. Also, being placed outside of the light valve cavity reduces the risk of contamination as well as the complexity and thus the cost of production of light valves for that purpose.

Using a "full-color" light valve can create another problem which, although not very noticeable on small displays, creates major problems in a large image. This problem results in a poor contrast ratio and poor color fidelity. To understand and correct this problem the workings of a full-color LCD display must be analyzed.

The following discussion explains the nature of the problem. The transmitted light intensity (TI) from a twisted nematic liquid crystal device, under no applied voltage, with a crystal thickness (d) for any given wavelength (.lambda.), is dependent on the refraction anisotropy (.DELTA.n) and the liquid crystal twist angle (.theta.). TI can equal zero for only a few unique simultaneous combinations of values for these parameters. This means that except for very specific combinations of wavelength (.lambda.) and thickness (d) for any given crystal, zero transmitted intensity or true "black" will not occur. Thus, if the anisotropy, twist angle, and crystal thickness are fixed, as they are in a conventional light valve such as an LCD (consisting of liquid crystal between two flat plates), only one color can go to black at a time. If a voltage is applied, changing the light rotation, then a different color can go to black. This non-linearity eliminates the possibility of true black in all colors simultaneously (and thus limits possible contrast) and since perceived color is produced by addition, this eliminates true color fidelity.

Figure 10:
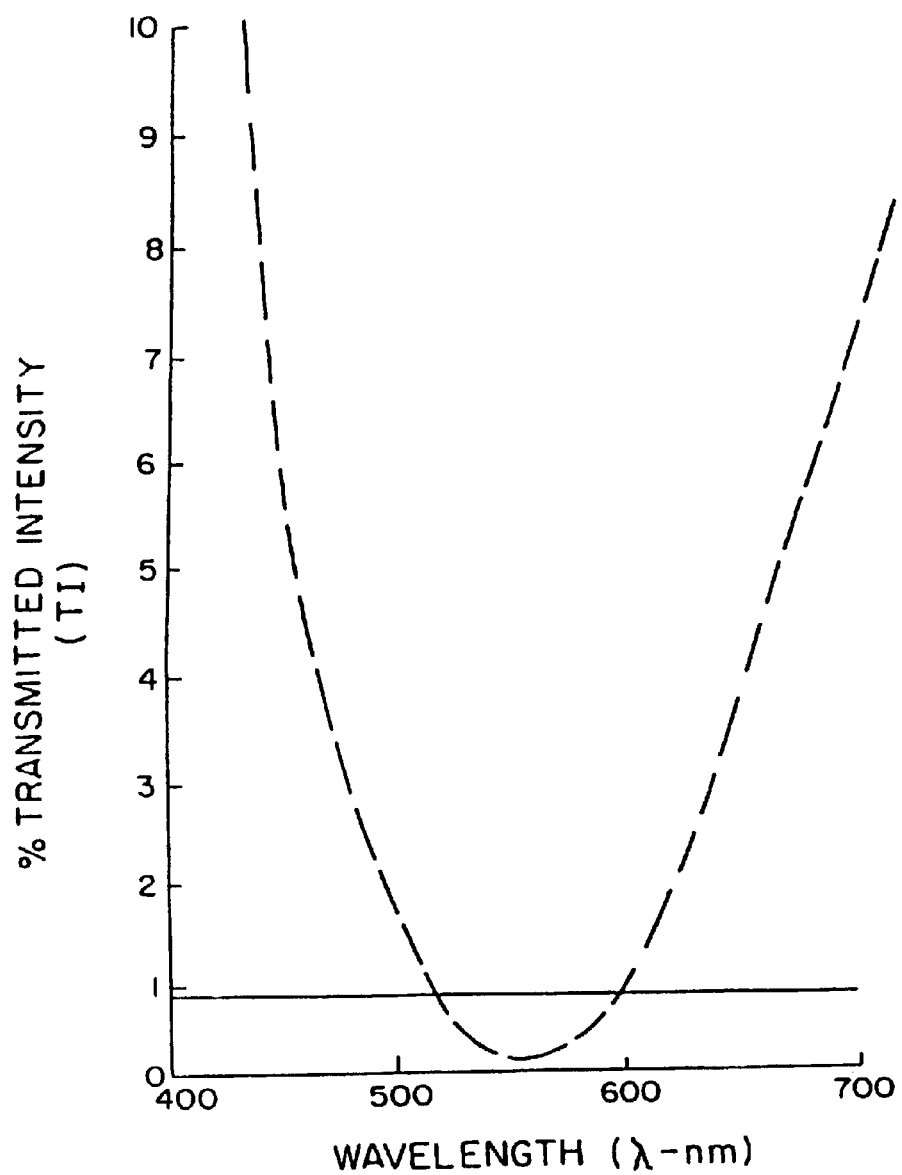
FIG. 10 is a graphical plot of transmitted light intensity over the visible spectrum through two full-color LCDs, one with a constant LCD cavity thickness contrasted with a "stepped thickness" LCD cavity.
Figure 11:
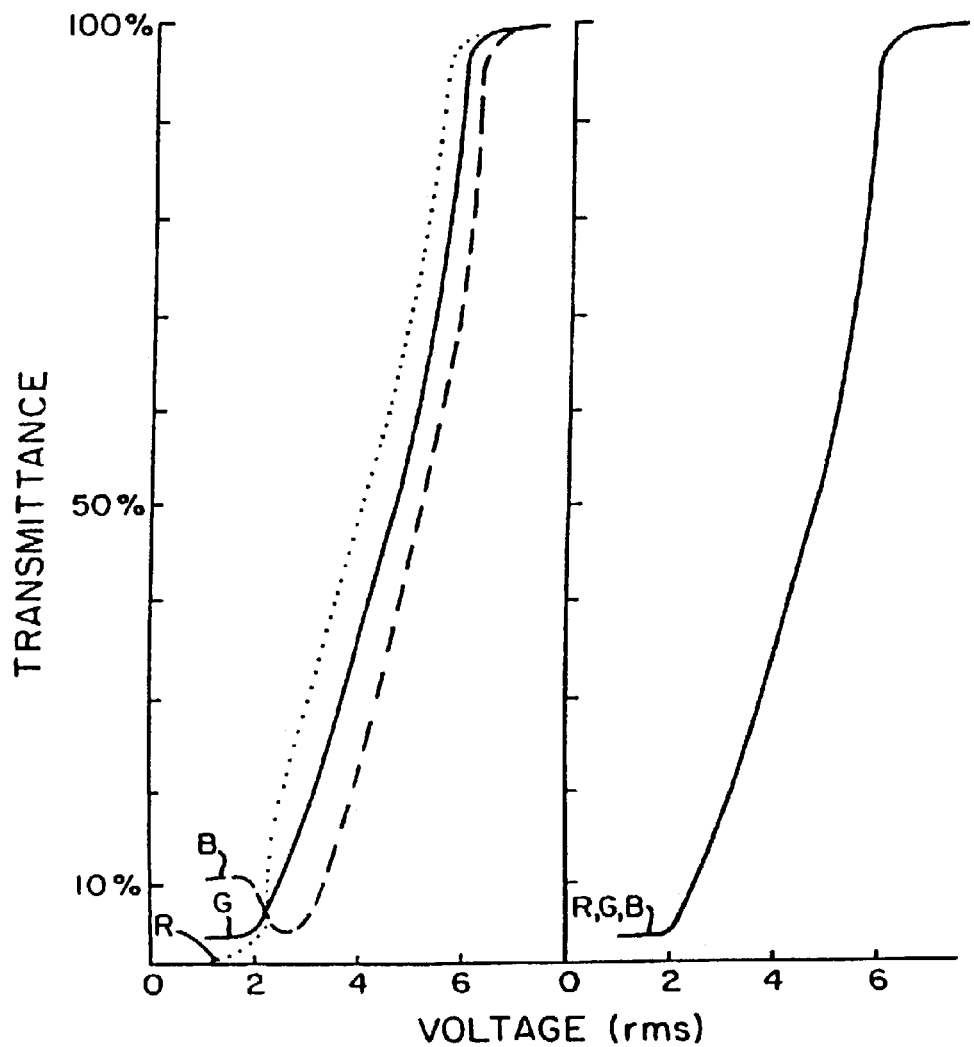
FIG. 11 is graphical plot of transmitted light intensity vs. applied voltage for three wavelengths used in two full-color LCDs, with the lefthand part for a constant thickness LCD cavity and the righthand part for a "stepped thickness" LCD cavity.

To further illustrate this problem, the dashed curve of FIG. 10 shows the transmitted intensity over the visible spectrum of a standard full-color LCD with a given thickness. FIG. 11, plot A shows the non-linear transmittance variations for the three wavelengths used in a full-color LCD of uniform thickness plotted against the voltage. When red transmission, for instance, is at a minimum, blue transmission is over 10 percent and green transmission is about 5 percent. Having no true black results in a low contrast ratio which is one of the main problems with today's LCDs. To solve this problem, one of the variables given above must be modified to produce the desired transmissivity for a given signal voltage. This can be done by electronically biasing the pixels, which are addressed with data corresponding to two of the color components (such as red and green). This would cause the net transmissivity through the red and green pixels to equal the transmissivity of the blue pixels, when no signal voltages are present for any pixels. With proper selection of d, all colors will be at a minimum.

Alternatively, the crystal thickness (the space between the plates encasing the liquid crystal) can be selected under each color filter such that at exactly zero (signal) volts, the proper rotation is imposed on the polarized light for the specific wavelength transmitted by that color filter. By doing this for each of the three sets of color filters, the minimum amount of light for each color will be transmitted with no voltage applied. This, again, will provide a blacker black and thus a high contrast. This result is accomplished, for instance, if stepped deposition or etching of one plate is done to produce steps as illustrated in FIG. 12.

By using a light valve with such a "stepped thickness" cavity, the crystal thickness-wavelength combination will allow true black for all three colors simultaneously and a linear relationship between applied voltage and transmitted intensity for all colors simultaneously. This is demonstrated by FIG. 10 (solid line) where transmission is nearly zero for all colors simultaneously with no voltage applied and in FIG. 11, plot B, where the transmission for all colors varies with voltage simultaneously.

In applicant's demonstration model, using a "stepped thickness" cavity results in a contrast ratio as high as 100:1 and color fidelity approaching that of a CRT. This high color fidelity can be seen in the CIE diagram of FIG. 13 in which the dashed line represents the chromaticity of conventional multi-color LC displays, the dotted line represents the chromaticity of an LC color display with varying crystal thicknesses and the solid line represents the chromaticity of a conventional CRT.

The small, closely packed red, blue and green spots of light that make up a direct-view image create the illusion of color in a scene as they are supposed to appear. However, when this image is magnified by projection, each adjacent red, blue, and green pixel no longer merges to produce properly colored areas. Instead, they appear as disjointed red, blue, and green areas, detracting from the appearance of a naturally colored image. Furthermore, dead spaces between adjacent pixel areas in the light valve are magnified as well, further creating a disjointed, disruptive, unnatural looking image. The appearance of disjointed red, blue and green spots instead of actual colors in a full-color light valve can be eliminated by various methods.

The concept of depixelization, or substantially reducing the perceived appearance of dots, lines, pixels, dead spaces, or other such non-information bearing portions of the image, as proposed herein, along with suggested methods to accomplish it, is applicable to any displayed image that contains such areas, whether it is a projected or a direct-view image display. Although the "smoothing effect" is most noticeable in a large display with large pixels, it still improves perceived image quality even when the displayed image is small and/or contains small pixels.

Figure 52:
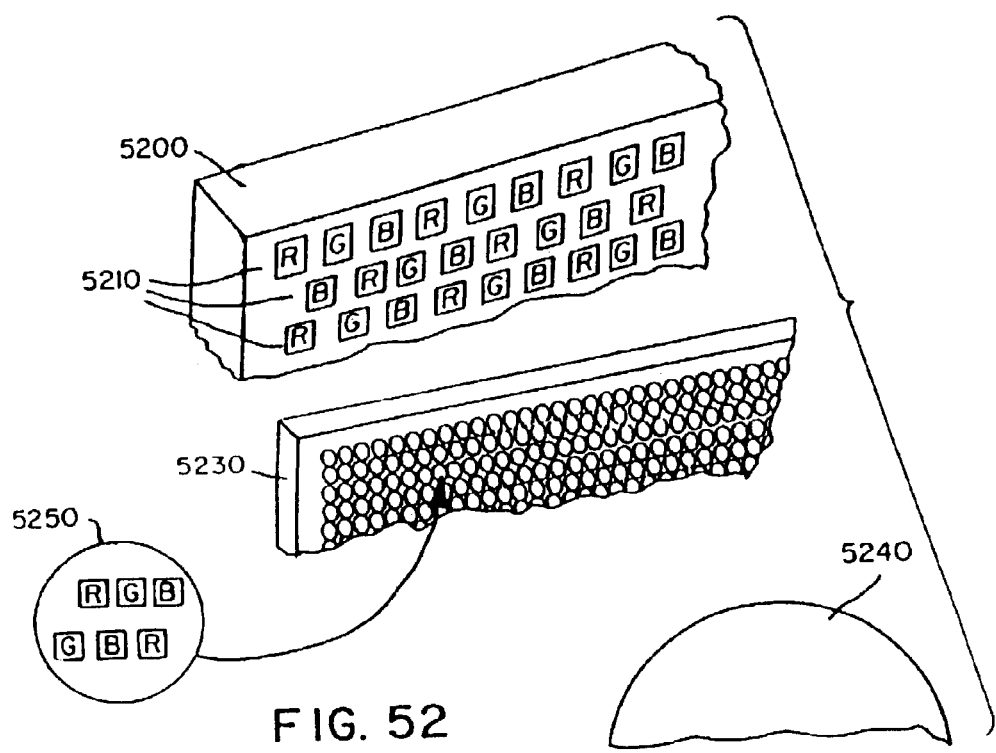
FIG. 52 is a schematic view of an embodiment of the electronic image projection system in which a full-color light valve is followed by a lens array to create demagnified real images on the light valve pixels in front of the lens array to allow for the projection of a full-color image in which the individual red, green and blue pixels are merged.

The preferred method of eliminating them in the projected image, utilizing a single, full-color light valve, entails the use of lens arrays. FIG. 52 shows a full-color light valve 5200 with red, green and blue pixels arranged in horizontal rows 5210. The rows are preferably arranged so that each succeeding row is offset by 1½ pixels from the previous row, although many other arrangements are possible. A lens array 5230 is placed in front of the light valve and behind the projection lens 5240. The lens array could comprise spherical lenses, although cylindrical or other types of lenses could be used, each of which is ½ the width of a pixel on the light valve. The curvature of each lenslet and the distance between the lens array and the light valve can be chosen so that each lenslet 5250 creates a demagnified real image of a portion of the light valve, floating in space, slightly in front of the lens array, between the lens array and the projection lens. Other arrangements are, of course, possible.

Figure 53:
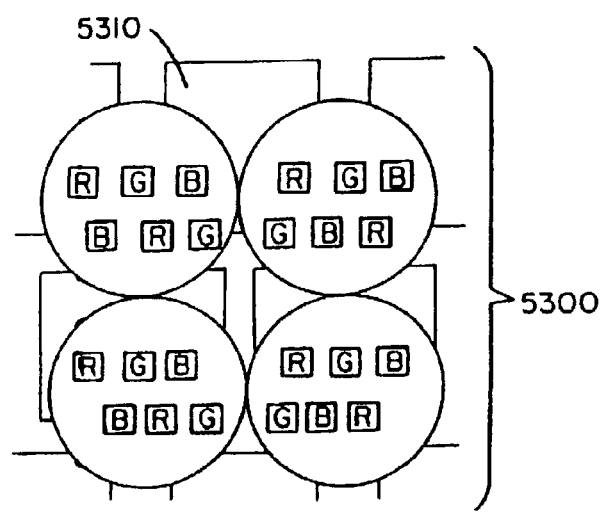
FIG. 53 is a schematic view of four lenses in a lens array placed in front of a full-color light valve in an embodiment of the electronic image projection system creating a real image of 24 pixel color components after the lens array.

As shown in FIG. 52 (inset) 5250, the real image produced by a single lenslet contains data from 6 pixels. These 6 pixel images come from two horizontal rows with 3 pixels on top and 3 pixels below. Other lens sizes and curvatures could be used and each real image could contain a different number of pixel images while still producing essentially the same result. The addition of the lens array separates the planes of best focus of the red, green, and blue pixel data and the image information displayed on the light valve. The projection lens focuses through the lens array onto the plane of the best image focus, near the plane of the light valve. Since 4 lenslets 5300 (see FIG. 53) occupy the same amount of space as a single pixel 5310 and each lenslet produces an image of 6 pixels in this case, the image focused on the screen of a single pixel will be the superposition of 24 red, green and blue dots. These dots, however, are not 24 different pixels, but contain the data from only 6 pixels on the light valve (which may correspond to only two pixels in the actual scene). The 24 dots that superimpose to create the image of the next pixel contain some of the same information as the previous 24 dots or some portion of the same dots and some new ones. Consequently, each adjacent pixel image is a weighted average of approximately 2 triads, causing only a slight reduction in resolution. However, since each newly created pixel image is an out-of-focus superposition of 24 dots, its colors combine to produce a net uniform color. Thus, a full-color image is still displayed with correct colors in the correct locations to a sufficient degree of accuracy so that the image appears essentially unchanged from that projected without the lens array, except that individual red, green and blue dots are no longer visible. This blending process also eliminates the appearance of any spaces between pixels. This combined function eliminates the appearance of pixels altogether. Use of an anamorphic lenslet profile, or the optical equivalent formed by crossed lenticular lenses is preferred so that the "blur" is only a mix of one red, one green and one blue pixel.

When constructing a rear-screen display unit, an additional flexibility is provided since the screen is built into the unit. This allows for the addition of optics just before the screen. If the image projected onto a rear screen has individual red, green and blue pixels, a lens array as described, which has for instance twice as many lenses as there are pixels in each orthogonal direction, can be placed near the focused image that is to hit the screen. As explained above, each lens element can create a demagnified image of one or more triads in space. A second lens array with the same number of lenslets as there are pixels can then focus a blended image of the new pixel onto a nearby screen surface (being focused on a plane near the original image plane, not on the plane of real images of the pixels). As before, the individual color pixels will be blended into full-color pixels.

Alternatively, a single lens array can be used if it is made in a special way. The single array should have the same number of lenslets as there are individual colored pixels. The array is placed after the image that is to be focused on the screen. Two of every three lenses in the array also have a built-in wedge so that the images of a triad will all be focused onto a nearby screen overlapped, creating full-color pixels. The wedges can, of course, be separate from the lenslets. These last two techniques can also be applied to a CRT or any imaging device which normally displays individual red, green and blue pixels.

Figure 28:
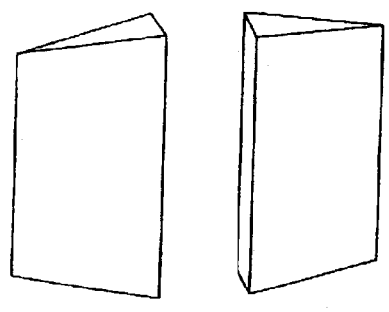
FIG. 28 is a schematic view of wedges used in the optical path of a projector to create three overlapping images of the full-color light valve so as to merge red, green and blue pixel color components into full-color pixels in the image.

Another method of creating full-color pixels entails the use of narrow angled prisms or wedges. As shown in FIG. 28, these two wedges can be placed with a clear space between them at any place in the system as long as they are not placed too close to the light valve. Since the light distribution is usually Gaussian, more light is concentrated in the center. To make all three images equal in brightness, the clear center section should therefore be smaller than each wedge section. Alternatively, to produce a more uniform image, the wedges can be divided into thin sections and interdispersed with clear spaces. If the wedges are placed somewhere between the light source and the light valve, they will create the equivalent of three very close light sources, illuminating the light valve from slightly different angles. This will create three slightly displaced images on the screen.

The wedges can also be positioned somewhere after the light valve, such as after the projection lens. Such positioning will create three images on the screen, each slightly offset from the other.

If the wedge angles are properly chosen based on simple geometrical considerations, the images will be offset by the width of one pixel. The red pixels of one image will then be superimposed on the neighboring green pixels of the second image, which will be superimposed on the neighboring blue pixels of the third image, creating full-color pixels in which individual red, green and blue pixels will not be visible. This technique will work well in most areas since most groups of three pixels in an image will most likely have the same color value. The only place this technique will create a slight problem is at the boundary between two very different areas. At the boundary, when there is an abrupt change in color and/or brightness, two of the pixels that are overlapped on neighboring pixels will be overlapped on neighbors that should have different values and therefore a noticeable distortion will become apparent, creating a more jagged looking edge at the boundaries of the viewed image. The larger the areas of constant color within a scene, the less noticeable this will be.

Figure 9A:
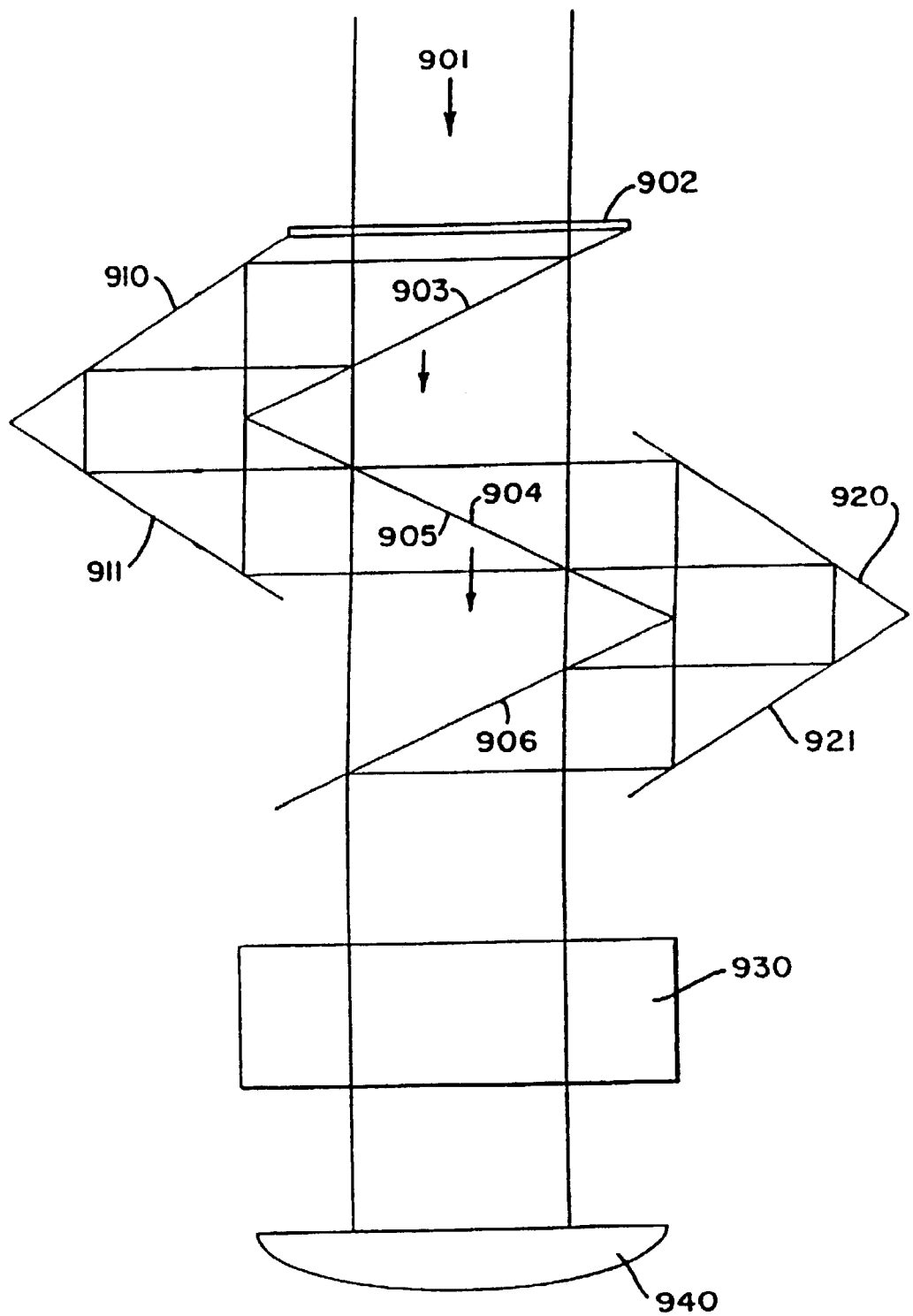
FIG. 9a is a schematic view of a dichroic mirror system of one embodiment of the present invention.

Another method to eliminate the appearance of the individual colored pixels is by the use of a dichroic mirror system as depicted in FIG. 9a. Assuming the pixel arrangement of FIG. 15a, individual red, blue and green pixels can be made to overlap by the following arrangement: collimated light 901 passes through the full-color light valve 902 and hits dichroic mirror 903 which reflects only the blue image. The remaining red and green images pass through dichroic mirror 903, hitting dichroic mirror surface 904 which reflects only the red image, allowing the green image to pass through. The blue image reflects off front surface mirrors 910 and 911 and then off dichroic mirror surface 905 which reflects only blue light. Here the blue image rejoins the green image. By adjusting front surface mirrors 910 and 911 the blue pixels can be made to overlap the green pixels. The red image reflects off front surface mirrors 920 and 921 and then off dichroic mirror 906 which only reflects red light. At 920 and 921, the red pixels can be made to overlap the already joined blue and green pixels. The path lengths could be matched using a compensating lens as described herein or additional mirrors as also described herein. At this juncture, we have a full-color image with large spaces between pixels as illustrated in FIG. 4.

Figure 9B:
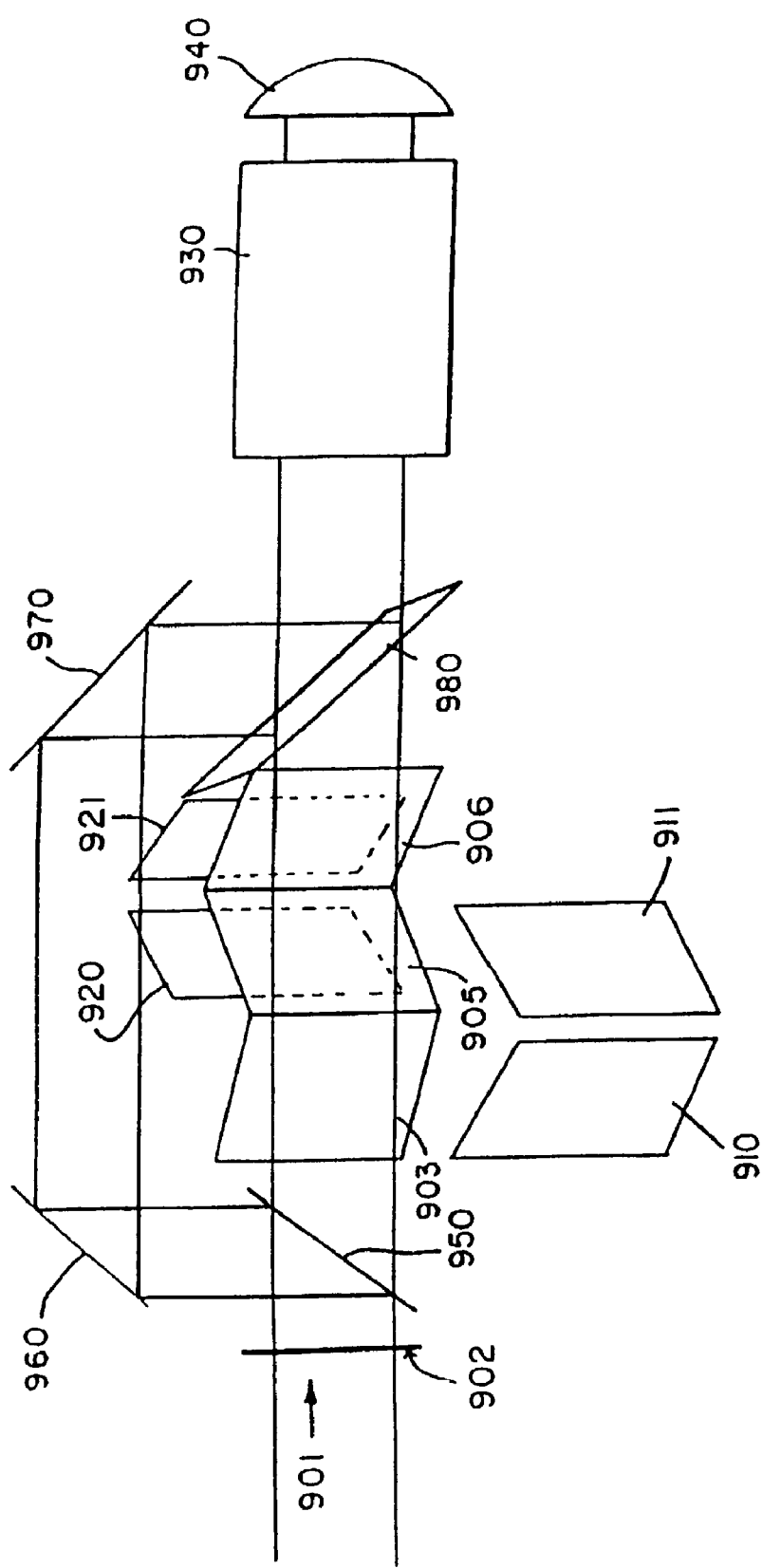
FIG. 9b is a schematic view of the embodiment of the dichroic mirror system of FIG. 9a, modified to include an additional light path.

If individual colored pixels are arranged on the light valve as shown by FIG. 15b, in which a color triad forms a triangle, bringing the red and blue pixels together, as described, will not allow them to superimpose on top of the proper green pixels since the proper green pixels are vertically displaced from their corresponding red and blue pixels. Consequently, this type of pixel arrangement could use an additional dichroic mirror path similar to the paths used by the red and blue light. This is depicted more clearly in FIG. 9b, which is a side view of the system in FIG. 9a modified to include an additional light path. Collimated light 901 passes through full-color light valve 902 as before. However, the distance between light valve 902 and dichroic mirror 903 is increased to allow for the insertion of dichroic mirror 950 which reflects green light and transmits red and blue light. As before, 903 reflects blue light and transmits red light. Mirror surfaces 904 and 905 are front surface mirrors. Mirror 906 reflects red light and transmits blue light. As before, mirrors 910, 911, 920 and 921 are front surface mirrors. In addition, mirrors 960 and 970 are also front surface mirrors. Mirror 980 is a dichroic mirror which reflects green light and transmits red and blue light. By this modified arrangement, proper separation of mirror 910 from mirror 911 and separation of mirror 920 from mirror 921 will still cause the overlap of the red and blue pixels. Additionally, proper separation of mirrors 960 and 970 will cause the proper green pixels to overlap the already joined red-blue pixel pairs. This overhead mirror arrangement may also be used with the color light valve whose pixel arrangement is depicted in FIG. 15a with the spacing between mirrors 960 and 970 adjusted to prevent vertical displacement of the green pixels since they are already in line with the red and blue pixels. The separate mirror path for the green light makes the distance traversed by each color equal, which is important because the light, although collimated, still expands with distance traveled and the projection lens must focus all three images simultaneously. Now the image can pass through subsystem 930 which can be used to fill the spaces between pixels (as described elsewhere herein) for final projection by projection optics 940.

Alternatively, in FIG. 9a, mirrors 910, 911 and 920, 921 could be tilted up or down to cause the red and blue pixels to superimpose on the proper green pixel.

Figure 29:
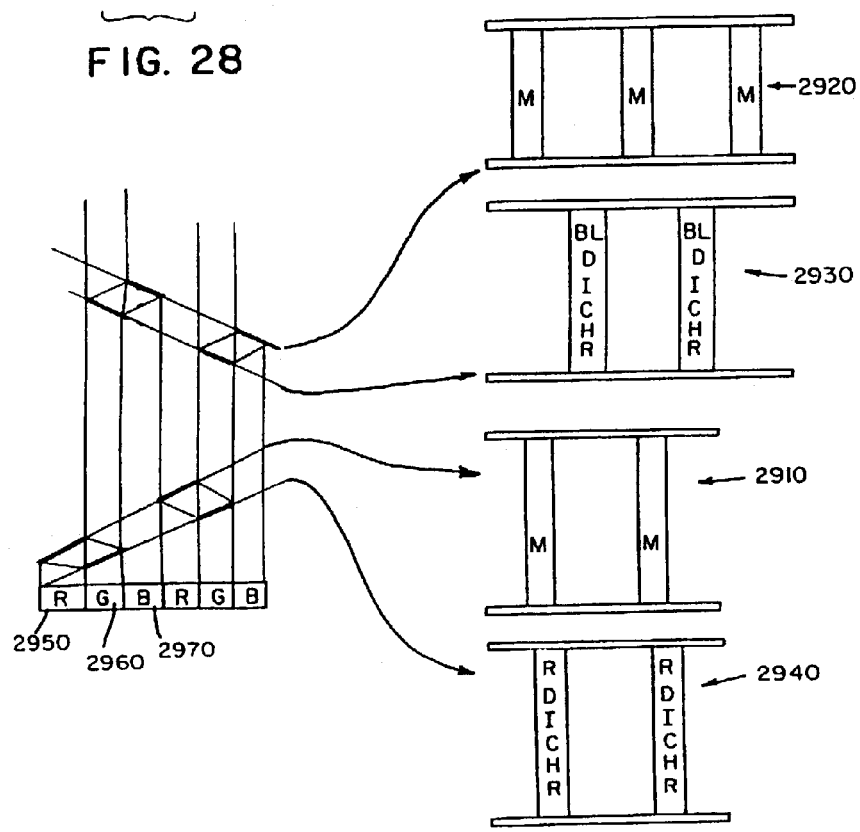
FIG. 29 is a schematic view of a four-mirror system in the electronic image projection system to overlap red, green and blue pixel color components creating full color pixels.

In another embodiment for the elimination of the appearance of red, green and blue pixels, depicted in FIG. 29, four special mirrors are used. Each mirror has clear spaces and mirrored areas. Two of the mirrors 2910 and 2920 have ordinary mirrored areas coated, for instance, with silver or aluminum, which totally reflect light of any color. One of the special mirror's 2930 reflective coatings is dichroic and reflects blue light and transmits red and green light. The other special mirror's 2940 reflective dichroic coating reflects red light. As seen in FIG. 29, the mirrored areas of the four-mirrors are positioned out of phase with each other. On each mirror, the clear space between every two-mirrored spaces is equal to twice the width of the mirrored space.

Light from red pixel #1 2950 passes through the clear area of the first mirror and reflects off the mirrored area of the second mirror downward towards the red reflective area of the first mirror. The red light is then reflected upward, passing through the clear area of the second mirror and then passes through the clear areas of the third and fourth mirrors.

The green light coming from green pixel #2 2960 passes through the dichroic mirrored area of mirror #1, passes through the clear area of mirror #2, passes through the dichroic mirrored area of mirror #3 and passes through the clear area of mirror #4 and is thus superimposed on the light that came from the red pixel.

Light from the blue pixel #3 2970 passes through the clear spaces in mirrors #1, #2 and #3 and reflects off the mirrored area in mirror #4 down to the dichroic mirrored area of mirror #3. This dichroic mirrored area reflects the blue light upwards, superimposing it on the light from the red and green pixels. Thus, we have created full-color pixels with spaces between them.

Figure 30:
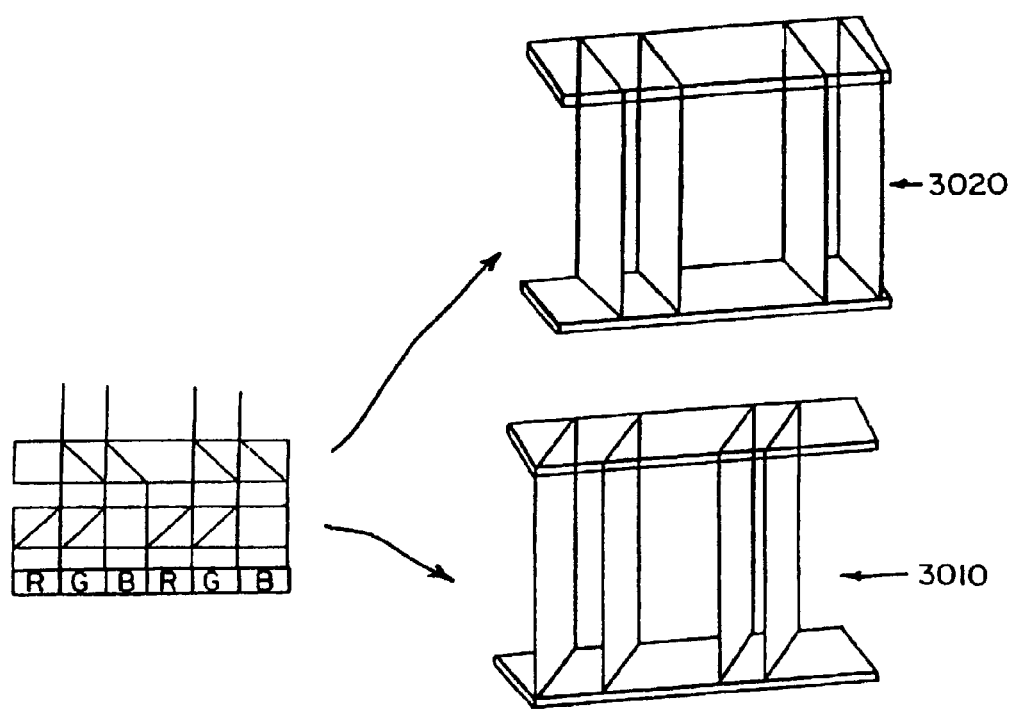
FIG. 30 is a schematic view of a two-mirror system in an alternate embodiment of the electronic image projection system used to superimpose red, green and blue pixel color components creating full-color pixels.

In an alternate embodiment (see FIG. 30), two special mirrors are used. Each mirror has properly mounted 45 degree dichroic mirror sections. The first mirror 3010 reflects red light and transmits blue and green, while the second mirror 3020 reflects blue light and transmits red and green. In the arrangement, red light from red pixel #1 reflects off two red dichroic surfaces upwardly through the second blue dichroic mirror 3020. Green light from green pixel #2 goes straight upwards, passing through both the red and blue dichroic mirrors. Blue light from blue pixel #3 passes through the clear space in the first mirror and reflects off two blue dichroic mirror surfaces in the second mirror, sending it in an upward direction. As before, this arrangement superimposes the light from the red, green and blue pixels into a single beam, creating full-color pixels separated by spaces.

Figure 31:
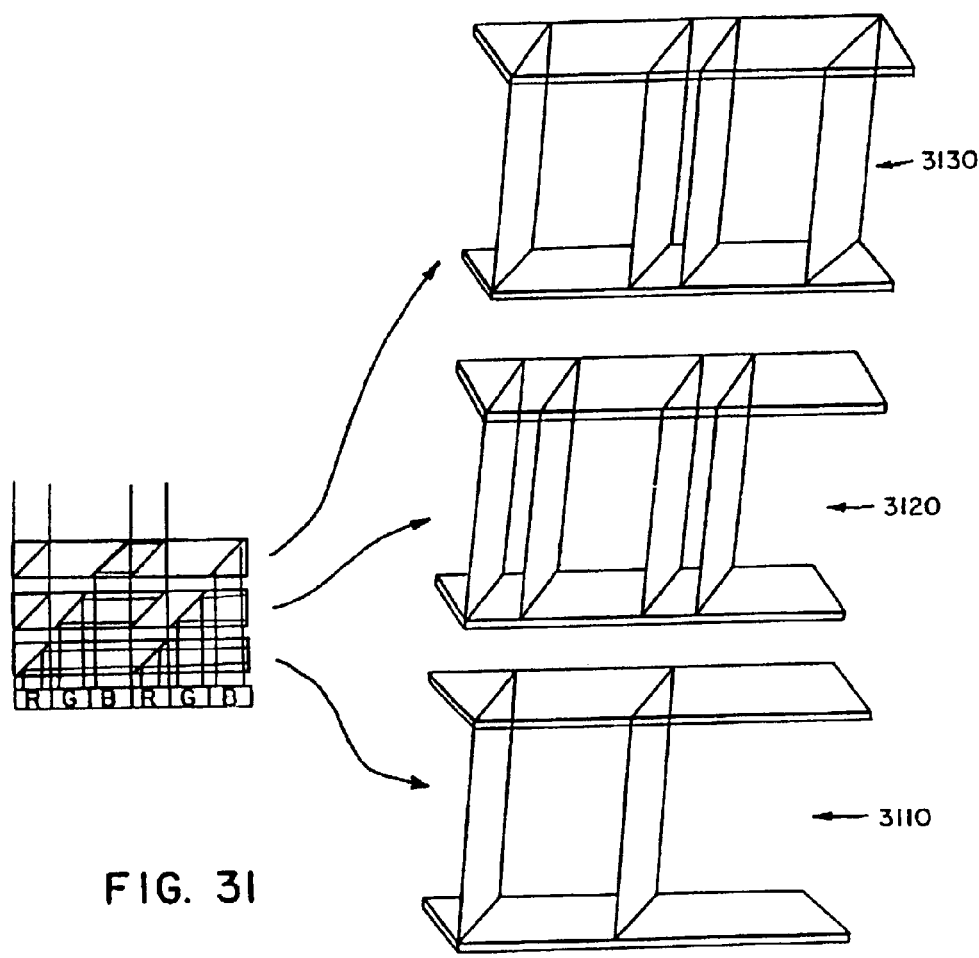
FIG. 31 is a three-mirror system in an alternate embodiment of the electronic image projection system to superimpose red, green and blue pixel color components creating full-color pixels.

Three special "mirrors" (see FIG. 31) are used in another method of creating full-color pixels. Each "mirror" consists of properly placed 45 degree dichroic mirror sections. The first mirror 3110 is a red dichroic mirror, reflecting red light but transmitting green and blue light. The second mirror 3120 is a green dichroic mirror, reflecting green light but transmitting red and blue light, and the third dichroic mirror 3130 is a blue dichroic mirror reflecting blue light but transmitting red and green light. In this arrangement, red light from red pixel #1 reflects off the two red dichroic mirrors 3110 into the upward direction passing through the green and blue dichroic mirrors. Green light from green pixel #2 similarly makes two reflections from green dichroic mirrors 3120 reflecting it in an upwards direction and superimposing on the light from the red pixel. Light from the blue pixel #3 also reflects off two blue dichroic mirrors 3130, upwardly superimposing it on the light from the red and green pixels. Again, full-color pixels are created separated by spaces.

Various other arrangements can be devised, also utilizing dichroic mirrors, to superimpose red, green and blue pixels. As another example, the image, emerging from the projection lens can reflect from two "sandwich" surfaces are separated by a preciser spacing. As an example, the first mirror sandwich can superimpose the red pixels onto the green pixels by the action of a red dichroic mirror (see FIG. 60). The second mirror sandwich can then superimpose the blue pixels on the resulting red and green pixels to form full-color pixels. Large spaces (2 pixels wide) will be formed between resulting full-color pixels which can be eliminated as explained elsewhere herein.

Visibility of red, green and blue pixels could also be eliminated by using a single, relatively low resolution light valve with a "time-share scanning" technique. By dividing time into small segments, each with different data presented to the screen, the eye will integrate the data over time, seeing the sum of the data, as if each different data presentation were being projected simultaneously onto the screen. However, time-sharing of visually-presented data must be done properly or else artifacts, such as flicker and reduced image brightness, will become apparent to the viewer.

As an example, if the light valve is addressed with red information only, and only red light is projected through the light valve during that time, followed by the green and blue images similarly projected, the viewer will perceive a full-color image. However, since a standard video image provides 30 frames per second and since flicker is almost visible to many viewers at this frequency, dividing time into segments as described, would produce 10 images per second for each color, creating a noticeable color flicker. In addition, if a large area is only one color (as often happens in real life), then the entire area will be black for two out of every three time segments, decreasing perceived brightness to one-third and creating a strongly pronounced flicker of the entire area. This problem was studied in great detail in the early days of color television, when CBS attempted to develop their sequential color system, using a spinning color wheel in front of a monochrome CRT. Another problem encountered when using this method is a marked decrease in image brightness, due to another factor. Since, during any given frame, only one color of light is projected on the screen, two-thirds of the light emitted by the source is therefore eliminated from every frame, and thus from the viewed image.

To eliminate these problems, a system can be set-up in the following way. Firstly, the light valve is addressed as a full-color light valve, with pixels arranged in an alternating fashion in which every even row contains the pixels in the order of one red, one green and one blue, repeating throughout the line. Every odd line may contain pixels in the same arrangement, but may be displaced some amount such as one and one-half pixels, with respect to every even line. This creates a more random appearing pixel pattern. For a single segment of time (such as 1/30 of a second) the light valve is addressed in this fashion, and light of the proper colors is sent to each pixel through a mosaic of color filters (as previously described) or by the creation of a matching mosaic of colored light beams, created for instance by multiple dichroic mirrors as described elsewhere, herein. For the next segment of time, the light valve is addressed with all color data addressing shifted by one pixel in a given direction. Simultaneously, the distribution of colored light beams addressing the light valve is shifted to correspond to the new positions of the colored data on the light valve by either moving the color filters or by appropriately vibrating mirrors in the dichroic-colored-reproduction system.

In this embodiment of time-share scanning, pixel #1 of the light valve is addressed with red data corresponding to pixel #1 of the image, for the first segment of time. This produces a red data image in pixel #1 on the screen during that segment of time. In the next segment of time, the color data locations, as well as the arrangement of the colored beams, are shifted so that pixel #1 on the light valve is now displaying the green data from pixel #1 in the original image. This green data from pixel #1 in the original image is now projected onto the same location on the screen that displayed the red data for pixel #1 in the previous time segment. Similarly, the blue data is projected to pixel #1 on the screen in the next time segment, creating the illusion of a full-color image at every pixel location within 1/10 of a second. Any large area, which is one color only, now has one-third of its pixels on with that single color during every time period (such as 1/30 of a second). Thus, the area appears that color all the time instead of being black two-thirds of the time, as explained above.

With this arrangement, at least one of every three pixels sends light to the screen all the time, assuming there is any light in that area in the image. Utilizing the dichroic mirror method (described elsewhere herein) of dividing the light into multiple-colored beams in the proper arrangements eliminates the problem of wasting two-thirds of the bulb's light during any given time segment since all of the light is used in every time segment.

Figure 33:
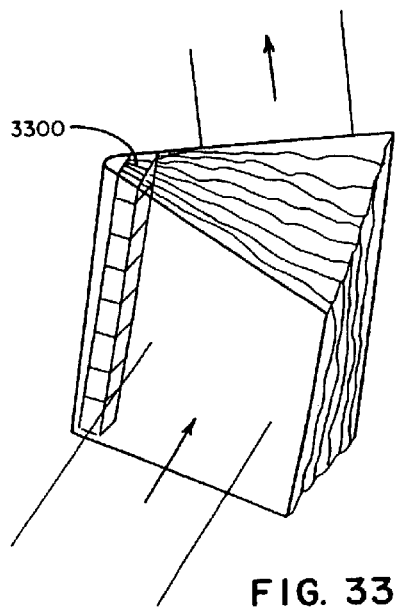
FIG. 33 is a schematic view of an electronically controlled prism for image displacement to be used with the present invention.

As a preferred embodiment of "time share scanning," the light valve can be addressed so that pixel #1 is always addressed with red data, pixel #2 is always addressed with green data, pixel #3 is always addressed with blue data and so on. The illumination is fixed so that pixel #1 is always illuminated by a red beam, pixel #2 is always illuminated by a green beam, pixel #3 is always illuminated by a blue beam, and so on. However, in this embodiment, pixel #1 of the light valve is addressed with red data from pixel #1 of the image in the first time segment and is then addressed with red data from pixel #2 of the image in the second time segment and is then addressed with red data from pixel #3 of the image in the third time segment and then back to red data from pixel #1 of the image, and so on, for all other pixels. The light exiting from the light valve before going to the screen reflects off a mirror. This mirror is oscillated in synchronization with the time segments by an electronically controlled electromagnetic coil or piezo-electric crystal stack on one edge of the mirror. The other edge of the mirror is hinged. Alternatively, reflection from counter-rotating mirrors is used to stabilize the projected image during a given time segment but to shift it for the next time segment. The mirror may also be oscillated with a fluid- or gel filled piezo-electric prism (see FIG. 33) with two faces which are flat and rigid and hinged along one edge. The other three sides of the prism are collapsible. A stack of piezo-electric crystals 3300 inside the prism causes it to change its angle in an oscillating fashion in synchronization with an oscillating current.

The net result in either event will be to shift the image on the screen by one pixel for the second time segment and by another pixel for the third time segment. Each screen pixel will therefore contain red, green and blue information over time, giving the viewer a full-color image with no discernible color pixels anywhere, using a single, low resolution light valve. It should be obvious that other arrangements can be used to accomplish the same ends. This technique creates the perception of three times the resolution of the light valve, or the equivalent of three light valves.

Dead spaces between pixels will be visible whether a "full-color" light valve or multiple "mono-color" light valves are used, especially with the use of an "active matrix." Although such an image may be acceptable in some cases, a better solution is to have all pixels superimposed exactly in triads (red, green and blue together forming "full-color pixels") with spacing between such pixel triads eliminated, creating a "continuous image." In FIG. 4, each pixel 401 is a superposition of a corresponding red, blue and green pixel. 402 represents spaces which need to be filled. The following are methods to eliminate these dead spaces between pixels in the projected image.

Figure 8A:
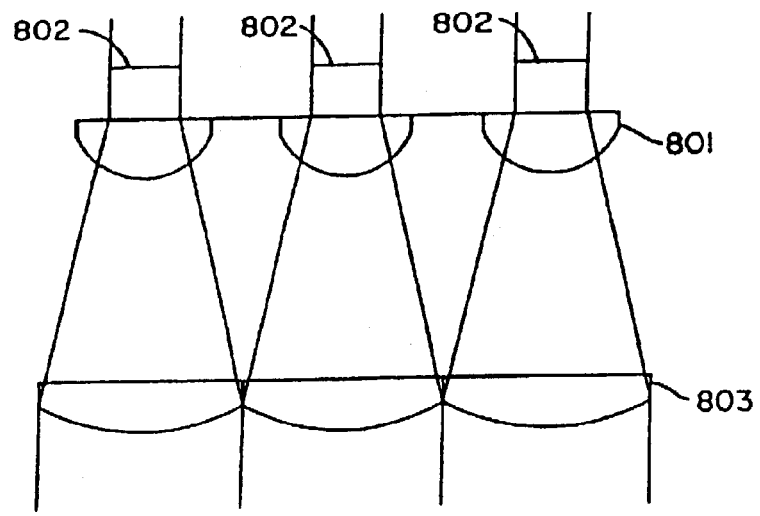
FIGS. 8a and 8b are schematic views of lens-system embodiments of the present invention.
Figure 8B:
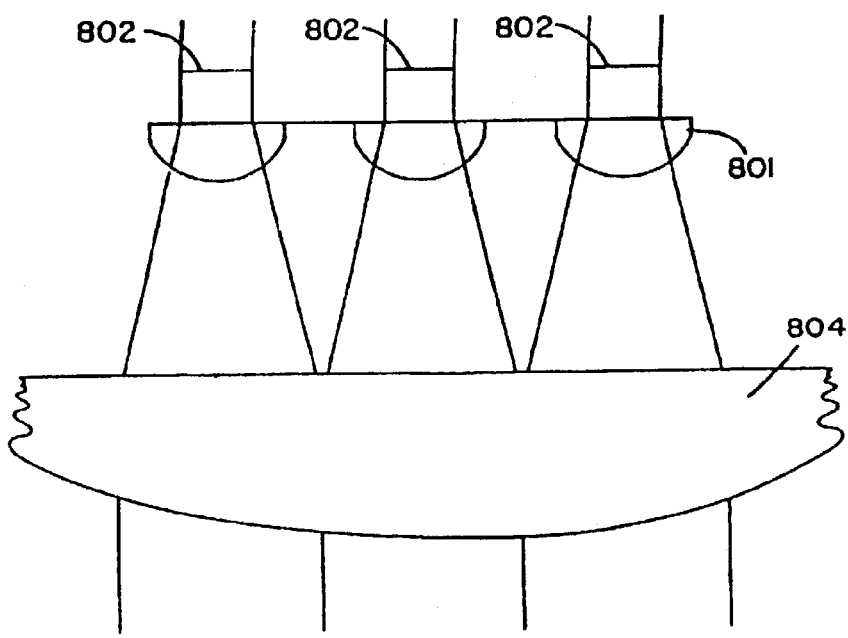

The preferred method of elimination of spaces between full-color pixels (such as are created by the superimposition of the images of three light valves) uses lenses. A lens array 801 (as shown in FIGS. 8*a* and 8*b*) constructed with the same number of lenses as there are "full-color" pixels (e.g., the number of color "triads" on the light values arranged with the center of each lens over each pixel 802) could be used to magnify each pixel as depicted in FIGS. 8*a* and 8*b*. Then optionally either a collimating lens array 803 as depicted in FIG. 8*a* or a large collimating optic 804 as depicted in FIG. 8*b* could be used to recollimate the now enlarged and contiguous pixels for projection by suitable projection optics.

If the spacing between pixels along the vertical is different than along the horizontal dimension, the pixels can be intentionally underfilled with light, forming a symmetrical dot (as explained below) or anamorphic lenses or equivalent could be used to fill the spaces properly. Although fabrication of small lens arrays is within the state of the art, it is simpler and less expensive to use more readily available lenticular lenses. These cylindrical lens arrays can be overlapped with their axes perpendicular to one another to accomplish the same goal. The separation of lens function for each orthogonal dimension eliminates the need for anamorphic lenses which are difficult to produce accurately and consistently in such small sizes.

It is important to note that eliminating the space between pixels utilizing lenses after the pixels (and before the projection lens) can be done with several different approaches. The lenslet curvature and spacing from the light valve can be selected to produce a real or virtual magnified image of the pixel. These real or virtual images can be magnified just the right amount so that they become contiguous at a plane in space. This plane is then imaged onto the screen by the projection lens.

In actual practice, many virtual and real images of the pixels exist at various locations in spaces of different sizes. The projection lens can be accordingly adjusted slightly back or forth to select the pixel image size which just eliminates the inter-pixel spaces without overlap.

If an arrangement is chosen (as described below) in which the source is imaged into each pixel hole, then the distribution of light within a pixel may not be uniform. If it isn't, a repetitive structure will be apparent on the screen, making pixels visible, even if there actually are no spaces between pixels. In that event, the projection lens should not focus an image of the pixel plane or a magnified real or virtual image of its pixels onto the screen. Instead the projection lens can focus an image of the lens array onto the screen. Each lenslet will be uniformly illuminated even if the light distribution within a pixel isn't uniform.

If the lens arrays aren't constructed well enough so that spacing between lenslets approaches zero, a pixel structure would again be apparent. To eliminate that problem, a second lens array could be used to generate a magnified real or virtual image of the lenslets of the first array. Thus the "pixels" would appear uniform and be contiguous.

With a rear projection system built into a cabinet in which the relationship between the projector and the screen will never be altered, it is possible to build in a system to eliminate the space between the pixels right before the screen. A lens array with the same arrangement as the pixels projected from the projector, placed just behind the screen, will expand the image of each pixel just enough to fill the space between the pixels. This lens array can be built into the screen making it a rigid component of the screen.

Sometimes displays are made from a mosaic of smaller displays. For instance, CRTs are assembled in a matrix forming a "video wall" and the video image is segmented electronically so that each monitor displays only a part of the image, with the entire matrix of CRTs together displaying the entire image. Since CRT monitors can only be put so close, there are noticeable spaces between them, creating a disjointed image. This type of display can be depixellated as well, with the individual monitors being considered as the "pixels". The various concepts contained herein can be used here as well. For instance, an array of Fresnel lenses can be placed between the CRT array (with one lens for each CRT) and a rear screen. The CRT images are projected with slight magnification so that the resulting image appears seamless. This can, of course, be applied to a mosaic of LCDs, multiple projected images, etc.

The following is a method for inexpensively making the lens arrays necessary for the elimination of the spaces between pixels as well as for other aims which involves creating a master for making lens arrays. The master can be made by taking a semi-soft material such as copper or wax and scoring it with parallel lines with a tool which has a circular curvature at its end. A spherical lens array master can be made by forming a tool with a surface matching the lens surface desired and repeatedly pressing it into such a soft material in a "step-and-repeat" fashion. This master can then be made into a hard metal master. If the master is made in copper, the copper can be immersed in an electroplating bath, such as nickel sulfamate. If the master is made in a non-conductive material such as wax, it can first be coated with a thin metallic layer of electroless nickel or by spraying with a stannous-chloride silver solution. Once metalized in this fashion, it can then be placed into the electroplating bath. The nickel master can then be placed on an embossing machine and used to emboss replicas into thermoplastic materials, such as mylar and plexiglass. Such a master can also be used as a mold for injection or compression molding.

Another method of producing the master is to use a computer to make a plot in which the height of the lens is represented as a density. This plot, turned into a transparency, can be photo-reduced and replicated by step-and-repeat procedures to produce a mask with a density pattern which matches the lens array layout. The mask can then be imaged with ultraviolet light onto a photoresist plate. The differing densities on the mask will alter the amount that the photoresist is exposed and after development, will alter the amount of photoresist that will be washed away at each location. This will create a photoresist master in the shape of the lens array. This photoresist master can then by metalized and used for replication.

An alternative method to produce such lens arrays for a projection system is to use lens arrays produced holographically. Such holographic lenses are easier to produce than conventional lens machining at such small dimensions, especially if extremely small F numbers are required. State-of-the-art methods can be used to create the necessary interference patterns.

As was done earlier to eliminate the appearance of red, green and blue pixels, a wedge or wedges may be used to create offset images on the screen, both vertically and horizontally to eliminate the spaces between pixels. The wedge or wedge segments may be conveniently placed at the projection lens to fill each space in the image with a duplicate of the adjacent image data, creating a focused, de-pixellated image. This method is an alternate preferred method of eliminating spaces between pixels in the image.

Figure 32:
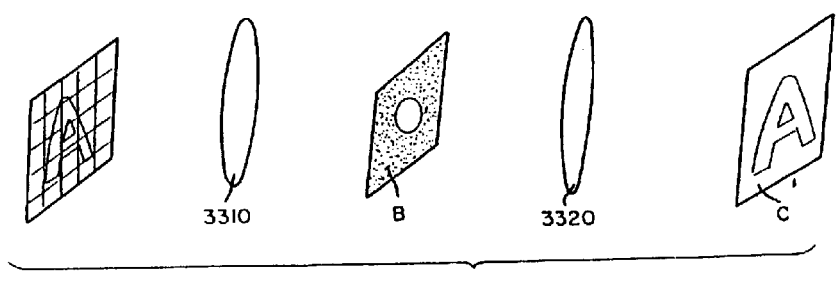
FIG. 32 is a schematic view of the classic method of spatial filtering using a lens to perform Fourier transformation.

Since the spaces between pixels are all horizontal and vertical lines of a fixed width, spatial filtering may be used to eliminate the spaces. The classic method of spatial filtering is demonstrated in FIG. 32. In the input, image A is acted upon by lens 3310, creating a Fourier transform in plane B. Another lens 3320, placed a focal length after plane B, creates a Fourier transform of that transform which is the original image in plane C. If a particular optical filter is placed in plane B, various components of the final image will be eliminated due to the blockage in plane B of the Fourier components. The Fourier components are arranged in a polar coordinate fashion in plane B with the highest spatial frequencies which correspond to the smallest features in the original image located throughout and towards the outside of the Fourier plane. The low spatial frequencies in the image are represented in the central area of the Fourier transform in plane B. Periodic input patterns are represented as localized concentrations of intensities at that frequency in the Fourier plane. Since the thin lines representing the spaces between pixels are high in spatial frequency, they will form large features, located mostly away from the center of the Fourier transform. Therefore, if an appropriate filter is placed in plane B, letting through the lower spatial frequencies, the retransformed image in plane C will have greatly diminished, or, if the filter is selected properly, eliminated higher spatial frequencies (corresponding to the lines between pixels).

Since all pixels have the same spatial frequency in a given direction, which is different from the higher spatial frequency of the lines between them, those lines can be separated out and suppressed. The image plane A is analogous to the light valve plane in the projector and the lens performing the Fourier transform is analogous to the projection lens. Somewhere in front of the projection lens will therefore be an approximation of a Fourier transform of the image on the light valve. Even though no second lens is used to re-transform the image after a certain distance, a re-transform will occur anyway (at the focused image on the screen), making a final lens unnecessary. All that is necessary in actual operation is therefore the placement of an appropriate filter somewhere after the projection lens. Since the spatial frequency of the line pattern is known, state-of-the-art methods can be used to form a Fourier filter to block out the desired spatial frequency components. The larger the difference between the width of the pixels and the width of the spaces between pixels, the more efficient this spatial filtering process will be. As the widths approach each other, the process will become less effective.

Alternatively, if a lens is placed between the light valve and the projection lens, the light can be made to come to a small focus within the projector. A pinhole can be placed at the focus, allowing most of the light to pass through. Passage of light through a re-transforming lens also placed before the projection lens will create a focused image in space minus the high spatial frequencies of the image from the light valve plane. If the projection lens is then made to focus on that image, most of the light can be projected onto the screen without lines between the pixels.

Another method of obtaining a brighter image is to use a holographic phase filter beyond the projection lens, constructed in ways that are known in the state-of-the-art either with varying thickness material or a hologram properly laid out. This will still accomplish spatial filtering but will allow more of the light to pass through to the screen.

Figure 6:
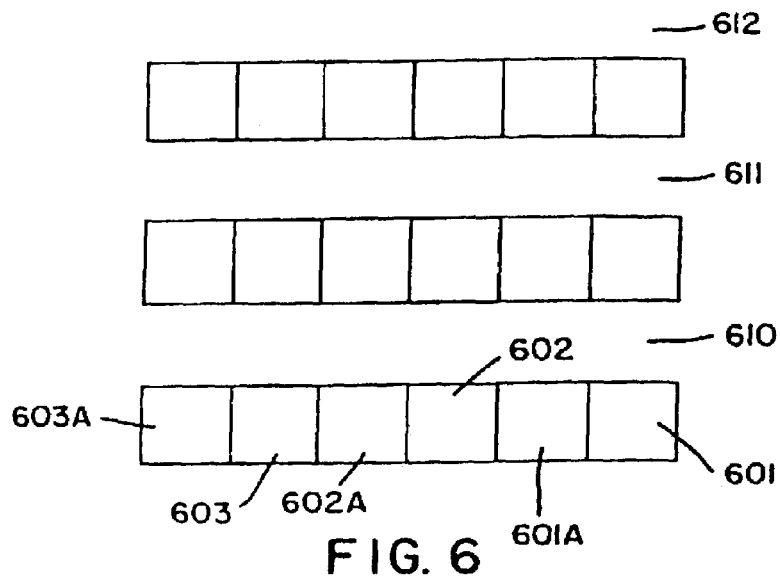
FIG. 6 is a schematic view depicting the filling of spaces between pixels by the first two-mirrors (a "striped-mirror pair") of the four-mirror system of FIG. 5.

An alternate method of filling the spaces between pixels is by the use of mirrors. To make a mirror system that duplicates the pixels in the proper places with minimum waste of light, a special "striped-mirror system" can be used. One such configuration is shown in FIG. 5. Light containing full-color image information 501 (laid out as indicated in FIG. 4) hits a "striped-mirror pair" labeled as 502 and 503. This causes the entire image to be duplicated and shifted horizontally the width of one pixel with approximately one-half the brightness of the original image (which is also reduced to one half of its original brightness), filling the spaces between pixels in the horizontal rows as shown by FIG. 6. Vertical rows 601A, 602A, and 603A are duplications of vertical rows 601, 602, and 603, respectively. The combined (original and duplicated) image existing in space 504 of FIG. 5 then passes through a second "striped-mirror pair" 505 and 506, which duplicates the image but shifts it vertically the height of one pixel. This produces two images of equal brightness, one above the other, filling in the horizontal rows indicated in FIG. 6 as 610, 611, and 612. Thus, a "solid" image is created with no blank spaces. Elimination of blank or dead spaces, separately colored pixels, and thus the distinction between pixels, subjectively improves image resolution even above today's CRT images at close range since CRTs have discernible lines, pixels and spaces.

Figure 7:
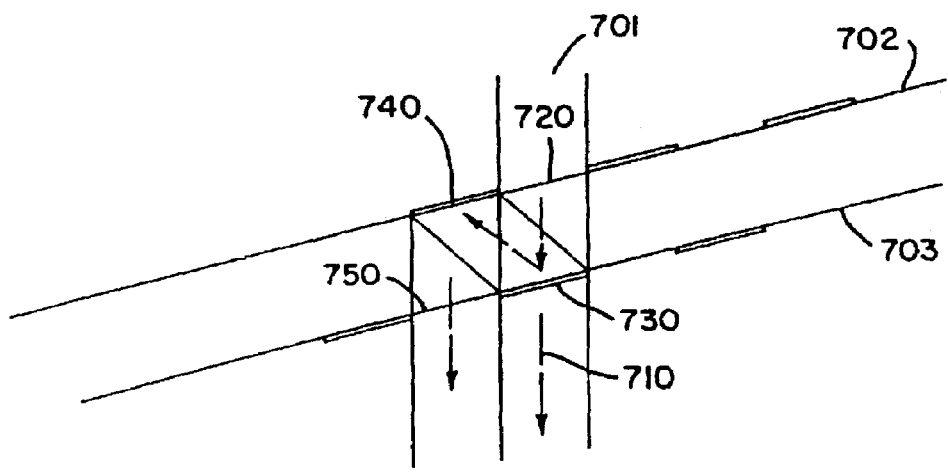
FIG. 7 is an enlarged schematic view of a "striped-mirror pair" of the four-mirror system of FIG. 5.

A "striped-mirror pair" is better understood by reviewing FIG. 7. Light from a single pixel 701 impinges upon a "clear" space 720 on the first mirror 702 of the mirror pair. This first mirror is made of glass, plastic or other suitable material which is AR coated over the visible spectrum and coated on its opposite side in stripes of a suitable reflective material such as aluminum or silver. The striped coating may be accomplished by, for instance, vacuum deposition with a "striped mask over the glass." Alternatively, the glass can be coated with photoresist and exposed to a projected image of stripes of the desired size. After development, the glass will be exposed for metal vacuum deposition only in the desired stripes. After deposition, the remaining resist could be peeled off or dissolved away, leaving the required clear stripes.

The second mirror 703 of the pair also has alternating clear and reflective stripes. On this mirror however, the reflective coating is thinner, creating partial mirrors instead of full mirrors. The percentage of reflectivity is adjusted so that the two pixel images which emerge are of equal brightness.

Light from pixel 701, after passing through space 720, impinges on partial mirror 730, creating a transmitted beam 710 and a reflected beam which hits mirrored surface 740 on first mirror 702. This reflects light through clear space 750 on mirror 703 creating a second beam 710a which is an exact duplicate of beam 710, except that it is contiguously displaced from beam 710. If the spacing between pixels is not equal to the dimensions of a pixel, the mirrored areas 740 on mirror 702, as well as clear spaces 750 on mirror 703, may be adjusted to the dimensions of the space between pixels.

The overhead view of FIG. 5 shows that "striped-mirror pair" 502, 503, which has vertical stripes, is tilted with reference to beam 501 around a "vertical tilt axis" to create a horizontally displaced duplicate image and a "striped-mirror pair" 505, 506, which has horizontal stripes, tilted around a "horizontal tilt axis" (which is perpendicular to the tilt axis of the first "striped-mirror pair" and to the beam 501) to create a vertically displaced duplicate image.

Arrangements which break up a white collimated beam into colored collimated beams, as well as configurations which combine multi-colored collimated beams into a single collimated white beam are reversible and can be used on either side of a light valve to make full use of all light in the beam, illuminate a monochromatic light valve with the properly colored beams, recombine the colored beams to form full-color images without individually discernible color pixels and produce an image which is continuous, having no spaces between the pixels.

Figure 3:
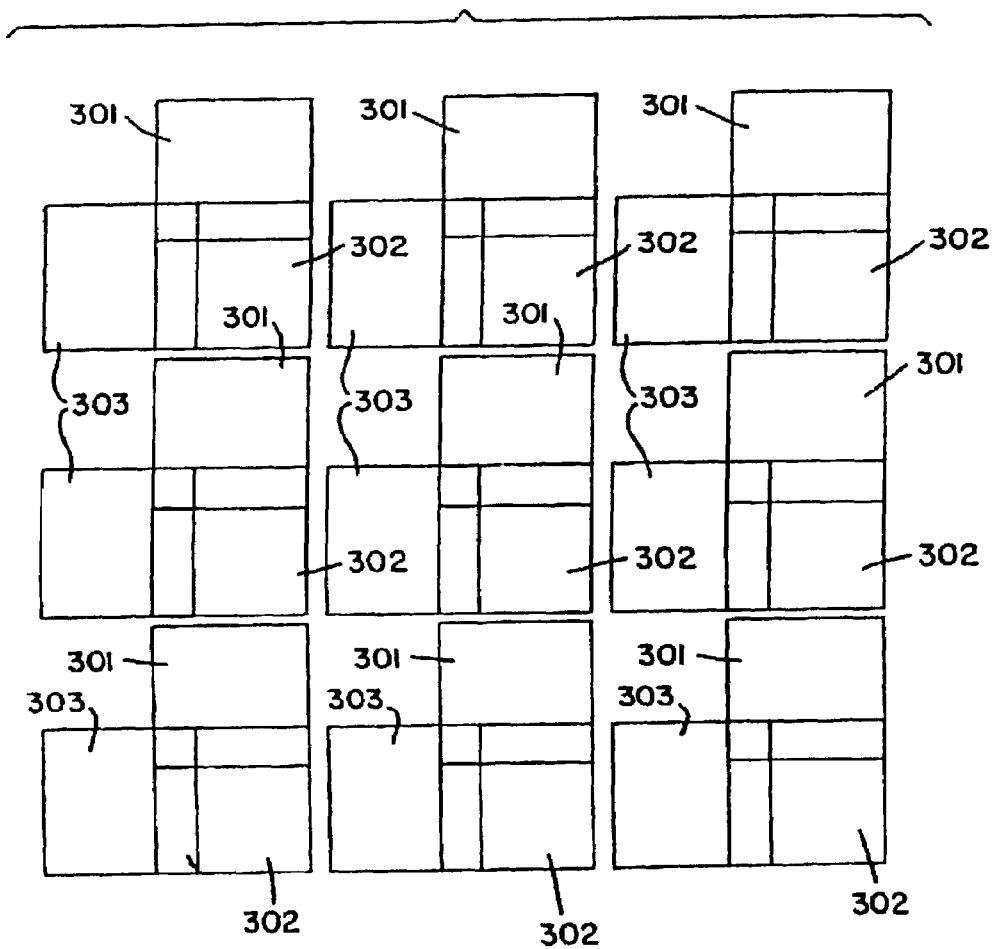
FIG. 3 is a schematic view of various pixels with reduced spaces between them.

The use of time multiplexing, as previously explained, can be used to fill dead spaces between pixels with duplicate pixels to create a "continuous" image. The three color images can be slightly offset to somewhat fill the spaces between pixels. FIG. 3, for example, shows blue pixel 301 slightly higher than red pixel 302 and green pixel 303 slightly to the left of each red pixel 302. Many other arrangements of offsets of the different colored pixels are possible to decrease black spaces in the image; however, the individual colors remain visible at close range.

To produce a good quality color image, it is important to have as high a resolution as possible, as well as to superimpose red, green and blue pixels on one another to eliminate the appearance of individual color pixels and to eliminate spaces between pixels. Whether accomplishing this with three optical paths and three light valves or by dividing up a single light valve with a large number of pixels into 3 sections to produce the 3 color images, the cost is higher and the system consumes more space and weight than a simple single light valve system. However, a single light valve doesn't have the resolution of three light valves. It is therefore desirable to devise methods which produce a high quality, high resolution image without the added cost, complexity, weight and size increase as stated above.

Obviously, increasing the number of pixels in a light valve will increase the resolution of the image. Two or more projectors used to project contiguous images can produce an image with higher resolution than can be produced by a single projector using available light valves. Alternatively, a single projector can be made which essentially contains the components of several projectors but with the contiguous images produced side-by-side within the projector so that the composite image can be projected with a single projection lens. This will eliminate the need for alignment of externally placed projectors and will produce a higher resolution than is capable of being produced by a single light valve system.

Regardless of the relationship between the lines of pixels with respect to the placement of color dots within them, if any grouping of three colored pixels of the light valve is used to form a color triad representing the color of a particular point of the scene displayed, then the resolution capability of the LCD is reduced by a factor of 3. This resolution limitation can be reduced, however, if each pixel of the light valve, being either red, green, or blue, is driven by a signal that corresponds to that light valve pixel's color at that point in the original scene, and the data about the remaining two color values at that point in the original scene is simply discarded. The eye will tend to blend the color contributions of neighboring pixels to produce the correct color for that area of the scene, but retain the capability to distinguish detail as fine as the actual pixel spacing.

"Time-share scanning" (described herein) can be applied to create a high resolution image with a lower resolution light valve. For instance, an image can be projected having a space between every two pixels, along each horizontal line equal to the width of a pixel. This can be accomplished, for instance, by fabricating the light valve that way or by using lenslet arrays to appropriately change the size of each pixel. Thus, if a light valve is capable of, for instance, 500 pixels on a horizontal line, the resolution can be doubled to 1000 by time-share scanning. One-half of the time can be used to project an image from the light valve as it exists onto the screen, while the other half of the time can be used to project an image of intermediate pixels onto the screen, giving the image twice the resolution of the light valve in that direction. Unlike other time multiplexing schemes, no decrease in brightness is created since each segment of time projects all of the light from the light source onto the screen and thus all of the light from the light source is visible to the viewer at all times. This technique could also be used to double resolution in the vertical direction creating, for instance, a high definition image from a standard resolution light valve.

The systems disclosed in this application can use discrete and individually addressed and maintained pixels. This approach provides the basis for true digital television. Presently both audio and video signals are digitized and stored as digital bits on laser disks and "CDs." This digitization preserves the exact values of the signal from micro-second to micro-second. Distortions in the systems, such as amplifier noise and non-linearity, scratches, dropout and other defects on the recording material and so on can be completely ignored by a system looking only at each bit to see if it is on or off, i.e., a "0" off or a "1," and not caring if it varies in strength or clarity. This will result in more precise, higher quality television and video display. The upcoming thrust toward High Definition Television should move the field toward this type of a digital display device as the system of choice. In summary, the present invention makes possible a viable basis for implementation of digital and High Definition TV, regardless of the format convention selected.

Use of digital processing makes it easy to eliminate the problems inherent in today's video systems such as ghosts, chroma crawl, moire patterns, snow and cross-talk between chrominance and luminance signals. It also makes the creation of additional pixels in the receiver by interpolation between any two pixels possible, thus creating the appearance of even higher resolution in the receiver than is actually transmitted. It also makes special features very easy to implement such as picture in picture, zooming, frame freezing, image enhancement, special effects and so on.

All electronic image production systems, whose images are made of a finite number of pixels, have an artifact which becomes more noticeable as the number of pixels in the image decreases. This artifact is often referred to as jaggies or aliasing. When a diagonal line, such as a boundary between two different features, is presented in the image, the line becomes jagged, as if it were a staircase, since the pixels are usually square with their edges parallel and perpendicular to the horizon. To reduce the noticeability of these jagged boundaries, known anti-aliasing techniques can be implemented, especially if used in a digital system, since it is already computerized. When a boundary is detected between two areas of different brightness values and/or different color values, a calculation can be performed to find the average brightness and color between the two values. Then, making all pixels along the boundary that new value will create a transition between the boundaries that is much harder to see, thereby reducing the appearance of a jagged edge.

The image brightness which can be produced by a projection system is in part dependent on the bulb brightness. This generally means that for more brightness, a higher wattage bulb should be used. The bulb wattage that can be used in many environments is, however, limited. A home projector shouldn't draw more than about 5 amps which corresponds to about 600 watts. A higher wattage projector becomes very expensive to operate and discharges a great deal of heat. It is therefore desirable to use a bulb which has as high an efficiency, measured in lumens produced per watt consumed, as possible. The best light source uses a microwave stimulated plasma. This type of bulb, currently in prototype form, can produce up to 130 lumens per watt. Other sources which can be used include Xe, Hg and metal halide bulbs which can produce from 75 to 95 lumens per watt. Tungsten halogen bulbs can produce as much as 40 lumens per watt and regular tungsten can produce up to 25 lumens per watt.

Figure 37:
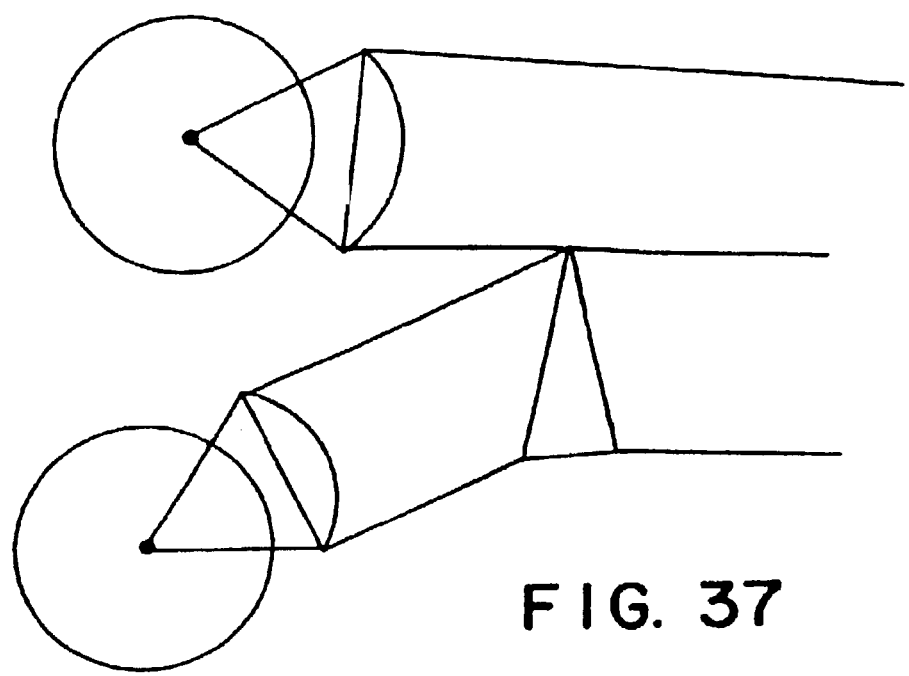
FIG. 37 depicts a schematic view of a section of the electronic image projection system in which two light sources are used whose beams are collimated and made continuous by the use of a prism.
Figure 38:
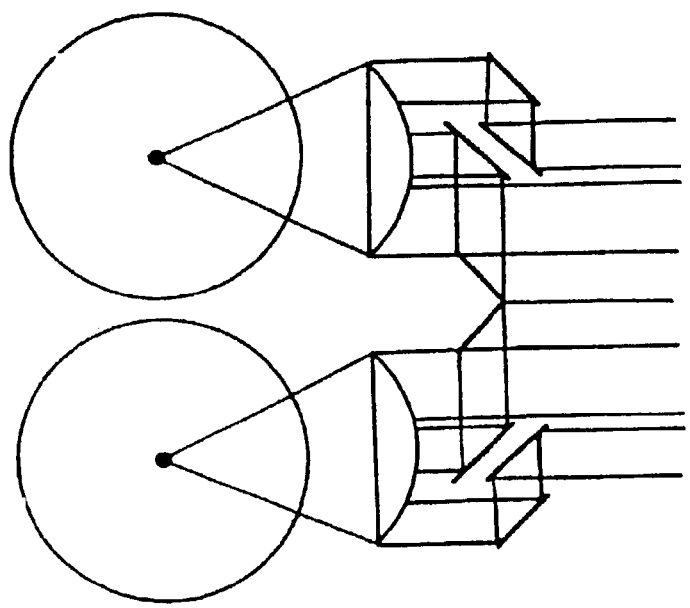
FIG. 38 is a schematic view of a section of the electronic image projection system in which light from two collimated beams is redistributed by the use of mirrors to produce a single beam with a Gaussian-like distribution that would be found in a single beam.
Figure 45:
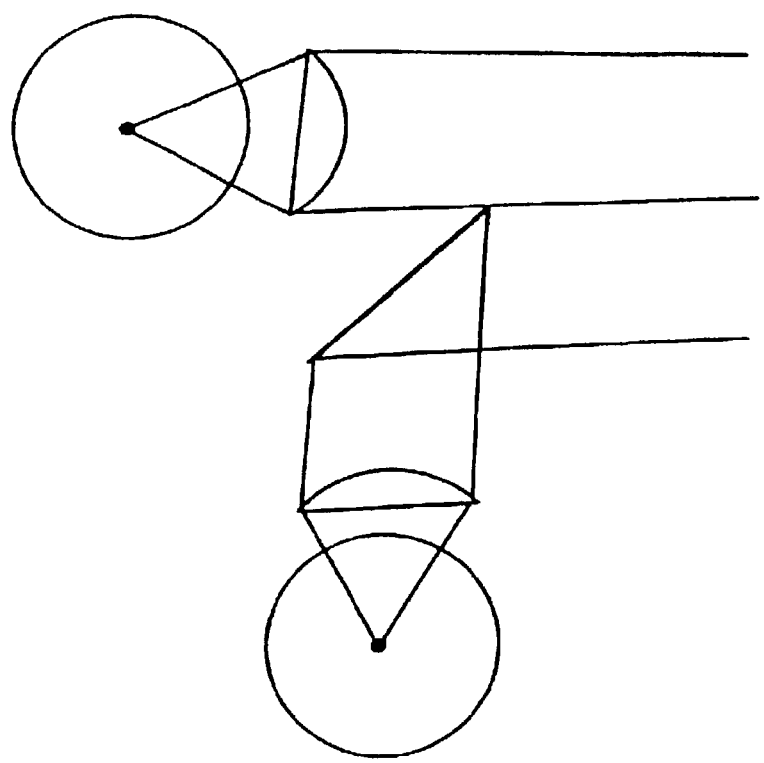
FIG. 45 is a schematic view of a section of the electronic image projection system in which two collimated beams are made contiguous by the use of a mirror.

Instead of using a high powered bulb with a large filament or arc, two or more bulbs of lower wattage and smaller filaments or arcs can be used. Using multiple lamps presents several advantages. If a lamp should burn out, the system would only diminish in brightness, operating with the remaining lamp(s) until the lamp is replaced. Each bulb, being of lower wattage, can have a much longer lifetime, and a smaller filament or arc can make focusing an image of the source into the pixel hole easier. Various methods can be used to combine the beams for use. FIG. 37 illustrates one example in which two light sources are collimated and made contiguous by the use of a prism. FIG. 45 shows how a mirror can be used to make 2 collimated beams contiguous. Another method of eliminating space between separate beams is the use of mirrors to take light from one part of a beam and use it to fill in spaces between beams. An example of this is illustrated in FIG. 38.

As can be seen from the figure, the light from the two sources can be rearranged in this way to form what appears to be one Gaussian beam. Obviously, a different number of mirrors can be used and light deviators other than mirrors, such as prisms, can also be used. This technique can also be utilized on several beams at once or on a single beam to alter beam profile characteristics, such as rendering a Gaussian or an irregular beam profile more uniform. This is especially useful to get rid of weak or dead spots, holes, or hot spots in a beam.

Figure 77:
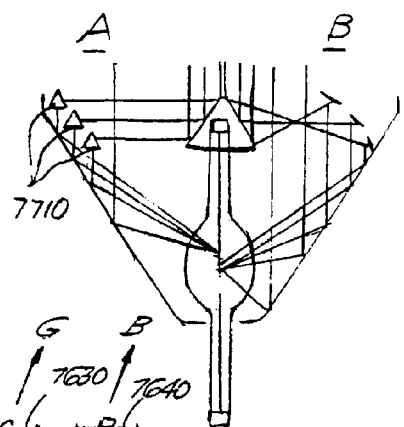
FIGS. 77A and 77B is a schematic view depicting light from a source rearranged to fill in weak or dead spots in a beam.

Other examples of set-ups to accomplish this are depicted in FIG. 77. In this diagram, it is assumed that a beam is used that has a hole in the middle, such as might be formed by an axial source which radiates at plus or minus, for instance, 60 degrees to the normal of the optical axis at the arc or filament.

Parts A and B of FIG. 77 show alternate arrangements in which flat or curved annular mirrors 7710 (the mirrors in A work by total internal reflection) reflect light form the outer portion of the beam to a central conical or axiconical reflective element. This light then reflects forward, filling the hole in the beam. The intensity of the light filling the hole can be adjusted by altering the size of the annular mirrors, the slope angle of the conical reflector, the curvature (if any) of the annular and conical surfaces (which imparts a lens function to the light), and light divergence or convergence.

Figure 43:
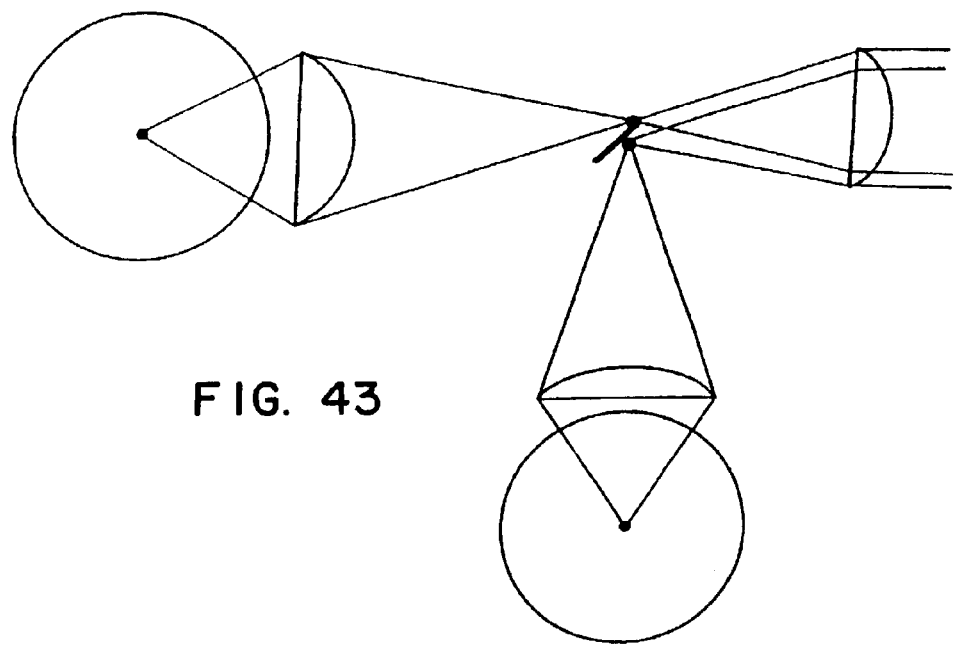
FIG. 43 is a schematic view of a section of the electronic image projection system in which separate light beams are caused to become a single light beam by bringing the beams to separate foci and using a mirror to redirect one of the beams so that the two beams become collinear.

Alternatively, the beams can be made to come to a focus at an area in space so that the filament or arc images abut one another, forming a new composite light source. By the use of mirrors, these point sources can be made to propagate in the same direction, making it easy to collect with a single condenser lens to form a single collimated light beam containing most of the light originally captured. An example of this is shown in FIG. 43.

Normally, combining two beams produces a beam that is either the combined width of the two beams or one that has the combined divergence of the two beams (or a combination of the two), as required by the LaGrange invariant. However, two beams can be combined into one beam with no change in beam width or beam divergence, with the resulting beam being either randomly or linearly polarized as desired, by using one of the following arrangements.

Figure 83A:
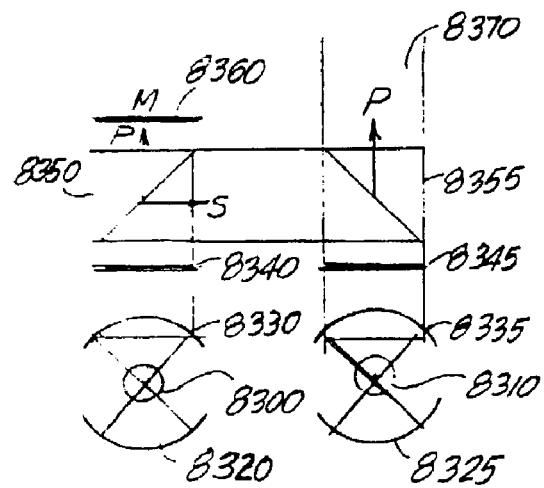
FIGS. 83A and 83B depict an embodiment showing how light from two sources can be combined to produce one linearly polarized beam.
Figure 83B:
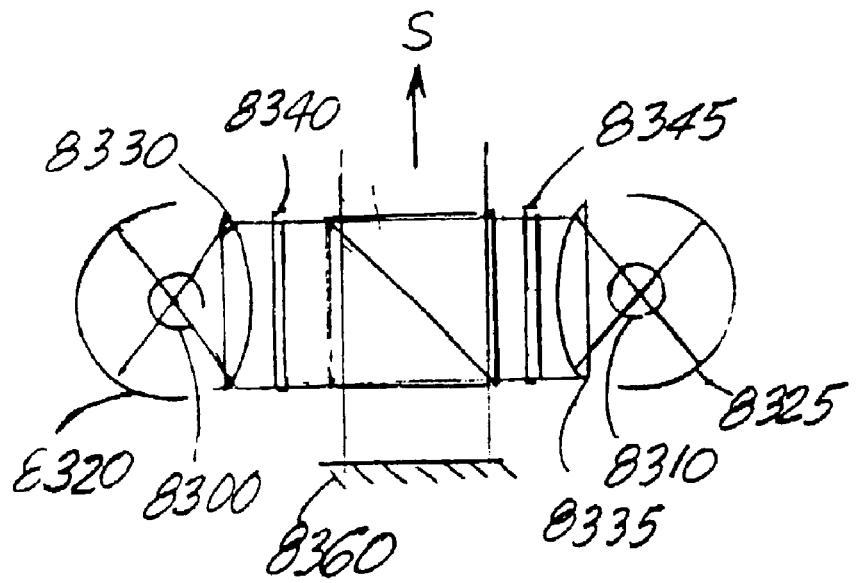

FIG. 83A shows how the light from two sources can be combined to produce one linearly polarized beam. 8300 and 8310 are two independent randomly polarized white light sources. 8320 and 8325 are spherical reflectors. 8330 and 8335 are collimating lenses. 8340 and 8345 are quarter-wave plates. 8350 and 8355 are MacNeille polarizers. 8360 is a first-surface mirror. Output beam 8370 is linearly polarized. An alternate embodiment is depicted in FIG. 83B with only one MacNeille polarizer.

Figure 84A:
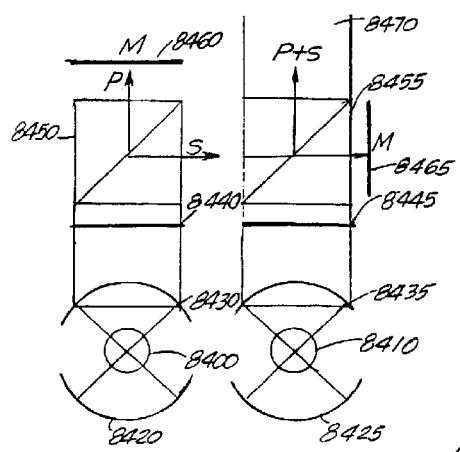
FIGS. 84A and 84B depict an embodiment showing how light from two sources can be combined to produce one randomly polarized beam.
Figure 84B:
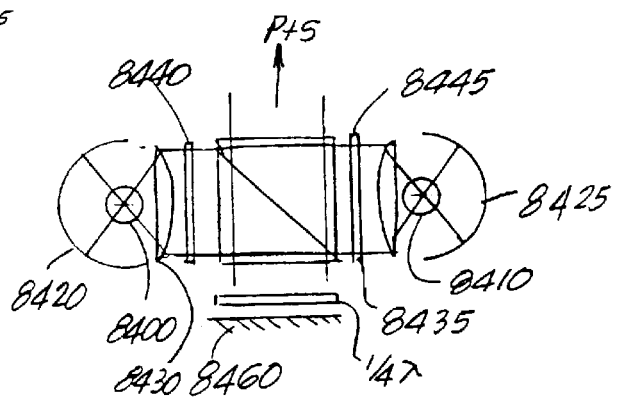

In FIG. 84A, the arrangement is the same as in FIG. 83A except for the addition of first-surface mirror 8465 and the reversal in orientation of the MacNeille polarizer 8455. In this case, the output beam 8470 is randomly polarized. An alternate embodiment is depicted in FIG. 84B using only one MacNeille polarizer.

These set-ups can be cascaded several times allowing for the combination of beams from a large number of sources, producing a single randomly or linearly polarized beam with the same width and divergence as the beam from a single source.

The accuracy of reproduced color depends on several factors. With the use of properly selected color filters or dichroic mirrors, correction for wavelength versus light valve cavity thickness versus voltage, as described above, and normal Gamma correction and other normal TV color circuitry, the fidelity of color reproduction is still limited by the color makeup (i.e., color temperature) of the light passing through the projection system. Incandescent lighting, although simple and inexpensive, produces a low color temperature, resulting in a "reddened" image, while discharge lamps, such as metal halide, xenon, mercury and especially microwave driven plasma (which provides constant brightness and color temperature even with tens of thousands of hours of operation) produce higher color temperature with more realistic whites and colors. However these lamps have the drawbacks of being more expensive, have bigger and heavier power supplies and are often more difficult and dangerous to use and replace. Realistic colors can be produced with the use of incandescent sources if a color-temperature-compensating filter is used. At the expense of some brightness, the entire color spectrum can be shifted towards the blue, producing more realistic whites and colors. The advantages of using an incandescent source are that they are rugged, inexpensive, safe and easy to replace and need a small power supply or no power supply at all.

A number of approaches might be taken to extend the life of the light source. The microwave stimulated plasma bulb for example has virtually an unlimited lifetime, and is thus best for eliminating bulb replacement.

To extend the life of a filament bulb, circuitry could be used to run the filament on smoothed DC. Furthermore, the circuit could ramp up the voltage slowly whenever the lamp is turned on to reduce shock due to rapid heating and filament motion.

For an incandescent bulb to have the highest efficiency as well as high color temperature, it is necessary for it to have a tightly wound filament which runs on relatively low voltage and high amperage. This would normally necessitate the use of a large and heavy step-down transformer. To eliminate this burden, a triac circuit can be used to chop up the duty cycle, utilizing only part of each cycle. Selecting the proper duty cycle will provide the filament with the reduced voltage that it requires. A feedback circuit can also be included to monitor line voltage and to adjust the duty cycle to compensate for line voltage changes so that a constant reduced voltage is fed to the filament.

The projection systems described herein have brightness limitations due to low efficiency at various points in the system. Various methods can be used to increase the efficiency at these points and thereby the overall efficiency and brightness of the projector can be dramatically increased.

AR coating of all optical components significantly increases throughput since approximately 4% is lost without it at every surface. Since there are many surfaces in a video projection system, a significant amount of light can be lost if this is not used. However, AR coating is done in a vacuum chamber, making the process expensive and time consuming, with a limitation of how many pieces can be coated at a time. In addition, some components can't be easily coated at all, such as LCDs. To remedy these limitations, sheets or a roll of material such as mylar, cronar, polyester, or other clear material can be AR coated for later use. When needed, such material can be attached to all optical surfaces with, for instance, an index-matching pressure-sensitive adhesive. Since such a material can be easily cut, it can be made to conform to oddly shaped and angled surfaces.

Another way to provide an AR coating without a vacuum, is with the use of holography. By controlling the angles between interfering beams of at least 90 degrees, a multilayer interference pattern, resembling a vacuum-coated multi-layer dielectric coating, can be produced quickly. Such holograms will thus act to suppress reflections and can be adhered to surfaces of optical components. Alternatively, holographic emulsions, such as photopolymers which require simple, non-wet processing, can be coated directly onto optical components and then exposed and processed.

One problem common to all projection systems is the efficiency of the light collection optics. Usually, only a small percentage of the light produced by a bulb is actually collected and utilized in the projection system. To further improve the efficiency of the system, various methods can be used to increase the amount of light that is captured from the bulb for use in projection. In the prior art, a light source, such as a filament or arc, is positioned with a condenser lens, such as an aspheric condenser, in front of the source with a spherical mirror behind it. This arrangement is used in most projectors and captures some of the rearward and forward propagating light. The majority of the light, however, propagates to the sides, upwards and downwards and is wasted.

Figure 42:
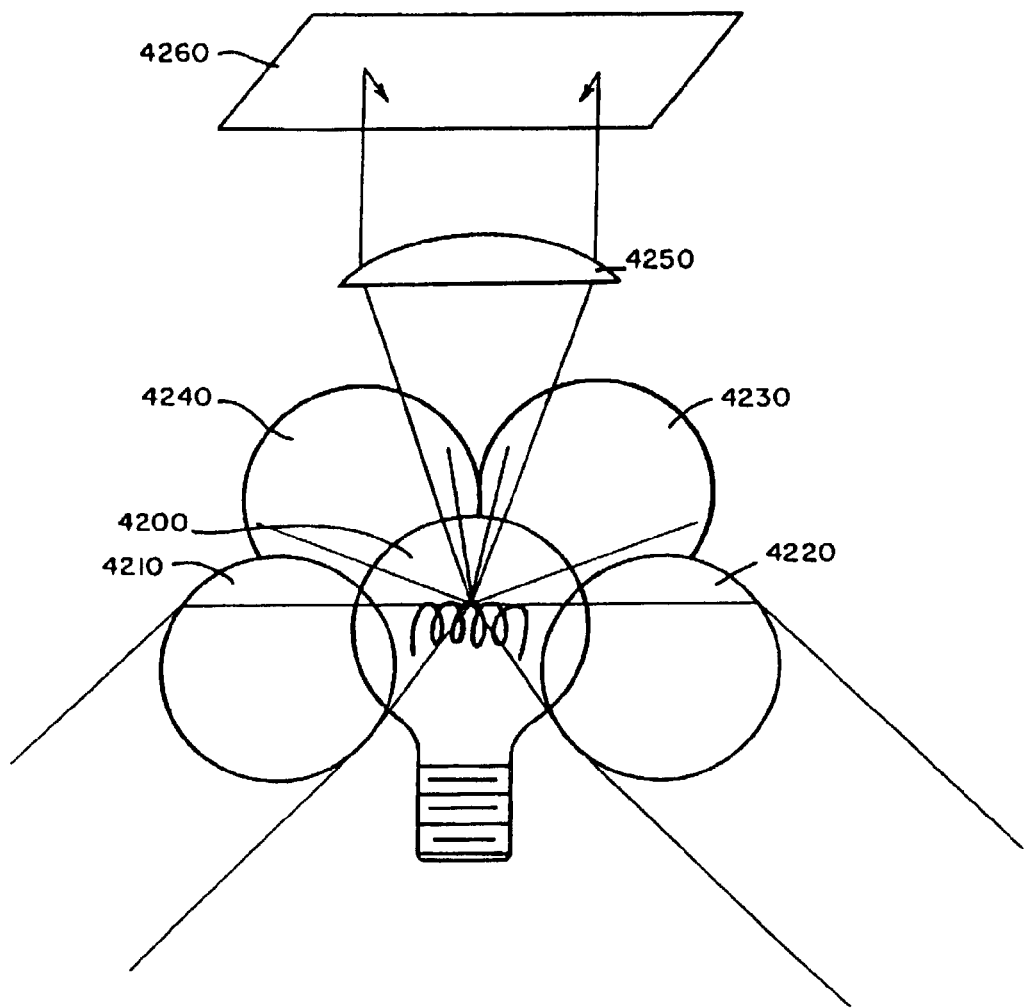
FIG. 42 is a schematic view of a segment of the electronic image projection system in which multiple condenser paths are used to capture more light from a light source for use in projection.

A preferred method of utilizing this normally wasted light is the use of multiple condenser paths as shown in FIG. 42. Two condenser lenses 4210 and 4220 and two spherical mirrors 4230 and 4240 will capture twice as much light emanating from a bulb 4200 as in the conventional system. In all bulbs today, light traveling in one direction can never be utilized since one side of the bulb is used to connect power into the bulb to the arc or filament. Light from the remaining (upwards) direction can be captured by an additional condenser lens 4250 and reflected by a mirror 4260 into the system. The beams can be joined into a single beam using the methods described elsewhere herein.

Figure 39:
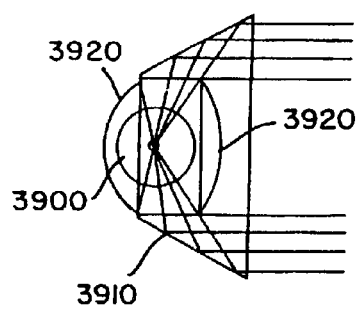
FIG. 39 is a schematic view of a section of the electronic image projection system in which a parabolic reflector is used in conjunction with a conventional spherical reflector and condenser lens to capture more light for use in projection.
Figure 40:
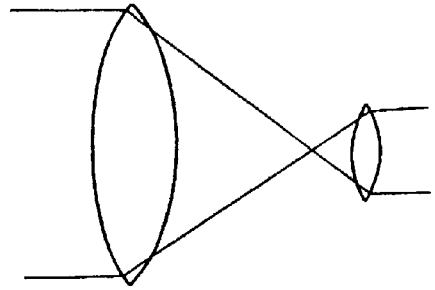
FIG. 40 is a schematic view of a Galilean telescope which may be used to reduce a collimated beam diameter to a smaller collimated beam.

Another method to utilize this otherwise wasted light is to place a section of a parabolic reflector 3910 around the lamp 3900 in a conventional condenser set-up 3920 as shown in FIG. 39. Light that would otherwise be unused is now collimated and sent forward to join light emerging from the condenser lens. To reduce the size of the resulting collimated beam, which will probably be necessary in most applications, various optical methods may be used, such as the Keplerian telescope made of two lenses, as depicted in FIG. 40.

Figure 41:
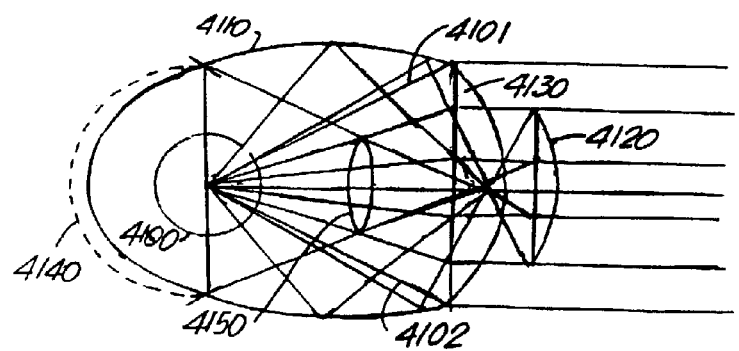
FIG. 41 is a schematic view of an alternate embodiment of a section of the electronic image projection system in which an elliptical mirror is used in conjunction with two collimating lenses to capture and use otherwise lost light.

Another method used to capture more light from a bulb is depicted in FIG. 41. In this arrangement, a source 4100 is placed at one focus of an elliptical mirror 4110. Any light which hits this reflector will be focused to the second focus of the ellipse where it can be captured for collimation, for instance, by a condenser lens 4120 with a low F number. However, light which misses the reflector (4101 and 4102), except for light on axis, is lost. This light can be utilized by placing a collimating lens 4130 at the second focus. This lens will collimate light that would miss the second focus, but will have almost no effect on the light going to the second focus. Lens 4150 can be used to bring near-on-axis light to focus at the second focus of the ellipse for collimation by lens 4120. The left-most portion of the ellipse can be replaced by a spherical mirror 4140 for better overall system collimation.

Figure 46:
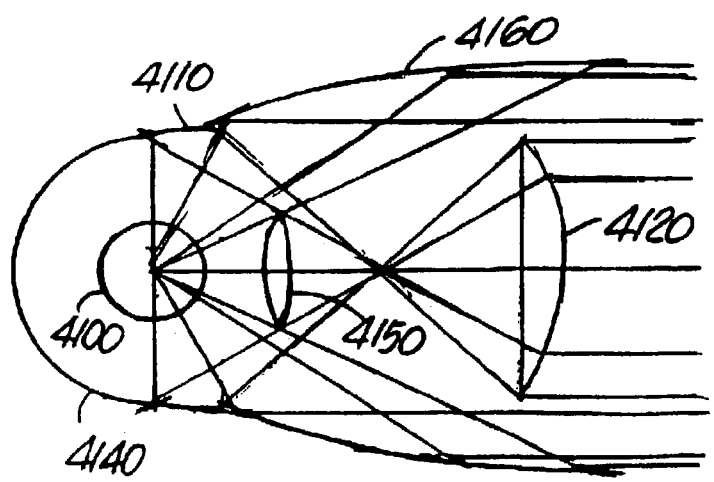
FIG. 46 is a schematic view of an alternate embodiment of a section of the electronic image projection system in which a parabolic surface is used to capture and collimate light that misses an elliptical reflector in a light collection system.

Alternatively, a section of a parabola 4160 can be used to capture and collimate that otherwise lost light. Lens 4150 and optional spherical mirror 4140 behave the same way here as they do in FIG. 41. This can be seen in FIG. 46.

Figure 50:
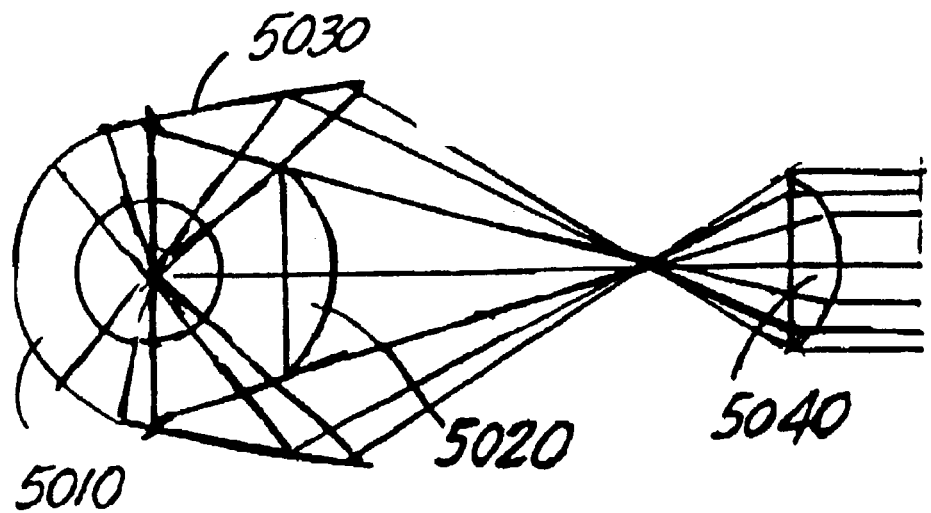
FIG. 50 is a schematic view of an alternate embodiment of a section of the electronic image projection system in which a section of an elliptical reflector is used to capture light that is not captured by a spherical reflector and a condenser lens to bring the light to a focus at the same point at which the aspheric condenser lens brings light to focus for use in projection.

An alternate method of using an elliptical surface efficiently is depicted in FIG. 50. In this set-up a spherical mirror 5010 makes rearward going light into forward going light. A lens 5020 captures forward going light and brings it to a focus. A surrounding elliptical surface 5030 captures light which misses both the spherical reflector and the focusing lens and brings it to the focus of the focusing lens. At this point light can be gathered from the focal point and collimated by a single lens 5040.

Collection systems which capture light from wide angles, such as those disclosed herein, generally have large apertures. This leads to a large collimated beam. As pointed out herein, such a beam can be reduced in diameter, for instance, by a telescope arrangement where the output lens has a shorter focal length than the input lens. This reduction of beam diameter is accomplished with an increase of angles of non-collimated rays within the beam. This results in a restriction of how long the internal optical path of the projection system can be before light spreads so much that it doesn't get into the projection lens.

Several measures can be taken to condition the light to allow for an increased internal path length if one is desired for a particular system design.

Figure 51:
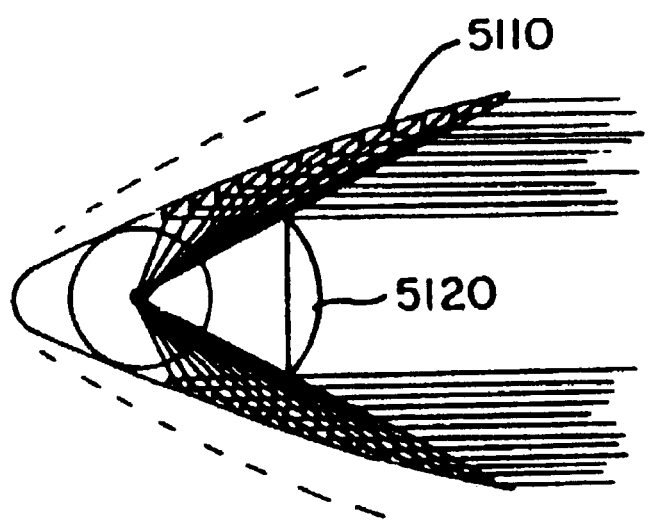
FIG. 51 is a schematic view of an element of the electronic image projection system referred to as a Fresnel parabolic reflector.

A preferred method of dealing with this limitation is depicted in FIG. 51. This method is accomplished by generating a reflector surface which will be referred to herein as a Fresnel Parabolic Reflector. (The same logic can be used to produce other surfaces such as a Fresnel Elliptical Reflector and so on.)

By assembling segments of a parabola (dashed curve), an equivalent parabola 5110 can be constructed with a narrow opening (solid need not bus, the collimated beam need not be reduced much, if at all. Thereby, angles are not increased and collimation length is left longer.

An alternate approach to this limitation is to use the idea used in fiber optic cables. In such a cable, light can travel a long distance but, because of continued low/loss internal reflections, the beam diameter does not increase until the end of the "tunnel," which in our system can be where the light valve is placed. Light tunnels can be used to obtain several important advantages in display systems such as obtaining more uniform illumination of the image forming element and the shaping of the light beam to conform to the shape of the IFE. Multiple tunnels can be used if multiple light valves are used. Such a tunnel can be made of mirrored surfaces instead of fibers and can take various shapes such as square, rectangular or circular.

The tunnel can also be expanding or contracting, so that input and output beams can be different sizes with different divergences. Solid materials, such as glass and plastic, will perform as a mirror tunnel by utilizing total internal reflection. A mirror tunnel can be the same size, bigger, or smaller than the image-forming element, and as long as desired, and still deliver a major portion of the light to the image-forming element placed after the output of the tunnel. As the tunnel gets smaller in cross-section or longer, the number of reflections much of the light undergoes before leaving the tunnel increases. Unless the surfaces are highly reflective (such as 95-99%), significant light could be lost. An advantage to multiple reflections is that the light becomes more homogeneous or "scrambled" at the output of the tunnel due to the multiple reflections. This results in a more uniform beam at the output of the tunnel than at the input, which is especially useful when a beam has "holes", hot spots, or other non-uniformities. A long tunnel can be "folded" by the use of reflectors, prisms, or other re-directing elements between tunnels to produce a more compact system, while the overall tunnel length can be long. The image-forming element can be placed at the output of the tunnel or, alternatively, the output of the tunnel can be focussed onto the image-forming element putting this more uniform illumination at the image-forming element. Further, matching the shape of the tunnel, and especially its output aperture shape (these do not both have to be the same) to that of the image-forming element can cause the light to fill the image-forming element. This approach will minimize "spillover loss", which is found in all conventional projection systems in which a circular beam illuminates a rectangular aperture. This results in major gain in system efficiency and, thus, brightness.

Figure 67A:
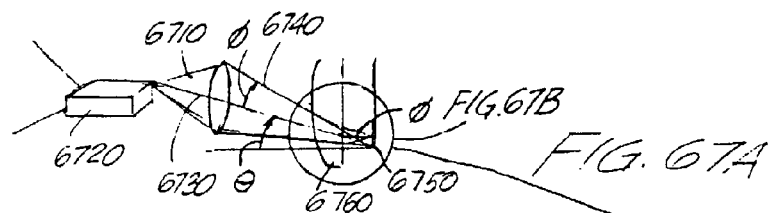
FIGS. 67A and 67B depict the path light takes through a projection display system embodiment using a light tunnel.
Figure 67B:
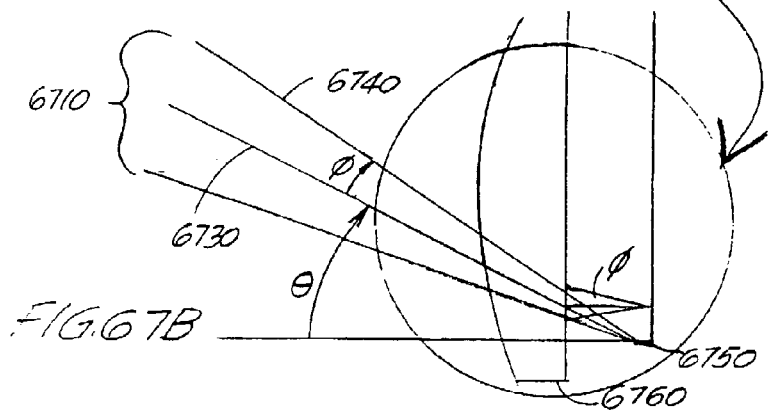

Placing a field lens just before the image-forming element reduces the divergence angles (and, thus, increases collimation) of the light illuminating the image-forming element. This is shown in FIGS. 67A and B. In 67A, light 6710 coming from the top of the tunnel 6720 illuminates the image-forming element (IFE) 6750 such that the central ray 6730 of the light bundle 6710 makes an angle .theta. with the optical axis of the IFE. The most extreme ray 6740 makes an angle .phi. with this central ray 6730, making the most extreme ray that hits the IFE an angle of .theta.+.phi. with the optical axis of the IFE. Using a field lens 6760 as shown in 67B, bends light bundle 6710 (as well as all others) so that its central ray 6730 becomes parallel with the optical axis of the IFE. Now the largest angle any light ray makes with the optical axis of the IFE is just .phi.

This results in brightness uniformity across the entire image since all rays illuminating the IFE, no matter which lens array element they go through, will illuminate the array element with the same cone angle with respect to the normal to the IFE. Thus, all light gets through each pixel hole, regardless of where on the IFE it is, since each lens array element is illuminated with a light cone that falls within its acceptance angle.

The non-imaging concentrator optics can be used to further reduce the beam diameter, essentially allowing for the optical reduction of the size of the light source. This will allow for the use of a brighter bulb, with a larger arc or filament. The concentrator optics, normally used to concentrate light for solar collectors, can concentrate the light to a smaller area than the original arc or filament. This will allow for greater collimation and, thus, permit more light into a longer path system. One name commonly used to describe such a concentrator is a "compound parabolic concentrator" although the reflective surface actually has hyperbolic walls. The two currently known designs for non-imaging concentrators, originating in the 1960s, are referred to as "edge-ray" concentrators and "geometric vector-flux" concentrators.

Figure 68:
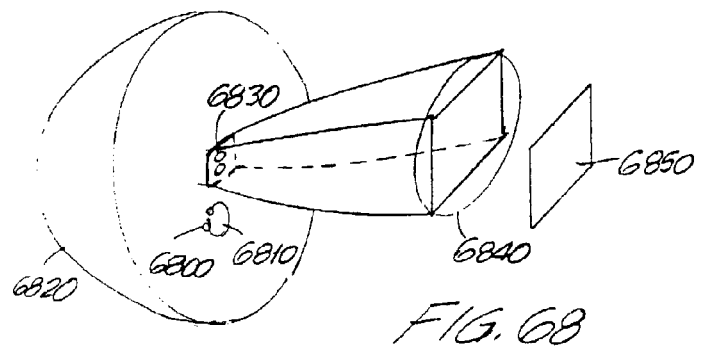
FIG. 68 depicts a non-imaging concentrator and spherical mirrors to create a collimated beam of light to illuminate an image forming element.

Such a concentrator can also be made with sides that are flat in one plane. As an example, a concentrator with four sides that are flat in one plane is shown in FIG. 68.

A concentrator can also be used to produce a uniform collimated beam. As the concentrator expands, the light beam expands due to reflection from a sloping surface, decreasing its divergence and increasing its collimation. Although this can also be done with a circularly symmetric concentrator, using one with sides that are flat in one dimension produces a beam with a profile that matches the aspect ratio of the IFE. This is shown in FIG. 68 where a source 6800 has a spherical reflector 6810 behind it to reimage the rearward going light as a second light source image formed at or near the actual arc or filament of the bulb. Large spherical mirror 6820 images these sources into the mouth of the concentrator 6830. After the concentrator, lens 6840 helps increase the collimation of the light which then illuminates the IFE 6850, which may have input lens array(s) in front of it.

To further increase the amount of light that gets into the projection lens and thus, reaches the screen, the distance from the light valve(s) to the projection lens must be kept to a minimum (so non-collimated light gets into the projection lens). To accomplish this the focal length and F number of the projection lens should be kept to a minimum.

Light efficiency of projection systems in general is strongly affected by the degree of collimation of the light in the system. The less collimated the light, the less of it that can make it all the way through the system. This is especially true the more elements there are in the system. The brightness enhancement techniques listed herein, such as input lens arrays, dielectric polarizers and color dispersing elements such as holograms, binary optics, or prisms, become increasingly ineffective as collimation decreases. Consequently, to take advantage of these brightness enhancement techniques and make the brightest and most efficient projector possible, a sufficient degree of collimation must be present in the light within the projector.

Properly colored laser sources could be used as the source in such a projector for the highest degree of collimation, since efficient diode lasers with high power have become available. Speckle can be cancelled by known methods such as a rotating phase plate or stationary multifrequency phase plate.

Unfortunately, to make an incoherent source brighter, after choosing a high conversion efficiency material (such as metal halide) and after making the arc (or filament, if one is used) as compact as possible, the only thing that can be done is to make the source draw a higher wattage, which necessitates increasing overall arc or filament size. However, the larger the source size, the less the light can be collimated, and the less of it that can get through the optical system. This would appear to put an upper limit on how bright a given system can be, regardless of wattage.

A further increase in brightness can be achieved, however, by optimizing light collimation and a system's ability to use it in the following unique way.

The smaller a source appears to a collimating optical element (such as a lens or a parabolic reflector) the more collimated the light will be. This means putting the source further from the collimating optic, using a larger optic, and thus producing a larger collimated beam. Thus, any source, whatever its size, can be highly collimated to virtually any divergence/convergence tolerance, at the expense of space and the making of a larger beam. At first analysis, this would seem useless as soon as the collimated beam size exceeds the size of the light valve or other image-forming element to be illuminated. However, this excess light can be utilized if it is redirected, while still maintaining collimation, into the image-forming element with an element such as a prism (or prisms). This gets more light through the system at the expense of creating a lower F number requirement for the projection lens, which in many cases is acceptable and worth the tradeoff to create a much brighter image.

For example, consider a system which uses a pixel based LCD as the image-forming element. Current active matrix LCDs have aperture ratios of only 25%-45%. A typical pixel size is 60 microns on a side with a pitch of 120 microns. Using an input lens array, as described elsewhere herein, will help only with highly collimated light. Typical glass thickness in an active matrix LCD is 1.1 mm. Considering an index of refraction of about 1.53, this gives an acceptance angle of about 5°, the acceptance angle being an angle at which light falling on the image forming element will pass through the transparent apertures of the pixels rather than being blocked by the opaque pixel borders. (Light hitting a lens element at 10°, for instance, will be mainly focussed onto an opaque area of the LCD, which can cause more local heating and damage than if no lens was present. Assuming a 4" diagonal LCD with an aperture ratio of 25%, a typical metal halide arc of about 150 watts, which would be about 4 or 5 mm long, would be collimated by a reflector of similar size to a divergence of about 10°. Mainly due to the Gaussian distribution of the energy in the beam, placing a larger proportion of the light energy within the acceptance angle of the input lens array, some enhancement (perhaps up to a 50% increase) in light throughput could be achieved by using an input lens array.

However, using a larger, (longer focal length) reflector, having, e.g. 8-9 inches in diameter, would bring collimation up such that most of the light would be concentrated within a 5° divergence. Virtually all of the light that fell directly on the LCD would be focussed through the pixel holes by the input lens array.

Using prisms around the periphery of the beam, bending it back to the LCD, can get virtually all the light into the aperture window of the LCD. Even though this light enters the lens elements at angles above the 5° acceptance angle, the light will get through for the following reason.

Figure 55:
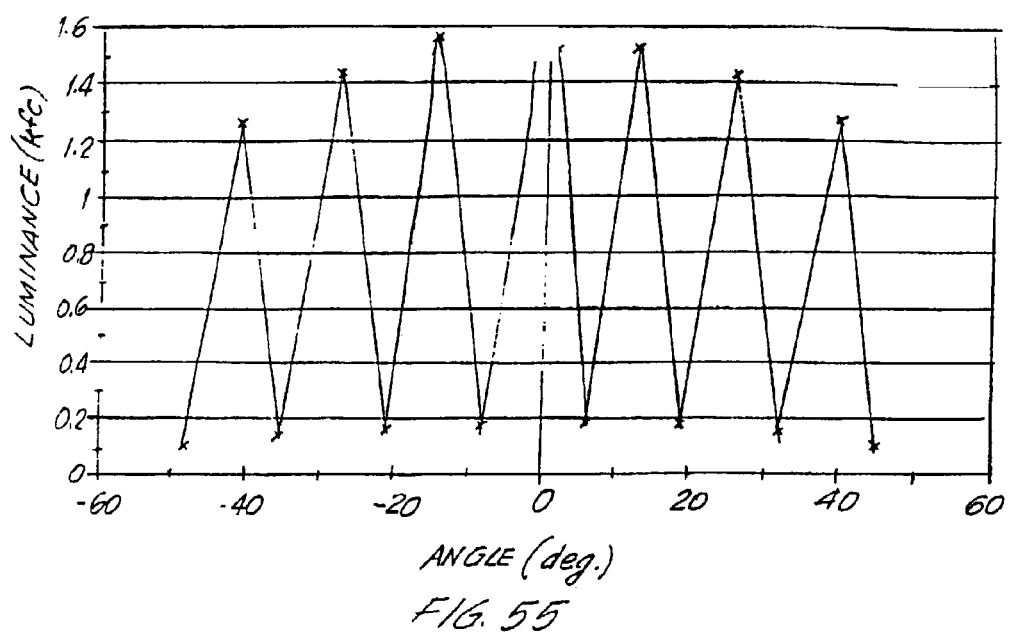
FIG. 55 is a plot of the intensity of transmitted light through an LCD with an input lens array as the LCD is rotated on a vertical axis.

The distance between the lens array and the pixel holes (1.1 mm in glass or 0.7 mm air equivalent) is much larger than the pixel spacing (typically around 100 microns or less). Thus, there are several angles at which the LCD can be illuminated which will have approximately a 5° acceptance angle. Light focussed by a lenslet (after hitting the lenslet at the right angle), instead of entering the pixel hole behind it, enters the next pixel over. FIG. 55 shows the intensity of transmitted light through an LCD with an input lens array as the LCD is rotated on a vertical axis. Utilizing a typical LCD, rotating through 84° provides 7 transmission peaks (approximately every 12°), each with approximately a 5° acceptance angle.

The larger the filament used, the greater the beam must be expanded to provide the equivalent degree of collimation. A second set of prisms can be used to divert light outside a 9" circle to the LCD at a higher angle, corresponding to the next transmission peak angle. Thus, in this example, light can be expanded to a circle with a diameter of up to 15 inches, for instance, with all light still getting through an LCD that is only 3 inches wide. Any larger size would most probably be impractical because the F number of the projection lens would be lower than practicable (and the projector would become objectionably large and expensive). A larger LCD and/or one with thinner walls would make it easier to get more light through.

In a typical video LCD, every other horizontal row is offset from the previous row by the width of one and one half pixels to provide a more random looking pixel pattern. This means that the peaks obtained by rotating the LCD about a horizontal axis are further apart than those obtained by rotating about a vertical axis. If the horizontal pixel pitch equals the vertical pixel pitch, the peaks would be twice as far apart rotating about a horizontal axis as they are rotating about a vertical axis.

Light coming toward the LCD from above and below the LCD could be diverted up or down by two pixel rows (twice the angle) or it can instead be diverted up or down to the next row and then diverted with a second prism horizontally half a pixel. Various configurations are obviously possible. Thus, an input lens array element may focus light into a pixel hole which is located horizontally or vertically next to the pixel directly in line with the input lens array element, or into a pixel hole which is displaced both vertically or horizontally from the pixel hole directly in line with the input lens array element by one or more pixels. The illuminated, by the input lens array element, pixel hole can be vertically displaced by one pixel and horizontally displaced by one and one-half pixels from directly in line pixel hole. The illuminated pixel can also be displaced by two pixels vertically and three pixels horizontally or by one pixel vertically and one-half pixel horizontally from the directly in line pixel.

In addition to making most light in a projection system usable, especially in conjunction with other brightness enhancement techniques that work best with collimated light, this method has the following two other major advantages.

First, light source—collector combinations often create non-uniform illumination, with intensity variations across the image plane as well as color variations being visible. This technique superimposes several beams (usually nine) from different parts of the source on top of one another, allowing for better color and brightness mixing, and thus, more uniform illumination. Prism angles, and distances between prisms and the image-forming element can be altered to shift hot spots and more evenly fill in "holes" to optimize resulting illumination uniformity.

Figure 57:
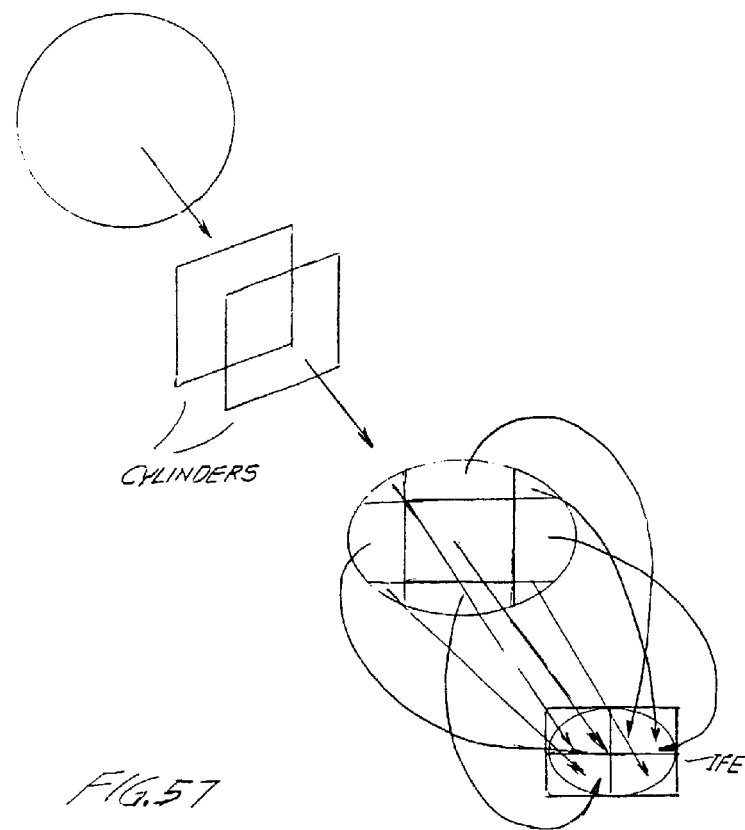
FIG. 57 is a schematic depiction of how a large circular beam of light can be mapped onto a rectangular image forming element.

Secondly, illumination systems typically gather light from a source and provide a circular beam. Most image sources, on the other hand, produce rectangular pictures. To fully illuminate the image in a conventional projector, the rectangular image must be circumscribed by the circle of light such that the diameter of the circle must be at least as large as the diagonal of the rectangle. This can result in the loss of up to approximately 40% of the light. The technique just described folds all the light into the image without that loss. Again, proper choice of collimated beam diameter, prism angles, and distance of prisms to image source can provide the most even illumination. To allow the light from a circular beam to more evenly illuminate a rectangular aperture, a pair of cylindrical lenses can be used to more closely match the aspect ratio of the image-forming element. FIG. 57 depicts an example of how the different parts of a circular beam can be overlaid onto a rectangular image to achieve efficient and uniform illumination.

Figure 58A:
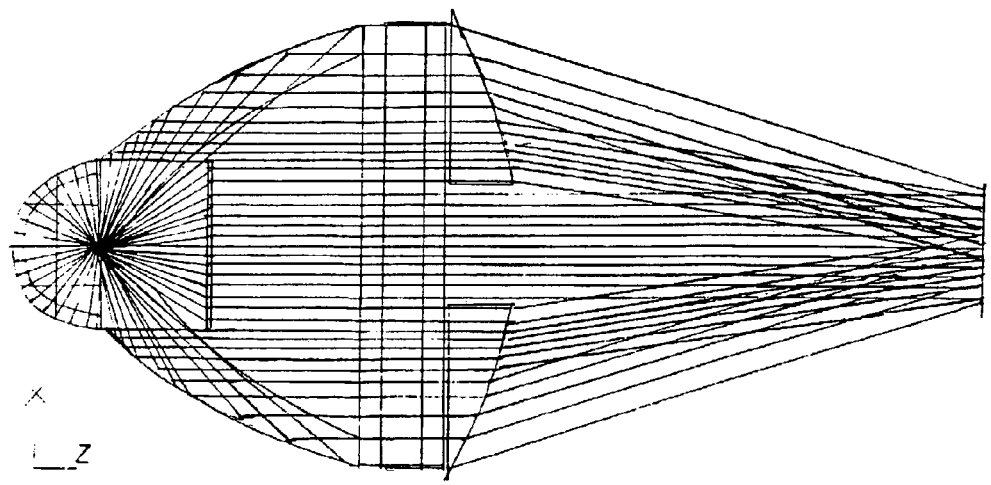
FIGS. 58A and 58B are top and side views depicting the use of efficient composite collector to gather majority of light from a uniform radiating source and prisms to fold sections of the collimated beam into the image forming element.
Figure 58B:
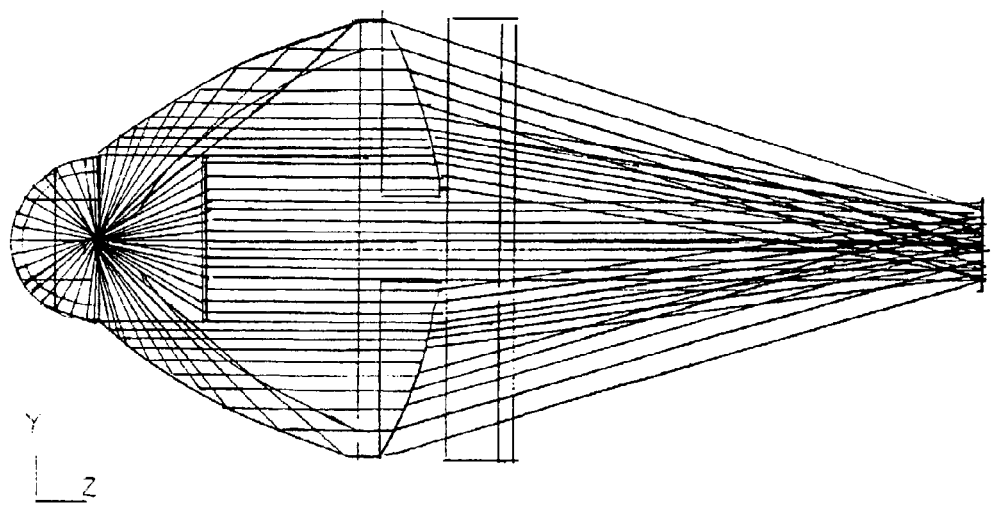

Using the highly efficient composite collector depicted in FIG. 39 to gather the majority of light coming from a uniformly radiating source, an example of this configuration is shown in top view in FIG. 58A and side view in FIG. 58B. In both figures the projection lens, located beyond the image-forming element, is not shown.

Fresnel prisms can be used instead of standard prisms to save space, weight and cost.

Figure 59A:
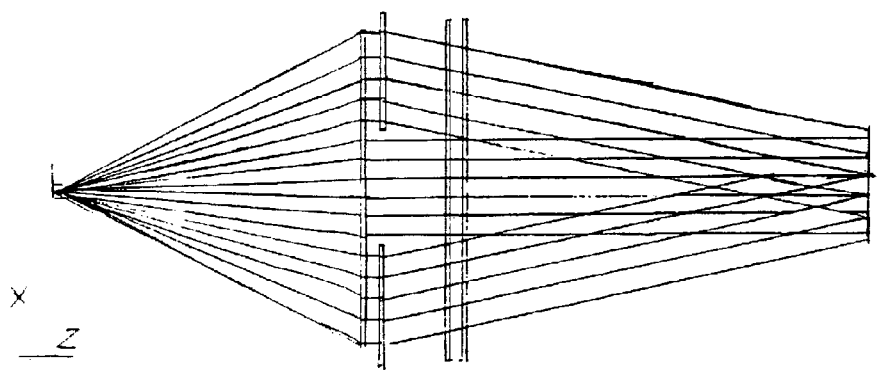
FIGS. 59A and 59B schematically depict light emanating from a point which is collimated by a Fresnel lens and folded by Fresnel prisms into an image forming element.
Figure 59B:
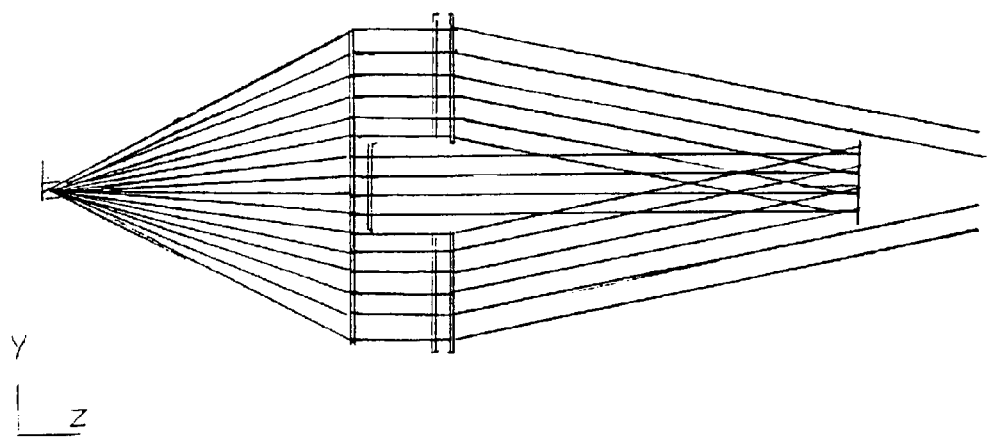
Figure 60B:
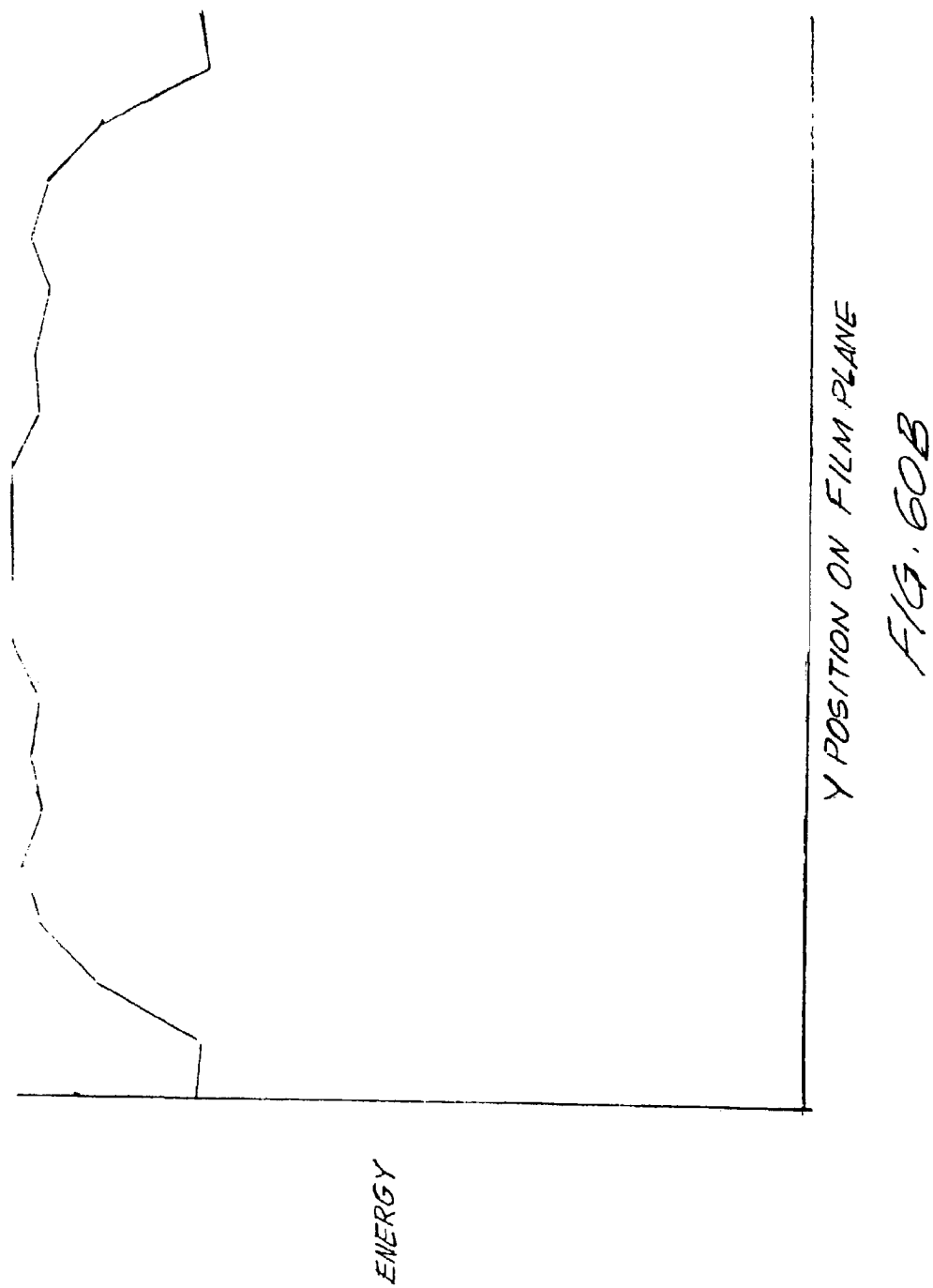

In another embodiment, light can be gathered with an elliptical reflector, especially if the source radiates little or no light forward and rearward (as in a typical axially oriented arc), bringing the light to a focus. A hot mirror can be placed somewhat near the focus to filter out much of the IR, while not requiring one that is too large. A cold mirror can be used to reflect the light while further reducing heat being sent to the light valve. Light spreading from this focus can be collimated, once sufficiently enlarged, by a Fresnel lens. Top and side views of this arrangement are shown in FIGS. 59A and 59B. FIGS. 60A and 60B show plots of light intensity in the X and Y directions of a sample system on the screen obtained with this arrangement. Here a source which would otherwise have a "hole" in the middle of the image (if a parabola were used) creates a uniformly illuminated screen.

A projector using this arrangement tends to be larger (e.g., 10"☐10"☐24") due to the distances needed for light to spread out sufficiently and for separate beams to be sent to the image-forming element and overlapped at the proper angles. Various methods can be utilized to reduce these dimension requirements.

Figure 61:
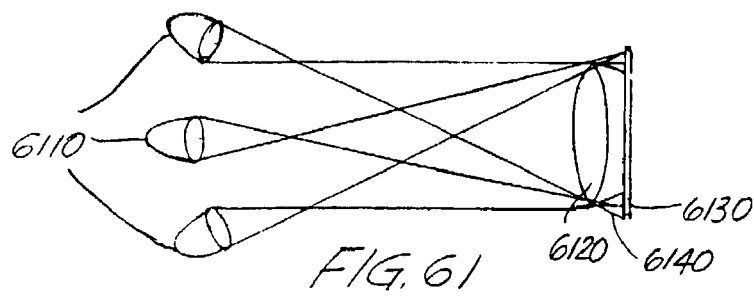
FIG. 61 schematically depicts a display system wherein three light sources illuminate n image forming element after being collimated by a lens.

For example, several small arc (or filament)—low wattage bulbs with collectors (6110) can be properly placed with a collimating lens (6120) adjacent to the image-forming element (6130) as shown in FIG. 61. This will produce various collimated beams (6140) at the proper angles to enter adjacent pixels.

Figure 62:
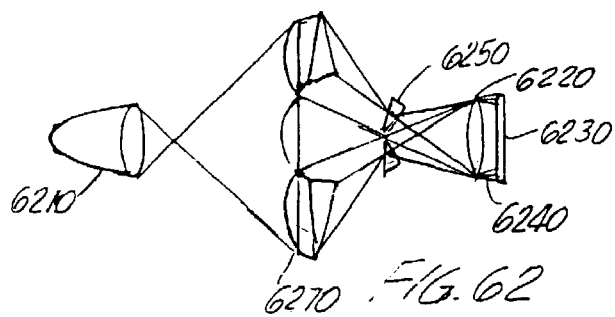
FIG. 62 schematically depicts a layout to reduce the dimension of a projector.

Alternatively, a larger single source (6210) can be sufficiently expanded to produce the required collimation, once collimated by a large lens 6270, after which different parts of the collimated beam can be brought to foci (6250) which are, likewise, properly placed (by mirrors, prisms, etc.) to produce various collimated beams (6240) at the proper angles once they pass through a collimating lens (6220) near the image-forming element (6230). Such an arrangement is depicted in FIG. 62.

Figure 65:
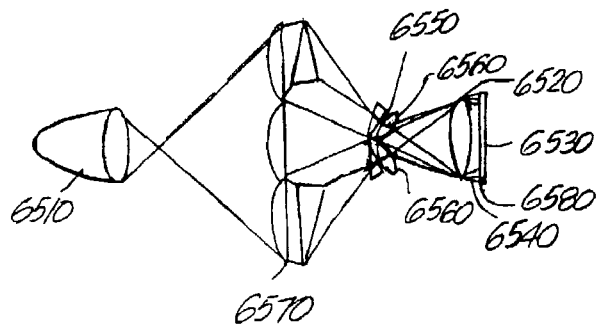
FIG. 65 schematically depicts yet another layout which reduces the dimension of a projection.

In a preferred variation of this arrangement, each beam can be imaged by an intermediate focussing lens or focussing lenses, one for each beam. FIG. 65 shows the addition of focusing lenses 6560. Each lens 6560 focuses an image of a portion (with the same shape as the IFE) of collimating lens 6570 onto the IFE 6530. The image can be made to fill part or all of the IFE. As mentioned elsewhere, cylinder lenses can be used to match the light to the aspect ratio of the IFE. This method provides even illumination of the IFE 6530 with no spillover light, while still illuminating the IFE 6530 at the proper angles to be focussed by input lens array(s) 6580 into pixel holes (as explained below). Light illuminating the IFE at the properly selected angles that are off axis, will enter adjacent pixel holes as explained herein.

Figure 66:
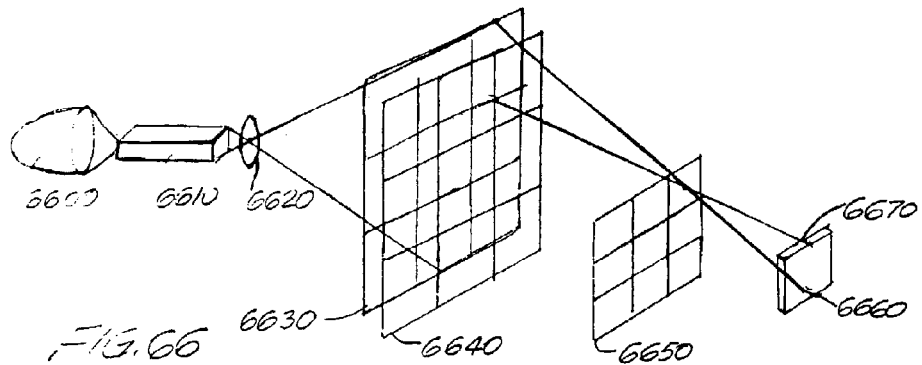
FIG. 66 schematically depicts an embodiment of a projection system.

In a further preferred variation, as depicted in FIG. 66, light from a source 6600 enters light tunnel 6610. Lens 6620 focuses an image of the output of the tunnel (which has the same shape as the IFE 6660) into the plane of an array of lenses 6630 (which may be Fresnel lenses). Fresnel prisms 6640 bend different portions of the image towards the IFE 6660. Focussing lenses 6650 form images of the different sections of the image at 6630 into the IFE 6660 illuminating part or all of it. The lenses in the image plane 6630 focus the lens 6620 into the imaging lenses 6650 by way of the prisms 6640. The center section of 6630 needs no prism at 6640. By expanding the light from the tunnel to a large area at 6630, divergence is decreased and collimation is increased by the magnification factor. This ultimately reduces the required distance between plane 6630 and the IFE 6660 while providing the collimation necessary to fall within the acceptance angle of the lens array(s) 6670 placed before the IFE 6600.

Alternatively, lens 6620 can focus the output of the tunnel 6610 onto the IFE 6660 directly (eliminating 6630, 6640, and 6650). Knowing the output angle of the light emanating from the tunnel and knowing the acceptance angle of the input lens array (explained elsewhere, herein) determines the required magnification factor. Then, considering the size of the IFE, using that magnification factor in reverse determines the required size of the output exit of the tunnel.

Figure 63:
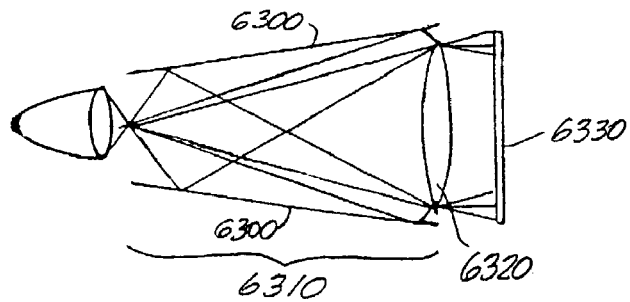
FIG. 63 schematically depicts a further layout which reduces the dimensions of a projector.

In another arrangement (see FIG. 63), to reduce overall projection width, appropriately placed mirrors (6300) can be placed around all four sides of the optical system (6310), to allow the light to spread sufficiently to produce the required collimation while still being collimated by a collimating lens (6320) at the proper angles to illuminate the image-forming element (6330). This is depicted with the mirrors on two sides only for illustration purposes in FIG. 63.

If three light paths are used because three light valves are used to modulate the red, green and blue images separately, the colored images must be recombined to form a full-color image. This can be done with various arrangements, such as the one depicted in FIG. 2. However, to minimize the distance between the light valves and the projection lens, a dichroic combiner cube will keep the distances to a minimum. Such a cube, known in the art, consists of four equilateral triangular prisms placed together to form a cube. The faces that touch one another include dichroic coatings to allow the three colored image-bearing beams to combine into a full-color image.

Conventional direct-view light valves utilize color filters to create a full-color image. Color filters work by absorption, which unfortunately wastes approximately two-thirds of the light, converting it to heat, which exacerbates the heating problem.

Figure 76:
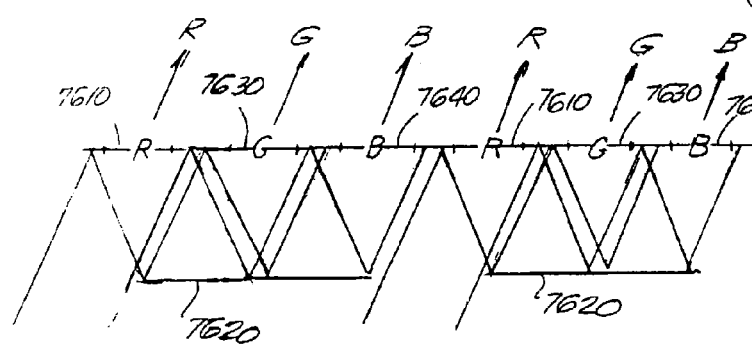
FIG. 76 depicts a preferred arrangement for making a color image-forming element.

A preferred method of making a color Image-forming Element (IFE) utilizes the deposition of dichroic mirror coatings on the IFE or on a substrate adjacent to it. When deposited on an adjacent substrate (forming a dichroic filer plate), said dichroic filter plate can be used with an IFE alone, or in conjunction with an IFE that utilizes color filters. The latter arrangement relaxes the requirements for narrow bandwidth transmissivity of the dichroic coatings. The differently colored coatings can be deposited in a mosaic just as absorptive color filters are. This is depicted in FIG. 76. Just before the IFE is a series of striped mirrors. Each mirror's width is twice the horizontal pixel pitch. The space between any two adjancent mirrors is equal to the horizontal pixel pitch. Two lenticular lens arrays transform incoming light into a series of parallel lines of light. The width of each line of light is equal to the horizontal pitch of the pixels of the IFE, while the space between any two adjacent lines of light is equal to two times the width of a line of light. Light illuminates the dichroic mirrors at a slight angle (dependant on the distance of the striped mirrors from the dichroic mirror coatings and on the horizontal pixel pitch).

Any given line of light passes through the space between two-mirrors, illuminating a vertical column of pixels and half pixels (if every other column of pixels is staggered, such as is depicted in FIG. 15B), or just illuminating whole pixels (if pixels are arranged as depicted in FIG. 15A).

For a clarified understanding, consider that portion of the light that hits a single red pixel. Red light passes through the red dichroic coating 7610 while blue and green light reflects back up to mirror 7620. After reflection from this mirror, these beams illuminate the green pixel 7630, which is the next one over from the red pixel. The green light passes through the dichroic coating, while reflecting the blue light once again for a final reflection from the stripe mirror. This blue light passes through the blue dichroic coating and the blue pixel 7640.

Figure 25:
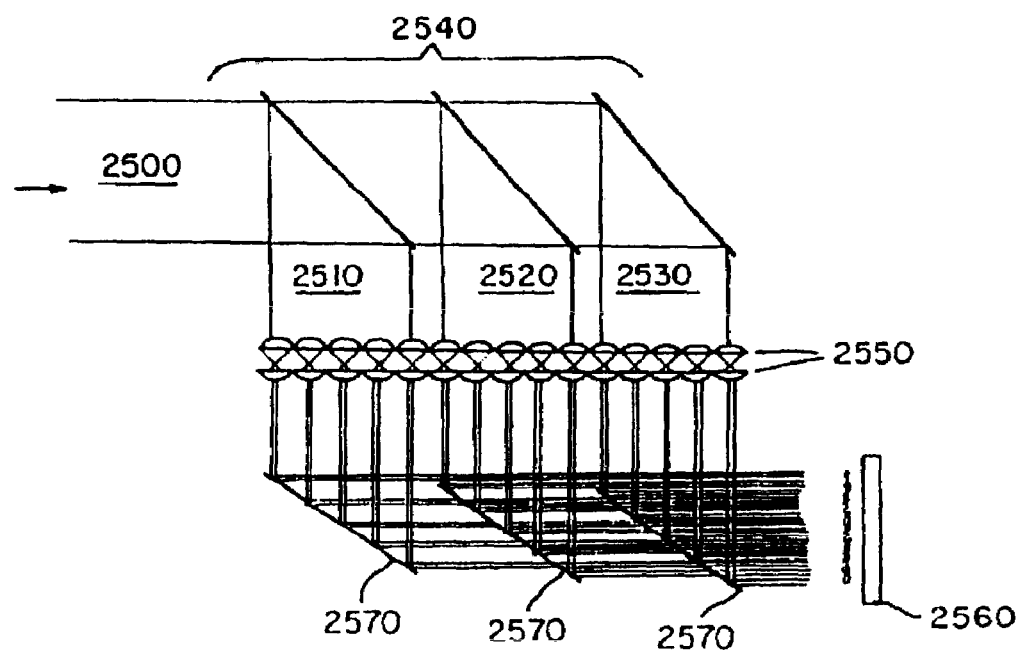
FIG. 25 is a schematic view of a section of the electronic image projection system in which dichroic mirrors separate a collimated beam of a white light into colored beams of light which pass through a double lens array creating demagnified collimated beams of colored light arranged side by side by a second set of dichroic mirrors for use as a multicolored beam to illuminate a full-color light valve.

An alternative method to making such a color mosaic without the use of absorptive color filters is illustrated in the following embodiment. FIG. 25 shows a collimated beam of white light 2500 which is separated into three collimated beams, one red 2510, one green 2520 and one blue 2530, by a dichroic mirror arrangement 2540. These beams then pass through a double lens array 2550, each array containing the same number of lenses as the number of pixels in the light valve 2560. Each lens pair formed by one lens from each lens array produces a Galilean telescope, producing a collimated beam of reduced diameter. The lens curvatures are chosen so as to provide a 3:1 reduction in diameter of each collimated beam. A second dichroic mirror arrangement 2570 brings the color beams together, but, due to displacement of two of the mirrors, the beams do not actually overlap, forming a mosaic of colors to illuminate the monochromatic light valve in whatever color arrangement is chosen (such as the two arrangements described above and depicted in FIGS. 15A and 15B).

Figure 26:
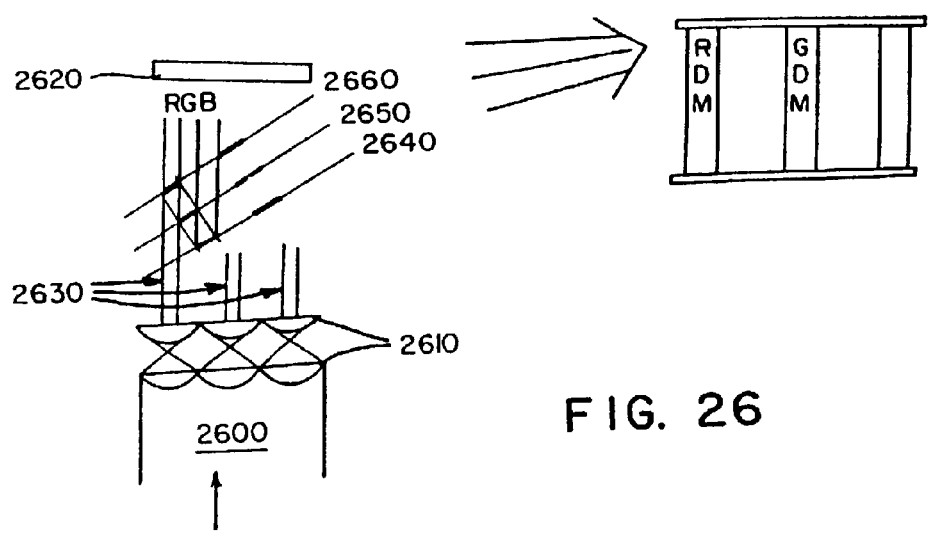
FIG. 26 a schematic view of an alternate method of producing a multicolored light beam in the electronic image projection system for use in illuminating a multicolored light valve.

An alternative method of producing a mosaic of colored beams is illustrated in FIG. 26. Collimated light 2600 passes through a double lens array 2610, which again contains the same number of lenslets per array as there are pixels in the light valve 2620. The focal lengths of the two arrays are different, such that a series of collimated beams is formed 2630. The width of each beam is the size of a pixel and the spacing between collimated beams is equal to twice the pixel pitch. Each collimated beam intercepts a stack of 3 special mirrors.

These "mirrors" consist of mirrored areas, separated by clear spaces which are twice the size of the mirrored areas. The width of the mirrored areas is chosen so that each collimated beam will exactly fill each mirrored area when hitting the mirror at 45 degrees to the normal of the mirrors. Tracing the path of a single collimated beam emerging from one of the lenslets, the beam passes through clear areas in the first two-mirrors 2640 and 2650 in the stack, hitting a dichroic mirrored surface on the third mirror 2660. This dichroic mirror transmits the red light and reflects the blue and green light downward. This blue-green beam hits a dichroic mirrored area on the 2nd mirror, which reflects a collimated green beam in a direction parallel to the red beam, while transmitting the blue beam. The blue beam hits the first mirror, which is a standard first surface mirror, so that the beam is parallel to the red and green beams. These red, green and blue beams illuminate three pixels on the light valve, which is monochromatic, but is addressed with red, green and blue data, respectively. Alternately, the dichroic mirrors could be replaced with volume holograms to accomplish the same result.

Figure 27:
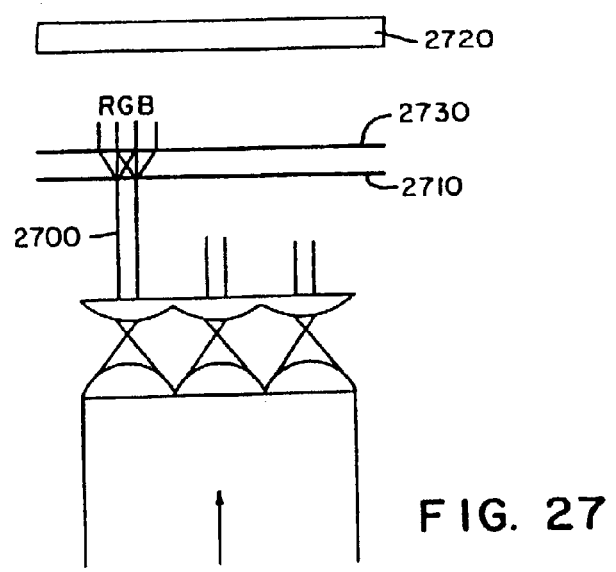
FIG. 27 is a schematic view of an alternate method of producing a multicolored light beam utilizing a hologram to separate a white light beam into red, green and blue beams and a second hologram to make parallel the resulting beams.

In another embodiment, shown in FIG. 27, one of the collimated mini-beams 2700 (as described above) hits a hologram 2710 which refracts/diffracts the light, breaking it up into essentially red, green and blue beams. A second hologram 2730 or series of prisms bends the off-axis beams back on axis, so that parallel red, green and blue beams are formed, which can then illuminate a full-color light valve 2720, as previously explained.

White light, before it illuminates the light valve or other image-forming element, can be "broken up" into differently colored beams by passage through prisms, gratings, and/or standard, blazed, binary or other holograms. The differently colored beams will be bent into slightly different directions. Cascading two (or more) such elements can be done allowing the spectrally separated beams to be redirected so that they are generally parallel to the optical axis of the system, or such that the green component is generally parallel to the optical axis, with the other components on either side of the green beam converging towards or diverging away from the green beam, as desired. This can be used to direct the properly colored components of the illuminating beam to the correctly colored filters for increased saturation of the primary colors, permitting a more accurate reproduction of a larger gamut of colors. Alternatively, the different colored beams could illuminate corresponding pixels without the use of color filters.

Figure 71:
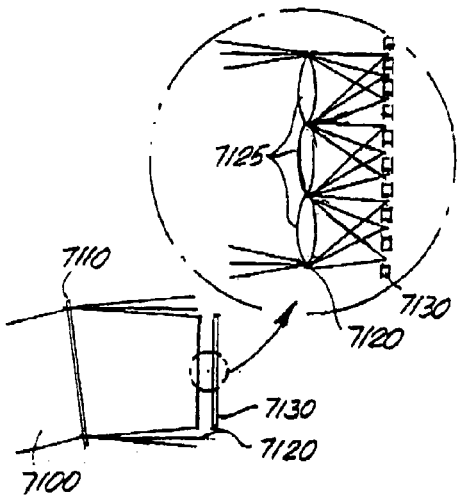
FIG. 71 schematically depicts a method of directing differently colored light beams to their respective pixels.

In a preferred embodiment depicted in FIG. 71, a white light beam 7100 passes through such an element 7110 (or more than one such element with a cumulative spreading effect of the different colors) to produce nearly completely superimposed beams wherein each color component travels at a slightly different angle. The image-forming element 7130 is covered with a lens array 7120 in which each lens array element 7125 has a vertical pitch equal to the vertical pitch of the pixels of the light valve (or other pixellated, image-forming element) and has a horizontal pitch three times that of the horizontal pitch of the pixels (making one third as many lenslets in the horizontal direction as there are pixels in the horizontal direction). This design assumes pixels arranged in a fashion such as depicted in FIG. 15A or 15B, in which each horizontal row alternates in color: R, G, B, R, G, B, and so on. If alternate pixel rows are offset from one another, so too are the lens array elements so as to match. The differently colored beams, travelling at slightly different angles to one another, are focused to different positions by each lens element 7125, corresponding to the pixels with information in each color. Thus, the red end of the spectrum is directed to red information-bearing pixels, and likewise, for the blue end of the spectrum and the green-containing middle of the spectrum. As mentioned, color filters, placed at the pixels, can further filter these beams for added color saturation. Use of an additional lens array or arrays can serve to focus all light from each segment of the spectrum into each pixel so that little or no light is lost. This is explained in greater detail later on herein. Alternatively, careful selection of dispersion angle and lens array element 7125 focal length and its spacing from pixels can be used to filter each color spectrum segment by selectively blocking certain wavelengths by having them intentionally fall on opaque spaces between pixels.

If desired, the system can be tailored so that the axis of the green light is parallel to the normal of the image-forming element. To accomplish this, if prisms are used, for instance, they can be constructed from different materials having different Abbe number but similar indices of refraction, such as acrylic and polystyrene. Placing the prisms in opposition shifts the green light on axis, while leaving the colors dispersed. If gratings or holograms are used, they can be made with differing fringe spacings.

Figure 72:
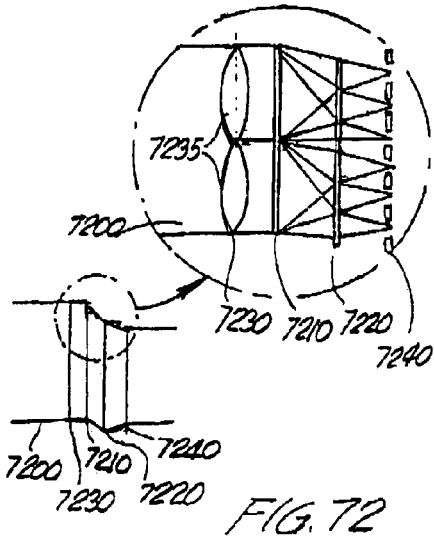
FIG. 72 schematically depicts an alternate method of directing differently colored light beams to their respective pixels.

In an alternate embodiment, as shown in FIG. 72, two such color dispersing elements 7210 and 7220, which are identical, are placed in opposition to each other so that the effect of the first one is cancelled by the action of the second one when they are placed back to back. By placing the elements a slight distance apart, however, separate colors can be seen. In FIG. 72, each lens array element 7235 in lens array 7230 (in which the lenses again have three times the pitch of the pixels in the horizontal direction) creates a focussed image of the source. As each focused beam passes through the first color dispersing element 7210, the focussed spot image of the source is spread into a spectral line of color at an angle to the axis of the incoming beam. The second color dispersing element 7220 then re-directs the differently colored beams so that the central color (green) is parallel to the optical axis of the system when they reach the plane of pixel holes 7240. Again, a separate lens array or arrays, as described later on herein, can focus each spectrum segment into its respective pixel so no light is wasted or, without such additional array(s), spaces between pixels can be used to block specific wavelengths, as desired.

Fresnel prisms can be used to reduce size, weight and cost. If a hologram or a grating is used, a phase grating would produce the highest efficiency. One of the first orders could be used while the other first order, the zero order, and higher orders are suppressed. Holograms and blazed gratings work best at a specific wavelength. Consequently, for maximum efficiency, three could be used, one peaked for each desired wavelength (red, green, and blue).

Figure 73:
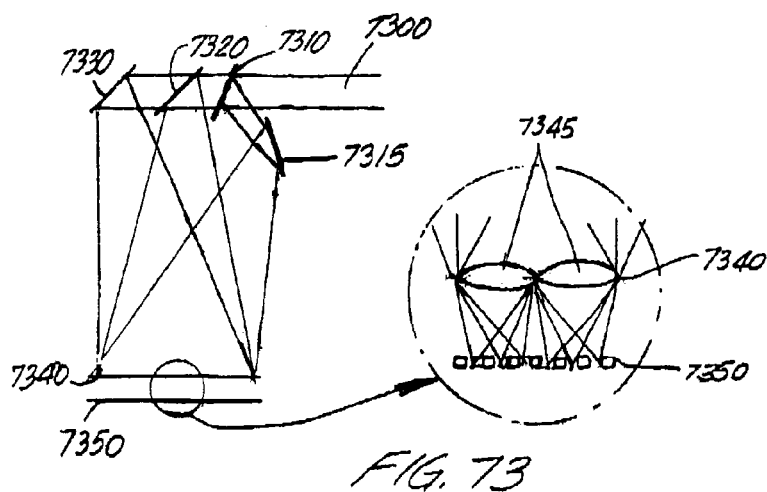
FIG. 73 schematically depicts another method of separating light into colors using dichroic mirrors.

Using the same lens array, another method of separating the light into color beams uses dichroic mirrors. An example of how this can be done is shown in FIG. 73. In this arrangement, a white beam of light 7300 is broken up into three colored beams by dichroic mirrors 7310, 7320, and 7330 (the last mirror 7330 could be a front-surface mirror or prism instead of a dichroic mirror). These mirrors are placed such that they direct their individually colored beams through each lens array element 7345 in lens array 7340 so that they illuminate the proper pixels 7350 containing corresponding color pixel information. Front-surface mirror 7315 can be used, for instance, to properly redirect the beam reflecting from mirror 7310 towards the lens array 7340.

Use of a dichroic or holographic system to produce a mosaic of colored beams can be done in conjunction with a color filter mosaic as well. Since the light is properly colored before hitting the filters, less will be absorbed and selected saturated colors will result.

Light valve systems that utilize rotation of the plane of polarized light have a major loss of efficiency because, to rotate polarized light, the light valve must be illuminated with polarized light. Systems in use today make polarized light by using sheet polarizers which produce polarized light (inefficiently) by absorbing all light except that which is polarized in the desired direction. This wastes more than two-thirds of the light and causes the polarizer to heat up. In the light valve systems in use today, the polarizers are mounted on the light valve. Thus, when the polarizer heats up, the light valve heats up, limiting the amount of light that can be sent through the system.

One solution to this light valve heating problem is to mount the polarizers a sufficient distance away from the light valve and to cool the polarizers directly.

A better solution which also alleviates the inefficiency of sheet polarizers is to use a MacNeille prism for polarization. The MacNeille prism makes use of the fact that light which hits a dielectric surface at an angle, such as Brewster's angle, splits into reflected and transmitted beams which are somewhat orthogonally polarized. This effect can be maximized by applying several layers of dielectric coatings, with alternating indices of refraction, such as by vacuum deposition, onto the surface between two glass prisms, cemented together to form a cube.

When the cube is properly constructed, approximately 50% of the light entering the cube is transmitted as P-polarized light and approximately 50% of the light is reflected by the diagonal surface as S-polarized light. Since most sheet polarizers absorb between 65% and 75% of the light that hits them, just utilizing one of the beams from this cube will increase the amount of light available for the light valve and will greatly diminish the light valve heating problem caused by sheet polarizer heating due to absorption. Both beams can actually be used so that very little light is wasted in the process of providing polarized light for use by the light valve.

Figure 44:
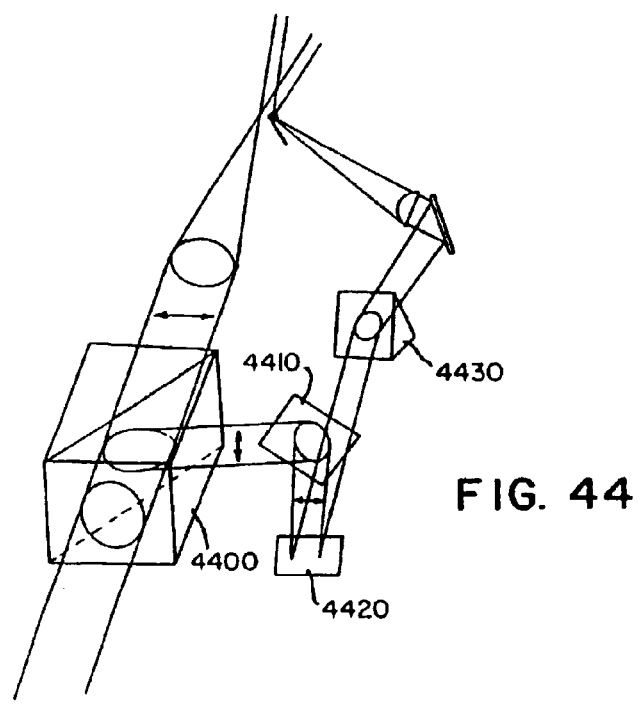
FIG. 44 is a schematic view of an embodiment of a section of the electronic image projection system in which mirrors are used to rotate the polarization plane of a beam coming from a MacNeille prism to make the resulting beam parallel with another beam from the MacNeille prism.

Both beams could be used by employing mirrors which reflect one of the beams emerging from the cube such that its plane of polarization is rotated when the two beams are joined as side-by-side parallel beams of light. As shown in FIG. 44, S-polarized light reflected by the cube 4400 is reflected downwards by a mirror 4410, rotating the plane of polarization of the light with respect to the horizon. A second mirror shown in the diagram as mirror 4420 reflects this light in the direction of the P-polarized light emerging from the cube while maintaining its polarization orientation. By positioning this mirror at the right angle, this beam will be reflected up to the height of the P-polarized beam emerging from the cube. This beam is then reflected forward by a mirror or as shown in the diagram, refracted forward by a prism 4430 forming a second beam of light parallel to the other beam emerging from the cube, both in its direction of propagation as well as in its plane of polarization. Each beam can be brought to a focus with the use of lenses and mirror right next to each other, forming a single expanding polarized light beam. Other methods described herein could also be used to combine the beams so that both would illuminate the light valve.

Figure 54:
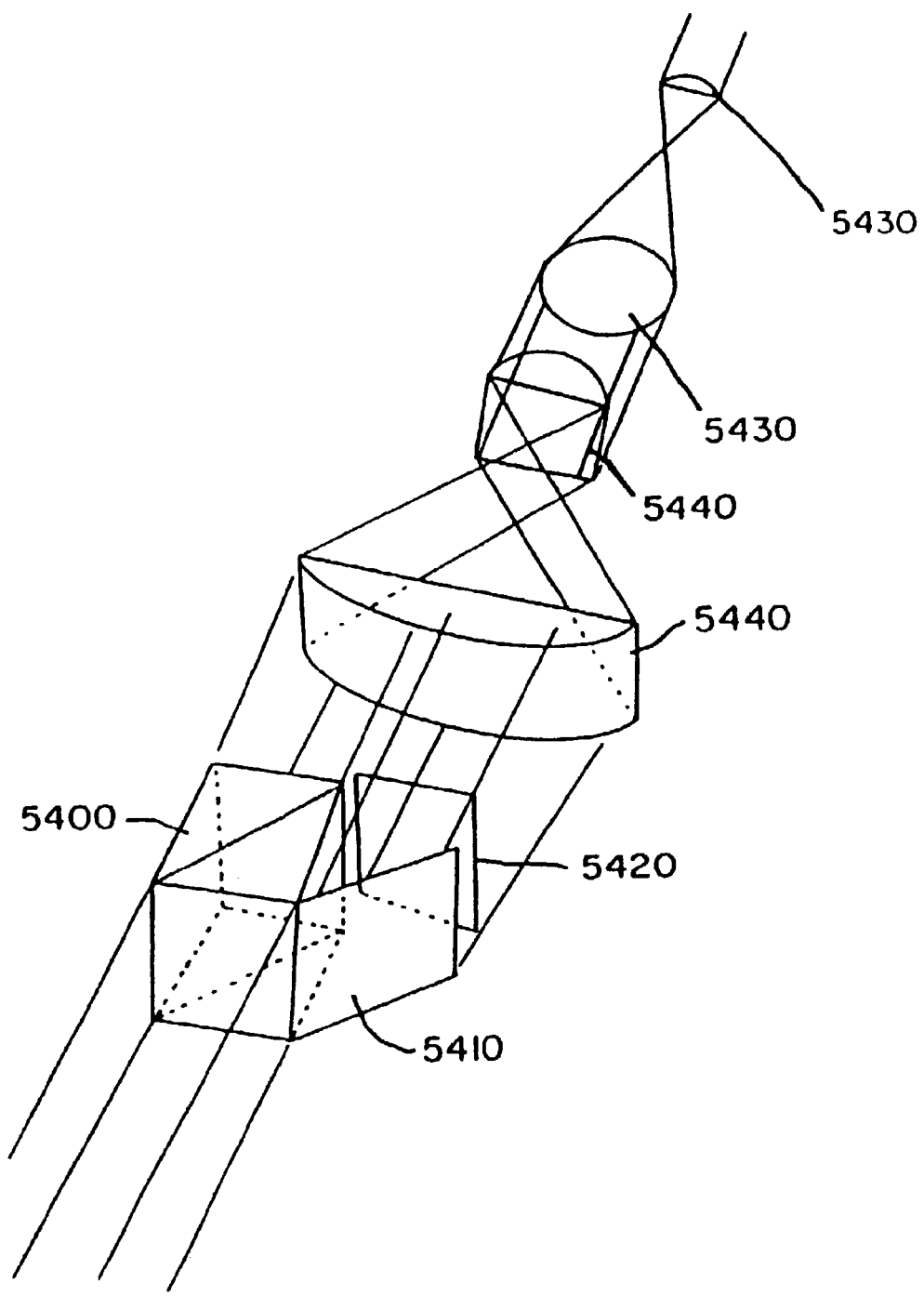
FIG. 54 is a schematic depiction of a beam splitter cube and reflector.

A preferred method of utilizing both beams produced by a polarization beam splitter cube 5400 is depicted in FIG. 54. With this method, a mirror 5410 which is parallel to the dielectrically coated diagonal of the cube is placed adjacent to the cube, producing two side-by-side collimated beams with orthogonal polarizations. Placing a half wave plate 5420 in one of the beams produces two side-by-side parallel beams which have the same polarization. The size and aspect ratio of the resulting beam can be altered by the use of spherical 5430 and cylindrical 5440 lenses, if required.

If a large beam must be polarized, using a MacNeille prism will unfortunately require a heavy, large, solid beam splitter cube which is expensive to produce and consumes much space. A small beam of light could therefore be used, although this may require using additional lenses and additional space to accommodate the changes to the size of the beam. Unfortunately, reducing beam size increases the angles of non-collimated rays, which then polarize inefficiently in such a cube. A MacNeille plate polarizer which weighs less and consumes less space can be used but will function only over a very narrow bandwidth. In a video projection system, as contemplated by the present invention, a beam of white light could be separated into three color component beams by, for instance, a dichroic mirror system. These three separate color components could then be sent to three MacNeille plate polarizers. Although this does save space and weight, the optics required to separate and recombine the colored beams may occupy the same or a greater amount of space and weight than was saved. Moreover, the three MacNeille beam splitter plates would greatly increase the cost of the system. Applicant has devised a "Fresnel MacNeille prism," which functions as a MacNeille prism beam splitter but has, at the outer surfaces of the plates, a multiplicity Of tiny saw-tooth surfaces, each behaving as a normal prism. This device weighs much less than a prism, consumes less space, operates over the entire visible spectrum, and costs less to produce.

Figure 78:
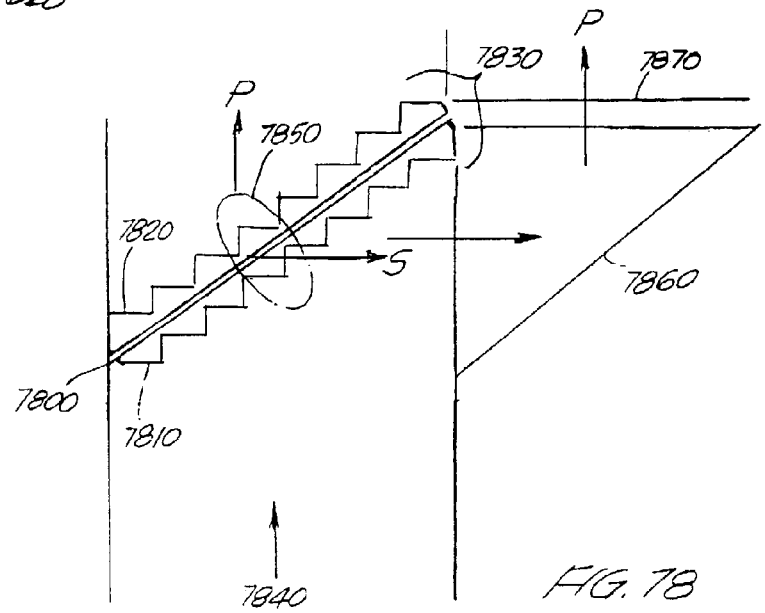
FIG. 78 depicts schematically a "Fresnel MacNeille polarizer"

FIG. 78 depicts this device. A multi-layer dielectric coating 7800 is deposited on the flat surfaces of a saw-tooth component 7810 which is made, preferably, of a plastic such as polycarbonate. Once coated, matching saw-tooth component 7820 is glued to it forming a polarizing beam splitter plate 7830. Collimated light 7840 illuminates the plate 7830 at 45 degrees. Each corresponding saw-tooth pair (for instance, 7850) acts as a MacNeille prism transmitting P-polarized light and reflecting S-polarized light in a perpendicular direction. This separation of P- and S-polarized light takes place across the entire polarizing beam splitter 7830. As described herein, the S-polarized light can, for instance, be reflected from a mirror 7860 and passed through a half-wave plate 7870 to become P-polarized light before proceeding to the IFE. As with a standard MacNeille polarizer cube, these two beams can remain side by side or overlap when illuminating the IFE.

This type of polarizer, like a MacNeille polarizer, eliminates the loss of light due to absorption and the heating of standard sheet polarizers. In addition, it eliminates the cost and weight of the prisms in a MacNeille polarizer, which become heavier and more expensive as the beam to be polarized increases in size.

Figure 64A:
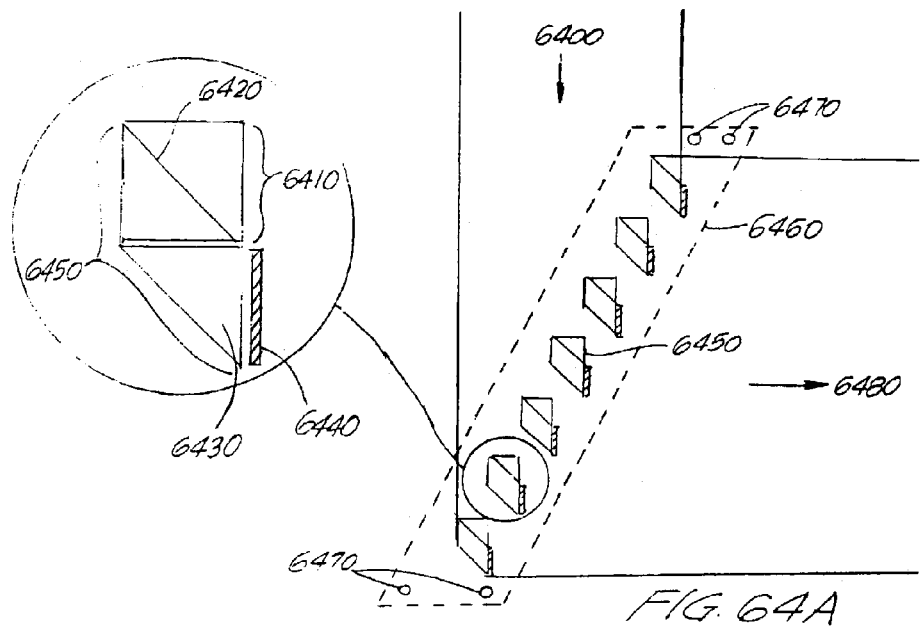
FIGS. 64A and 64B schematically depict embodiments of "Fresnel MacNeille polarizers" of the invention.

The arrangement depicted in FIG. 54, comprising the beam splitter cube 5400 and reflector 5410 can be miniaturized as well to reduce weight and cost. One arrangement to accomplish that is depicted in FIG. 64A. By joining a right angle prism 6430, to one of the prisms making up the beam splitter cube 6410, a Rhomboid shape 6450 is formed which can be made from a solid material such as polycarbonate. This Rhomboid is joined to the other right angle prism of the cube after an appropriate dielectric coating is deposited on one of the surfaces between them at 6420. 6440 is half-wave material as depicted in FIG. 54 as 5420. Several of these units 6450 can be arranged, for instance, along the line which is offset 22.5 degrees from the optical axis of an incoming light beam 6400. These individual units 6450 could be held in place between flat plates 6460, which are held together by appropriate fasteners 6470.

The randomly polarized beam 6400 entering this array of polarizing prisms and reflectors will be reflected in a perpendicular direction and exit as a linearly polarized beam 6480.

This configuration can be modified for easy mass-production by injection molding, for instance, components 6435 and 6415. These components can be glued together after the appropriate dielectric coating is deposited on either surface at interface 6425.

Randomly polarized light 6405 illuminating the composite structure 6455 will be split into alternating beams of P- and S-polarization 6465 travelling perpendicular to their input direction 6405. After passage through half-wave material 6445 placed in all beams of the same polarization, the emerging light beam will be linearly polarized all in one orientation.

If desired, this beam can be redirected so that it is propagating parallel to the original beam direction 6405 with the original beam diameter 6485. This can be accomplished, for instance, with the use of a double lenticular lens array 6490 and a "Fresnel mirror" 6495, which could consist of mirrored surfaces or prisms which operate by total internal reflection.

Figure 64B:
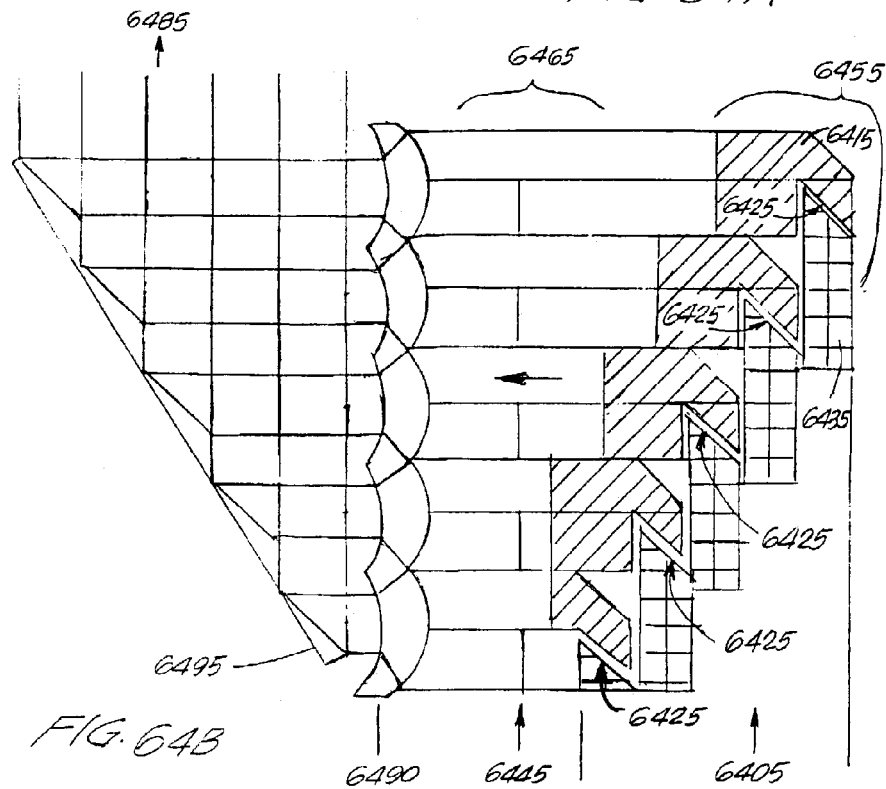

Since the Fresnel polarizer plate 7830 of FIG. 78 must be illuminated at 45 degrees, and the Fresnel polarizer plate 6455 of FIG. 64B must be illuminated at 22.5 degrees, they still take up the same amount of space as a MacNeille polarizing beam splitter. This space requirement can be alleviated by utilizing any one of a number of possible Fresnel polarizer configurations. Some sample configurations are described below.

A saw-tooth structure such as depicted in FIG. 79, made, for instance, of a plastic such as polycarbonate, used in conjunction with lenticular lenses will polarize white light even though it is illuminating the polarizing structure at normal incidence. Collimated light 7900 illuminates double lenticular lens 7910 (in which each positive-negative lens pair forms a Keplerian telescope) forming collimated beams of light 7920, each of which is half the width of its corresponding lenticular lens element. Each beam passes through a portion of the first plastic element 7950 which is flat on one side and contains 45-degree-angle sloping surfaces on its other side. Coated onto at least all of the slanted surfaces that slant upwards from left to right is a dielectric coating 7960 of different index materials such as SI02 and TI02 deposited in alternating layers, as is known in the art, to make a MacNeille polarizer. Glued to this coating is identical plastic component 7970. Each said light beam 7920 passing through substrate 7950 interacts with the coating 7960 such that all P-polarized light is transmitted to exit the flat face of component 7970 while all S-polarized light is reflected to the right where it is again reflected by coating 7960 back towards the source. The light beam then passes through quarter wave plate 7940, which changes it to circularly polarized light. Upon reflection from mirror 7930, the circularly polarized light reverses handedness and, after again passing through quarter wave plate 7940, becomes P-polarized light, allowing it to pass through coating 7960 and element 7970. Thus beam 7980, emerging from element 7970 consists of almost completely P-polarized light.

A variation of this arrangement is depicted in FIG. 80. In this arrangement, components 8050 and 8070 consist of sawtooth surfaces which have 45 degree sloping sides, each of which connects to a side which is parallel to the optical axis. As in the previous example, lenticular lenses 8010 produce parallel beams 8020 whose width is half that of a lenticular lens element. Again the P-polarized light passes through the multi-layer coating 8060 and exits through 8070. However, in this arrangement the S-polarized light reflects sideways to the next slanted surface, reflecting once again from coating 8060 in a direction parallel to the optical axis. This S-polarized beam then passes through half wave plate 8040 and becomes P-polarized light. Thus, beam 8080 exiting this polarizer consists primarily of P-polarized light.

A preferred variation of this arrangement is depicted in FIG. 81. In this variation, component 8150 has half as many saw-teeth as 8170. Since all saw-teeth on both components are both the same size, this is accomplished by spacing the saw-teeth on component 8150 twice as far apart as the saw-teeth on component 8170. After deposition of an appropriate coating on 8160, the two components 8150 and 8170 are glued together as before. In this arrangement, P-polarized light emanating from the lenticular lens passes straight through parallel to the optic axis. S-polarized light reflects perpendicular to the axis from the multi-layer coating 8160 and passes into the adjacent saw-tooth from 8170. The beam then reflects by total internal reflection parallel to the optical axis. After passing through half-wave plate 8140, this S-polarized light becomes P-polarized light. Thus, the final beam 8180 consists primarily of P-polarized light.

A re-arrangement of the saw-teeth can be done so as to double the pitch of the lenticular lenses and the half-wave plate segments while leaving the size of the saw-teeth teeth the same. This rearrangement is depicted in FIG. 82.

Figure 85:
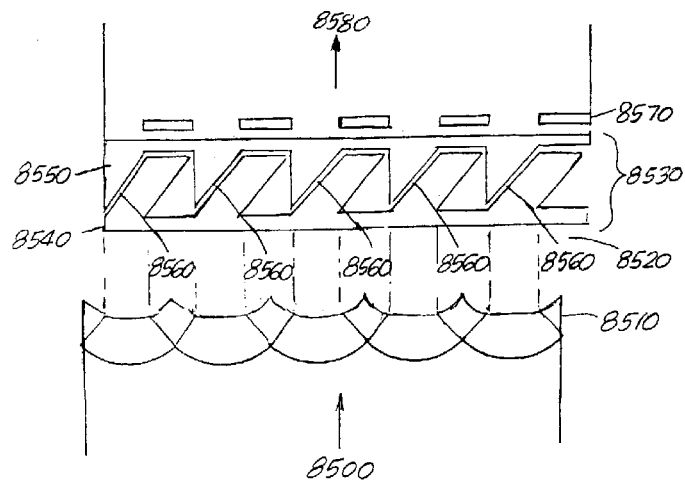
FIG. 85 depicts still a further embodiment of a "Fresnel MacNeille polarizer".

This can also be done using a variation of the system depicted in FIG. 64. This is depicted in FIG. 85 in which the incoming light beam 8500 is reduced by double lenticular lens array 8510 to several parallel beams 8520 which have a space between every two beams equal to the width of one of the beams. These beams illuminate structure 8530 at normal incidence, which can be made, for instance, from two injection-molded parts 8540 and 8550. These parts are glued together after being coated with the appropriate multi-layer coating on slanted surfaces 8560. Half-wave material 8570, placed in every other beam emerging from 8530 produces a single linearly polarized beam 8580 which is the same size as, and is co-linear with, input beam 8500 (although it has twice the divergence in one dimension as input beam 8500).

Other similar variations are possible and are within the scope of the present invention.

Another way to reduce the size, weight, and cost of the MacNeille or Fresnel polarizer is with the use of holograms or simple diffraction gratings.

The prism necessary in a broad-band MacNeille or Fresnel polarizer takes incoming light and refracts it so that it impinges on the multi-layer coating at Brewster's angle. The output prism likewise takes the light emerging from the multi-layer coating and refracts it so that it is once again parallel to the optical axis. If these prisms are replaced by appropriate holograms or gratings, the same functions can be accomplished in a much smaller space (since the multi-layer coating can be placed perpendicular to the optical axis) without the weight of prisms.

All previously described MacNeille polarizers and Fresnel polarizers have utilized multi-layer dielectric coatings which must be applied with vacuum deposition. This is somewhat expensive and time consuming. A hologram, which can be recorded with a single exposure, provides an alternative to such a multi-layer coating at a lower cost in much less time. This can be accomplished by making a volume hologram in which the angle between the interfering beams is greater than 90 degrees. The standing-wave pattern set-up within the emulsion provides alternating layers of high and low indices with a single quick exposure. This "stack" is similar in form and function to the multi-layer stack conventionally created by vacuum deposition. Since holograms work most efficiently at a given wavelength, performance may be optimized, when using white light, by superimposing several holograms (such as one peaked in the red, one peaked in the green, and one peaked in the blue). Three separate finished holograms can be assembled together or three separate exposures can be made in the same emulsion, varying either the reference beam angle or the emulsion thickness with an agent such as triethanolamine between exposures.

Various arrangements, such as depicted in FIGS. 54, 64, 80, 81, 82 and 85, for instance, can utilize a cholesteric-nematic liquid crystal instead of a multi-layer dielectric coating. The unique anisotropic optical properties of liquid crystals allow them to be used to split unpolarized light into right- and left-handed circularly polarized beams. After reflection of one of the beams, both beams become circularly polarized with the same handedness. Then, passage through a quarter-wave plate converts these beams into linearly polarized light. Since cholesteric filters tend to be most efficient at a specific wavelength, a sandwich of several "tuned filters" (such as one for red, one for green, and one for blue) can be utilized to provide efficient polarization of white light.

Any of these methods to produce a relatively flat "polarizer plate" or "Fresnel polarizer" that can be illuminated at normal incidence have use where sheet polarizers are currently used as well as places where sheet polarizers aren't used because too little light passes through. One such use is for polarizing vehicle headlights and windshields in perpendicular axes. This dramatically reduces glare from oncoming headlights, while allowing the majority of other light, including light from a vehicle's own headlights once it has diffusely reflected from any object, to pass through the windshield to be seen by the driver.

Linearly polarized light that passes through an ordinary lens is no longer strictly linearly polarized. This is because a lens consists of curved surfaces which can alter the polarization of light passing through it due to the dielectric polarization effect mentioned above. As a lens surface is continually curving and changing its angle with respect to different portions of the beam of light, different portions of the beam's polarization are altered differently. This will reduce contrast and color fidelity of the image produced by a light valve using polarized light. To reduce this problem, if a polarizer is used, it should be positioned after any lenses, whenever possible. The preferred solution is to use lenses which are as thin as possible, even if several are used in sequence, coated with highly efficient AR coatings on the curved lens surfaces to minimize the polarization effects encountered when light hits a surface at an angle.

Although a MacNeille polarization beam splitter allows approximately 50% of the input light to be transmitted as P-polarized light, each beam, specially the reflected S-polarized beam, is somewhat impure. In other words, the transmitted beam, although primarily P-polarized, contains some non-P-polarized light, while the reflected beam, although primarily S-polarized, contains some non-S-polarized light. A small amount of such "contamination" is very noticeable to the eye, making the projection of completely black areas impossible, reducing the contrast and color saturation. To solve this problem, a polarizer could be positioned between the MacNeille beam splitter and the light valve with their axis parallel, causing a relatively small loss of light, but eliminating light of the unwanted polarization, improving the contrast ratio potential from approximately 20:1 to approximately 1000:1 and only increasing the light loss from 13% to 35%, which leaves twice as much light as with the use of just a polarizer.

The use of a dichroic beam combiner cube to produce a full-color image from three separately colored image-bearing beams within a small space has been explained above. The same cube can also be coated to operate as a MacNeille polarization beam combiner cube. This cube will act as a beam analyzer for light valves using polarized light. With this arrangement, one beam will be transmitted through the cube, while the other two beams will be reflected by the internal surfaces. Consequently, the transmitted beam must be P-polarized while the reflected beams must be S-polarized. The light exiting the light valve which is to be transmitted by the cube must be P-polarized while the other two light valves must be manufactured to provide images in S-polarized light. Light polarized by the MacNeille methods disclosed herein, being all of one polarization, can be rotated by a half wave plate before entering the light valve which requires orthogonal polarization. However, a simpler and less expensive alternative is the use of identical light valves (as to required polarization) and a halfwave plate after the light valve which produces a different polarization output from the other image-forming elements.

A major loss of efficiency which is especially noticeable in an active matrix light valve occurs because there are spaces between pixels which do not transmit light. Light that hits these areas does not reach the screen, decreasing the brightness of the projected image and contributing to heating of the light valve. Typically between 25% and 45% of the light illuminating such a light valve actually passes through it. To get around this problem, light must be crammed into the pixel holes, being made to miss the opaque areas between pixels.

The preferred technique to do this utilizes lenses to focus light coming from the condenser system down into the pixel holes. For a given light valve, the pixel hole size is fixed. Selecting a bulb fixes the filament or arc size. To get as much light as possible from the selected light source into the pixel requires taking into account a few factors.

Although a transverse filament or arc source can be used, an axial filament or arc within a reflector is preferred. There are several reasons for this choice:

1. The closer the source is to the reflector, the poorer will be the collimation of the light. An axial source stays farthest from the reflector, whereas a transverse source gets nearer to the reflector for most of the source.

2. An axial source radiates most of its light sideways to be reflected by the reflector, with little or no light going toward the base of the reflector or forward. A transverse source radiates much of its light at the base, which performs the most poorly of all areas on the reflector (in terms of collimation) due to its closeness to the source, and forward, missing the reflector entirely, and not benefiting, therefore, from the reflector's function.

3. The symmetry of the axial source within the reflector creates a much more symmetrical illumination of the image-forming element than a transverse source would provide.

4. A transverse source would have to be demagnified much more than an axial source for its image to be focused by a lens array into the pixel holes. As the practical demagnification is limited, use of a transverse source, thus, further reduces the amount of light that can be focused by the lens array into the pixel holes.

5. Although some of these problems are helped by using a spherical back-reflector and a condenser lens, this doubles the transverse size of the source (worsening collimation) and loses the majority of light since most light misses both the reflector and the condenser lens.

The thickness of the glass used in the image-forming element limits how closely the lens array can be to the pixel hole and thus how short the focal length of the lens array can be. The ratio of the focal length of the condenser lens system to the lens array focal length determines the demagnification of the filament or arc image. Although we would like a large condenser focal length so that the demagnification factor is sufficient to focus the entire image of the filament/arc into the pixel, increasing the condenser focal length decreases the amount of light it can gather from the filament. Consequently, we must have the condenser focal length as short as possible while still demagnifying the image of the filament/arc sufficiently to fit within the pixel (taking into account diffraction blur). We must therefore select a bulb with the smallest filament or arc size that will provide the minimum acceptable brightness. With a given pixel size, a minimum lens array focal length, a given filament size, a maximum filament efficiency per unit area and a minimum condenser lens focal length, the maximum amount of light that can be put through the pixel holes is determined. Using these parameters, a light source and lenses can be chosen to get as much light through the light valve as possible for any given image-forming element. As disclosed earlier, techniques such as the use of a collimating hologram or the use of non-imaging concentrator optics can reduce the filament/arc size, allowing more light to be focused into the pixel holes.

Figure 34:
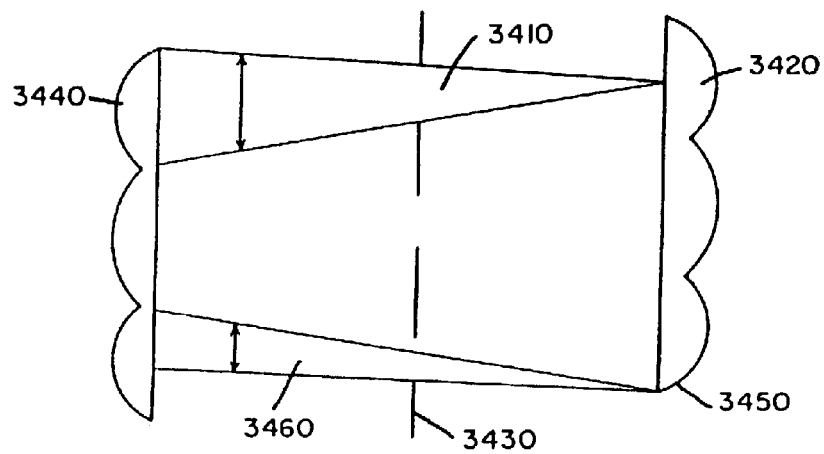
FIG. 34 is a schematic view of pixel holes in a light valve with a lenslet before and after the pixel hole for use in analysis of illumination uniformity in one aspect of the electronic image projection system.

Although the use of a single lens arrays before the image-forming element can provide some increase in throughput, in a real system where the light is not truly collimated because the source has a finite size, some problems still remain, depending on the optical configuration used. One of the problems is non-uniform illumination causing the appearance of structure within each pixel. To deal with this problem, one method is to use a Kohler-type illumination arrangement. With this type of arrangement, the illuminated area will appear fairly uniform even though the source may be non-uniform (such as with a filament). The input lens can be considered as the condenser lens and the depixellating lens after the light valve can be considered to be the projection lens of the system. In this case, the light source image is focused into or near the depixellating lens. This is shown in FIG. 34. The illumination at any point on the array after the image-forming element (used for depixelization) is proportional to the brightness of the source and the solid angle through which that point is illuminated. As seen in FIG. 34, the illumination angle 3410 from the center of the output lens array 3420, positioned after the image-forming element 3430 to magnify the images of the pixels and eliminate the spaces between the pixels in the image, is that which is subtended by the array element 3440 placed before the image-forming element, assuming the pixel hole allows the entire cone of light to get through to the array element after the image-forming element. When looking at the light which hits a point on the lower edge 3450 of an array element after the image-forming element, as also shown in FIG. 34, we can see that the lower edge of the pixel hole limits the cone angle of light 3460 available to illuminate the array element after the image-forming element. Thus, illumination along the edge of the array element after the image-forming element will peak at about 50% of the illumination at the center of the element and fall off to about 25% at the corner of the element.

Figure 36:
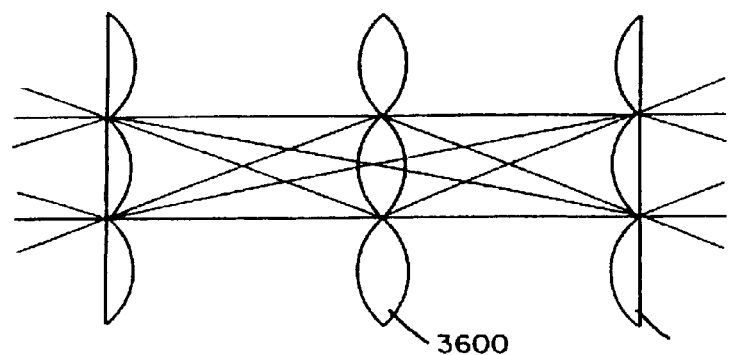
FIG. 36 is a schematic side view of an embodiment of a section of the electronic image projection system utilizing field lens arrays with a light valve.
Figure 56:
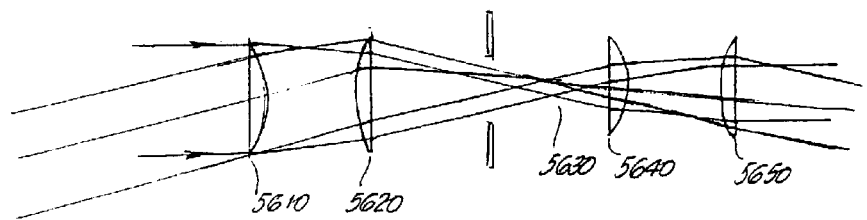
FIG. 56 is a schematic depiction showing a light valve pixel hole with two input lens array elements and two output lens array elements.

With each pixel being brightest in its center and dimmer around its edges, a pixel structure would still appear visible on the screen even though there was actually no space between pixels. This problem can be circumvented by the use of a second or field lens. As shown in FIG. 36, ideally the field lens array 3600 at the pixel plane would cause the light that would miss the array 3610 after the light valve (due to blockage by the pixel apertures) to be redirected, resulting in uniform illumination as seen from the last lens array 3610. In reality however, the field lens array cannot be placed exactly in the pixel plane. Consequently, we can split the field lens array into two lens arrays, one on either side of the light valve, placed as close to the light valve as possible. With this arrangement, depicted in FIG. 56, the first lens array 5610 focuses an image of the source with the help of the first field lens 5620 to an area 5630 beyond the pixel hole. The second field lens 5640 (being the first lens array after the light valve) helps steer the light toward the final lens array 5650. This final array magnifies the image of the pixel forming an image to be projected on the screen by the projection lens. This magnified image of the pixel, as explained earlier, abuts the magnified image of its neighboring pixel, causing a continuous image made of contiguous pixels, with no spaces between them on the screen. It can be seen in the figure that the fourth lens element 5650 is actually not necessary and the third lens element 5640 can be placed in one of many different locations after the light valve to accomplish depixellization. In this case, however, it can be seen that practically anywhere that the depixellating lens is placed (given the proper focal length) will still result in a uniformly illuminated pixel without any vignetting caused by the pixel aperture. Thus the use of two input lens arrays instead of one improves pixel illumination uniformity.

Figure 35:
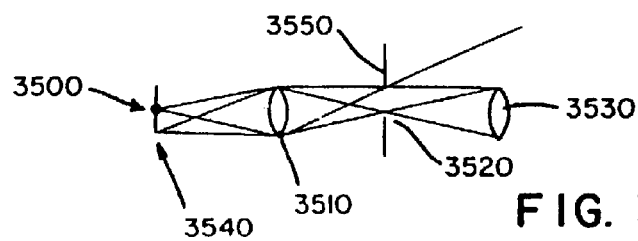
FIG. 35 is a schematic side view of a light valve and lens arrays for further analysis of an aspect of the electronic image projection system.

The most severe problem in using a lens to squeeze the light through the pixel hole, which is not alleviated by the use of a single lens array before the image-forming element, exists due to the thickness of the image-forming element glass. FIG. 35 depicts the arrangement in which the light from the source is focused into the pixel hole.

If the illuminating light source were a true point source, depicted as the center of the lamp filament 3500, light would focus as a result of passing through the array element 3510 before the light valve into the center of the pixel 3520 and then fully illuminate the array element 3530 after the light valve. This would cause a complete uniform illumination of each pixel on the screen, and all of the source light would get through the pixel hole.

However, since the filament is extended and not a true point source, light will be entering the array element before the image-forming element from other positions and at other angles. As seen in the Figure, light coming toward the image-forming element off axis 3540 will come to a focus in the pixel hole at 3550 right at the edge of the pixel hole. Any light approaching the image-forming element from a greater off axis angle will be focused onto the opaque area and not go through the pixel hole, defeating the purpose of using the input lens array.

As an alternative method to focusing light into the pixels, two lens arrays can be used as an array of Galilean or Keplerian telescopes. With this method, collimated light entering the first lens array element will likewise enter the pixel as collimated light. However, since a real source has a finite extent, collimated bundles of light will also enter the first lens array at various off axis angles. This will, again, limit the amount of light that can get through the pixel hole since light that enters from too high an off axis angle will be directed onto the opaque areas of the image-forming element and not get through.

Figure 69:
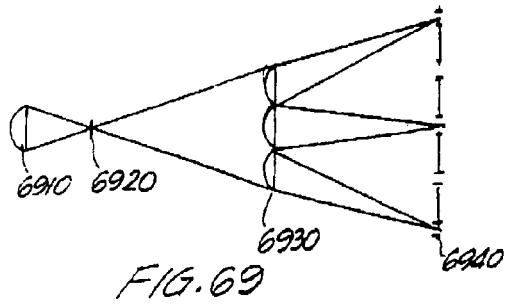
FIG. 69 depicts a double input lens array system with an image forming element.

Due to the glass thickness of typical active matrix LCDs, for instance, and the size of a typical pixel hole, the fastest light cone that could be produced by a lens array placed against the outside of the LCD would be about F6. This F number can be reduced and the acceptance angle of the lens array element can be increased by using thinner glass or by creating GRIN lenses within the glass used to form one of the sides of the LCD. Either of these methods would bring the lens closer to the pixel hole, allowing approximately a doubling of acceptance angle. Aberrations could limit the value of further decreases in F number. Short of using these methods, which require a new light valve design, and utilizing the LCDs that are available today, the preferred method of increasing the light throughput through the image-forming element is based on using two input lens arrays wherein the first lens array creates an image of the light source in space the size of the pixel hole. Since there is no glass spacer in the way, an F2.5 lens can be used, doubling the acceptance angle of the system. The second lens array performs a one to one imaging of that aerial image of the source into the pixel hole, thereby making the thickness of the image-forming element glass irrelevant. This is depicted in FIG. 69 where 6910 is the first input lens array element, 6920 is the aerial image of the source, 6930 is the second input lens array, and 6940 is the pixel hole, with the image formed at 6940 being the image of 6920.

Figure 70:
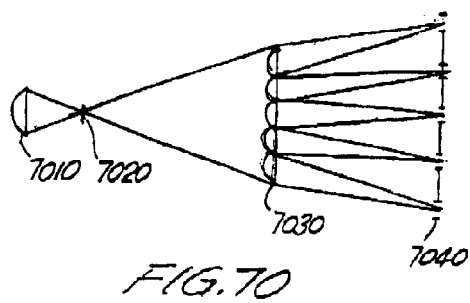
FIG. 70 schematically depicts an alternate embodiment of the invention using two input lens arrays before the image forming element.

Making the image of the source at 6920 as small as the pixel hole increases the angles of light emanating from it so that the light is directed toward multiple lens array elements in the second lens array and is thereby focused into multiple pixels. Light from a single aerial image is, thus, directed in this arrangement to every other pixel (as shown). All light goes through pixel holes and none is focused onto spaces between pixels. In this case, the input angles of the light to the first lens array must be controlled carefully, or else alternating pixels will have a different brightness level than the remaining pixels. To reduce this dependence on careful control of the angles of input light, the lens array elements of the second lens array can be made the same size as the pixel holes (doubling the number of lens array elements in each direction) so that the light from the source image formed by the first input lens array element illuminates several lens array elements on the second array and the same number of pixel holes, without skipping any pixels. This is depicted in FIG. 70.

Variations are possible. For instance, the image of the source formed by the first input lens array need not be the size of a pixel. In that case, the lens distances and the focal lengths can be changed to perform other than 1:1 imaging of the aerial image of the source into the pixel hole.

Again, use of two input lens arrays has an advantage over the use of one input lens array. By doubling the acceptance angle of the input lens array system, more light gets into the pixel holes of the IFE, considering that the light is not perfectly collimated.

If the filament image is not uniform, the distances can be adjusted so that the second lens array element focuses an image of the uniformly illuminated first lens array element into the pixel hole.

Alternatively, three lens arrays can be used so that the second lens array element forms an aerial image of the first (uniformly illuminated) lens array element the size of a pixel hole. This aerial image is imaged into the pixel hole by the third lens array element.

Light can be sent to the IFE with input lens array(s) as a result of being focussed by an imaging lens, forming an image of the exit of a light tunnel. Use of a field lens just before the input lens array(s) bends each light bundle's principal rays so that they are parallel with the optical axis of the system. The use of the field lens reduces the angles of light illuminating the IFE at all points. This allows for the use of input lenses with the same pitch as the pixels.

Light can address the IFE such that its principal rays are not parallel to the optical axis of the system (it can be converging or diverging) and still get through the pixel holes via the lenses if the pitch of the lenses is adjusted to be larger (for converging light) or smaller (for diverging light) than the pitch of the pixel holes.

In an arrangement using a light tunnel which is focussed into the plane of the IFE, for example, using a lens array with a smaller pitch than the pitch of the pixel holes (with the imaging lens being smaller than the IFE) replaces the need for a field lens near the IFE. This way, each bundle of rays hitting any given point on the IFE has its principal rays parallel to the optical axis formed by each lens element and its corresponding pixel hole. Thus, the angles of light illuminating each lens array element are kept to a minimum, and the cone of light illuminating each pixel is within the acceptance angle, allowing all of it to go through each pixel hole, creating a uniformly illuminated image.

In a preferred embodiment of the system of the present invention, the input lens array system, as just described, which can improve system efficiency by a factor of about two (depending on the loss present due to the IFE aperture ratio) could be used in conjunction with the method described earlier herein in which the light is separated into its colors before being sent to the differently colored pixels. This technique will provide an additional gain in system efficiency on the order of another factor of two, making total possible system efficiency improvement of approximately 4 times by using both techniques together. To use them together, the optics must be configured so that light of the proper colors illuminate the proper pixels.

Figure 74:
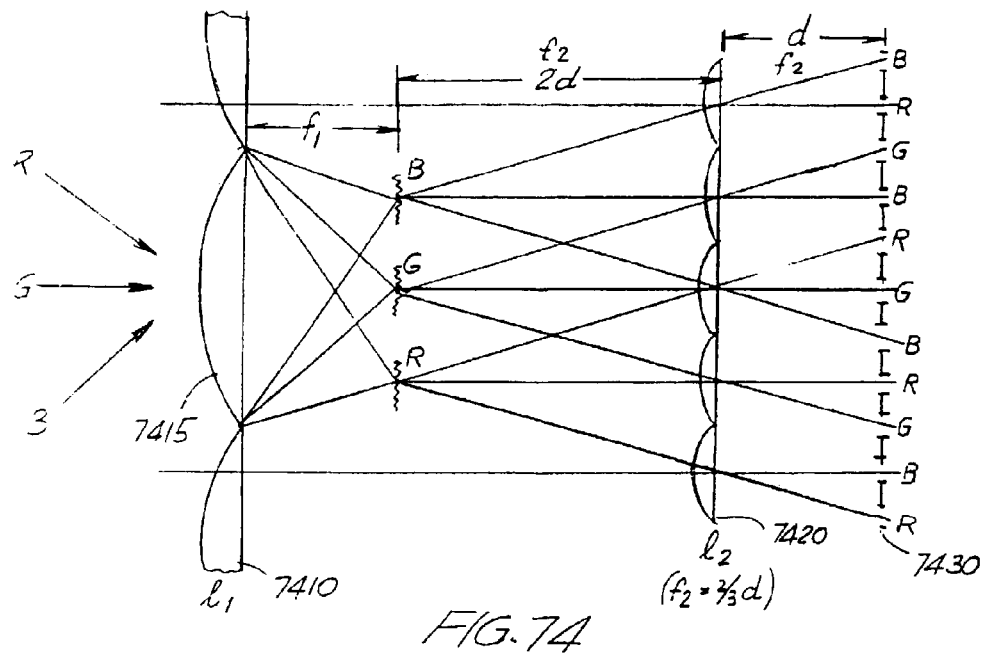
FIG. 74 depicts another embodiment of the invention using two input lens arrays to direct colored light to respective pixels.
Figure 75:
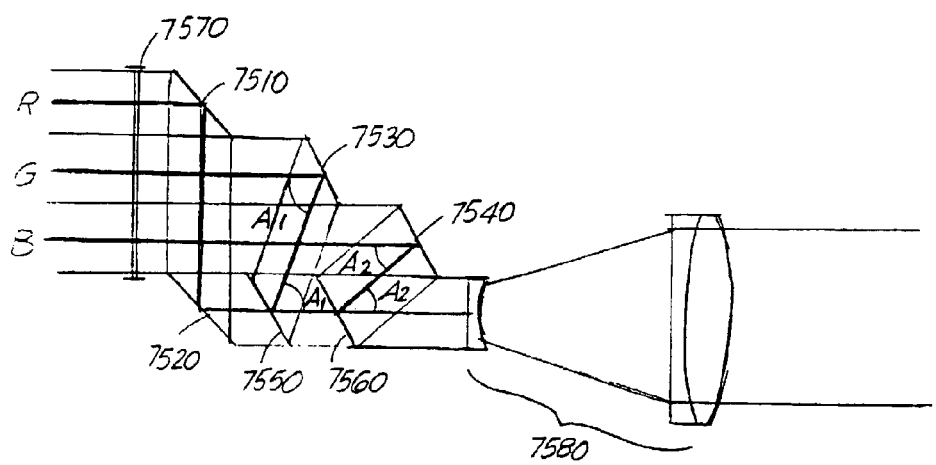
FIG. 75 is a schematic view of a technique of utilizing mirrors to compensate for path length differences of beams travelling from the light valve to the projection lens.

One way to accomplish this is depicted in FIG. 74 in which light has been separated into three differently colored beams which illuminate the IFE at different angles. Two input lens arrays are used. The first lens array pitch is three times the pixel pitch in the horizontal and equal to the pixel pitch in the vertical. The second lens array has twice the pitch of the pixels in the horizontal direction and the same pitch as the pixels in the vertical. Other variations are obviously possible.

Lens array element 7415 of array 7410 creates three images of the source, one for each color, at twice the size of a pixel hole. Lens array 7420 images these sources into the pixel holes 7430 at 2× demagnification. Because of the geometry, as can be seen in the figure, a source image of any one given color is imaged into every third pixel, corresponding to data of that color. This produces a properly colored image with a potential gain of four times.

If a method of breaking up the colors is used that produces separate, differently colored beams whose principal rays are parallel to each other, then the first input lens array 7410, if necessary to form the colored aerial images of the source, can have the same pitch as the second array 7420.

If a method for breaking up the colors is used that produces a continuous spectrum instead of three discrete beams, one for each color, then an additional lens array can be used with a pitch equal to that of array 7420. This array, placed between arrays 7410 and 7420 would act such that each element would take one third of the spectrum produced by each lens element 7415 in array 7410 and create an aerial image of it with twice the width of a pixel hole. The 2:1 imaging of these aerial images into the pixel holes by array 7420 would then take place as before.

The previous example assumed that color filters, if used, were in the plane of the pixels. If color filters are used that are outside of the plane of the pixels, a different arrangement may be required, depending on where the color filters are placed. If the filters are placed near the colored aerial images of the source, the same set-up will work properly. However, if the filters are placed just outside the IFE, and, consequently, near the final input array, a different arrangement must be used.

In that case, if light beams (white or colored) illuminate the IFE through such filters other than parallel to the axis of the system, their angles must be carefully chosen so that the proper colored light beams go through the corresponding color pixels. A beam of any given color that illuminates the IFE off axis will still contribute to a properly colored image if it is either shifted vertically by two rows or if it is shifted horizontally by one and one-half pixels and vertically by one pixel. Such shifting is easily done using known optical methods or those described herein. This assumes a pixel arrangement such as is depicted in FIG. 15*b*.

The same optical techniques can be used with a single input lens array as well. Various combinations of the methods described herein can obviously be utilized for combined benefits within a system.

As an example, multiple light sources can be used, with each one focussed into a separate light tunnel. Each light tunnel's output can then be focussed onto the same IFE, being careful to select the proper off-axis angle so that each off-axis beam enters the IFE one pixel over after passing through the same lens array elements as the on-axis beam.

Once light has been crammed into the pixel holes, it most likely will be emerging from them as a diverging beam, diverging at a narrow angle such as 5 degrees. While this is fine for projection, when these techniques are used for direct view, the possible angles of view may be considered too narrow. The angle of view can be substantially increased by the use of a lens array after the image-forming element (such as an LCD) which focuses an image of each pixel onto a rear screen. Such a screen, especially of the types disclosed herein with selectable gain and angle of view, will make the display evenly visible over as wide an angle as desired. This technique is useful even if no techniques are used to cram light into the pixels, as is the case in today's direct-view displays. Such displays, such as are found in a laptop computer, also suffer from color shifting and loss of contrast when viewed from angles other than normal to the display. These problems can be eliminated with this technique. A high-gain screen with high transmissivity will provide an image nearly as bright as that of the display when viewed directly, but with a wider field of view. Even diffusely illuminated displays, such as LCDs, have a relatively narrow field of view which can be increased in this way.

With the increased popularity of "letter-boxed" movies, which more nearly match the aspect ratios of movie theater projection and HDTV, another problem occurs which also can waste light.

Since light valves, for instance, are generally not totally opaque when no signal is applied, a letter-boxed image will show leaked light in the areas above and below the picture where it should be perfectly dark. To eliminate this light leak, opaque "shutters" can be brought into the top and bottom areas of the light valve, as close to the image plane as possible, to assure no light gets to the screen in the areas that should be black when the image area is smaller than the active area of the light valve.

To eliminate the waste of light that occurs in this situation, a pair of cylinder lenses or prisms can be used in the beam before the light valve to alter the aspect ratio of the beam so that all available light illuminates the image-bearing area only.

With these methods, the higher the spatial coherence of the light source (the more of a "point-source" it is) the more efficiently these methods will operate. However, to produce more light or to make a bulb with a longer life, requires the use of a larger lighted area. To take advantage of such sources, with the techniques described herein, the source size must be reduced by "funneling" the light down to a small point.

Another method of cramming light into the pixel holes is by using a fiber optic bundle in which the input end is tightly packed and the output end is arranged so that each fiber is the same size as its adjacent pixel hole.

There is one other source of wasted light in a video projection system which is never thought of as wasted light. This is the light that is removed from certain areas in the image because those areas are supposed to appear as darker areas. This is light that should not reach the screen so that brightness variations can be produced on the screen to create an image. However, this light need not be totally lost.

With the use of a light valve that utilizes polarized light, a polarizer is used after the light valve to act as an analyzer. Light that should not appear on the screen exits the light valve polarized perpendicular to the axis of this polarizer/analyzer and is thereby absorbed by the polarizer. This generates some heat as well, which can heat up the light valve, if the polarizer is near it, and is also inefficient in that only 25% to 35% of the light that should be going to the screen makes it through the polarizer/analyzer. By using a MacNeille polarization beam splitter or a Fresnel polarizer (as described herein) instead of the final polarizer/analyzer, several advantages are realized. Since there is no absorption, no heating occurs. Because nearly 50% of the light appears in each beam, nearly 100% of the light that should go to the screen passes through the analyzer to the screen. A plane mirror in the path of the beam exiting the MacNeille analyzer that normally would have been absorbed by a sheet polarizer can reflect that normally wasted beam back to the light source for reprojection through the system to the extent the beam is collimated. The beam will retrace its path through the system ending up being focussed into the center of the light source to be gathered by the collecting mirrors for reprojection through the system. Although a large portion of this light will not make it to the screen due to non-parallelism, and consequent inability to retrace its path through the entire system, and due to loss of improperly polarized light exiting the first MacNeille polarization beam splitter or Fresnel polarizer on its way back to the bulb, some brightness will be added to the image that would not have been available if this technique were not used.

The various light saving or "brightness enhancement" techniques disclosed herein can greatly increase the light output of most displays including projection systems and direct view systems such as LCDs.

As an example of how much improvement can be achieved, consider a single LCD-type projector. Use of more efficient light collection can double brightness. Shaping the beam to fit-the LCD can result in over a 30% gain. Use of a non-absorbing polarizer that makes use of both polarizations can double the brightness. Splitting up the white light so that the proper color light addresses the proper pixels so light is not absorbed can more than double brightness. Use of light that has been collimated sufficiently to match the acceptance angle of input lens arrays can more than double brightness, depending on the aperture ratio of the LCD. Since these enhancements are multiplicative, multiplying them together gives a theoretical brightness gain over a standard LCD projection system of approximately 20 times or more than 2000%. Actually achievable gain in the real world is usually less than predicted by theory, but nonetheless can be quite substantial.

Many projection formats can be used in conjunction with the disclosed video display systems. In addition to curved, direction-sensitive, high reflectance screens, less expensive, more widely dispersive screens can be used with this system. A regular movie screen or even a wall proves adequate with a system of such high brightness. By vertical mounting of the unit or the attachment to the projection lens of a front-surface mirror, the image can be displayed on a bedroom ceiling. This technique allows for convenient viewing of video imagery while lying in bed, without causing neck or back strain.

Rear-screen projection can be achieved as well. Conventional rear-screen television utilizes a lenticular lens and a Fresnel lens for adequate brightness. This adds a discernible pattern to the image and produces a limited angle of viewing both horizontally and vertically. This type of screen, like a conventional CRT, reflects ambient light to the viewer, creating glare which adds to the viewer's eye strain. With the present system, brightness is much higher, allowing for a broader viewing angle as well as more streamlined, lightweight and aesthetically pleasing display units.

The high brightness allows for the use of a gray matte (i.e., textured) screen material with wide dispersion angles. This creates an image that is viewable from practically any angle with uniform brightness and no glare. This type of glareless screen, coupled with the ability to vary the brightness and color temperature of the display by selection of bulb type and operating voltage, may also provide a significantly less fatiguing display for individuals who must spend long hours staring at a video display terminal.

One of the most efficient types of screen (front or rear) can be made using holography. With a hologram, a diffuser can be produced with a predetermined dispersion pattern, creating as much diffusion as desired, with precisely tailored brightness distribution characteristics. Efficiency can approach 100% The interference pattern can be made optically for simple specifications or by computer generation for more complex characteristics. Bleached or gelatin phase holograms or metalized embossed holograms can be used to produce the actual screen with high efficiency.

With rear-screen projection, rather than locating the projector several feet behind the screen to allow the image to expand sufficiently to fill the screen, one or more mirrors can be used to reflect the beam one or more times to allow image expansion within a smaller cabinet size. For instance, a cabinet approximately 18" deep could be used to fill a rear projection screen with a diagonal measurement of 50".

Figure 47:
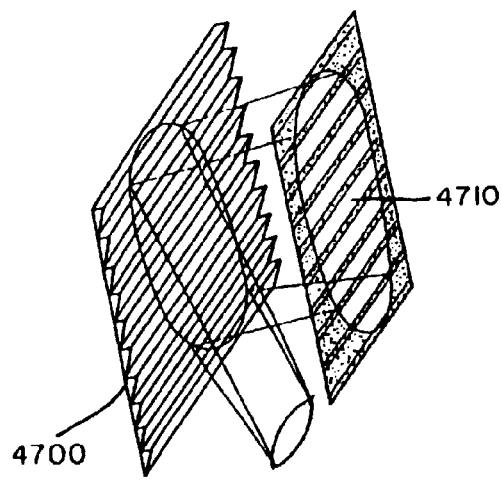
FIG. 47 is a schematic view of the operation of a "Fresnel mirror" used in an analysis of the operation of an element of the electronic image projection system.

When an image projected on a screen is viewed in an environment where there is much ambient light, the areas of the screen that should be dark become filled with the ambient light, reducing contrast in the image. A type of screen can be constructed which will provide a bright image with high contrast in high ambient light situations in both front and rear projection. The front projection version of this screen is depicted in FIG. 47 and comprises a regular front projection screen such as a beaded, flat white or metallic coated screen. On top of the screen is a black mask with relatively thin horizontal slits. A lenticular lens whose cylindrical lenslets are oriented horizontally is placed on top of the slit mask. There is one slit for every cylindrical lenslet. For maximum versatility, the slit mask is adjustable in the vertical direction. Light from the projector focuses an image on the lenticular lens sheet of this screen, breaking the image into many horizontal sub-images corresponding to the number of horizontal cylindrical lenslets. Each lenslet focuses its image component to a thin line which passes through the corresponding slit in the mask to be reflected from the screen behind it. This reflected light is re-expanded by the cylindrical lenslet for viewing with high visibility from all angles. Ambient light arriving at the screen from any height other than that of the projector (which makes up most ambient light), will be focussed by the lenslets onto the black light absorbing layer and will not be visible to the viewers.

The rear projection version of this screen is constructed by placing two horizontally oriented lenticular lens sheets back-to-back with their flat sides towards each other. The slit mask described above is placed between the lenticular lens sheets. Optionally a highly transmissive rear screen material can be placed next to the slit mask (also between the lens sheets). The screen operates in the same manner as the front projection version to eliminate ambient light reaching the viewer. In both front and rear configurations, the slit mask can be adjusted up or down to allow the light from the projector to pass exactly through the slits, depending on the projector's height in relation to the screen.

A rear-projection screen can be made with a selected gain by using a layer of micro-prisms on a substrate such as lucite. Microprisms can be molecular in size by using transparent molecules which have non-parallel sides such as silicon or polymer molecules. Increasing the molecular concentration and/or coating thickness will lower the gain and increase the angle of view without noticeable brightness falloff. The best gain, in the applicant's opinion, is a compromise of perceived brightness when viewing the screen head-on (where most viewing will be done) and the largest viewing angle without a noticeable falloff in brightness. Experiment shows the best compromise at a gain of between 1.3 and 1.4. Charcoal or other dye molecules can be added to adjust perceived image color temperature, to create a darker black to increase contrast, and to provide absorption of ambient light. Carbon and dye added to such a screen with a 1.3 gain so as to produce a transmissivity of 45-48% gives the best compromise of transmitted image intensity loss verses contrast improvement and ambient light absorption improvement.

A holographic screen can be made in a number of ways to accomplish the same ends. For example, a hologram can be made of the screen just described having a selected gain with the screen focused into the plane of the hologram by the use of a large lens or a second hologram (as is known in the art). Using a reference beam at normal incidence, or the angle most likely to be taken by a projector illuminating the finished screen, with approximately a 1:1 beam ratio will result in a higher transmissivity than the original screen being holographed, especially if a phase hologram is used (such as bleached silver, DCG, or photopolymer).

Another way to make a holographic screen with a specified gain is to use a carefully illuminated hemispherical diffuser with selected brightness at different angles as the "object" of the hologram.

A holographic screen can be made as a computer-generated hologram by modeling the "object" just described and its interference with an appropriate reference.

Holographic screens have the advantage of being able to adjust the gain and angle of view, both horizontally and vertically, independently of each other.

Taking advantage of the fact that light from a light-valve is usually polarized, ambient light rejection can be increased in a screen with relatively little effect on image brightness by placing a linear polarizer on one or both surfaces of a screen. Only a few percent of ambient light which hits the screen will get to the viewer while the polarizer whose axis matches that of the polarized light from the image, will attenuate the image relatively little.

Since polarizing material is conveniently made with a fixed axis orientation relative to the material roll length, when such polarizing material is put on a screen, its axis may not match the axis of the polarized beam illuminating it. This can be remedied inexpensively by placing a sheet of half-wave material in the beam and rotating it for maximum screen brightness. The half-wave material can be placed in the projector or at or near the projection lens where the beam is small, allowing for the use of a small piece of material.

Ambient light that is reflected specularly from the surface of the polarizer will be reflected to the viewer without attenuation from the polarizer. Although this usually represents a small portion of ambient light, in some circumstances this will still be objectionable. To significantly reduce such specular reflection, a thin material such as polyester, mylar, or other thermo-plastic can be embossed with a diffuser pattern. This pattern can, for instance, be the surface of a piece of sandblasted glass or other non-planar surface. This material can be applied to the surface of the polarizer with an index-matching pressure-sensitive adhesive.

Alternatively, the polarizer can be AR coated or adhered to AR material as described elsewhere herein.

These methods are useful on both front and rear projection screens.

Figure 17:
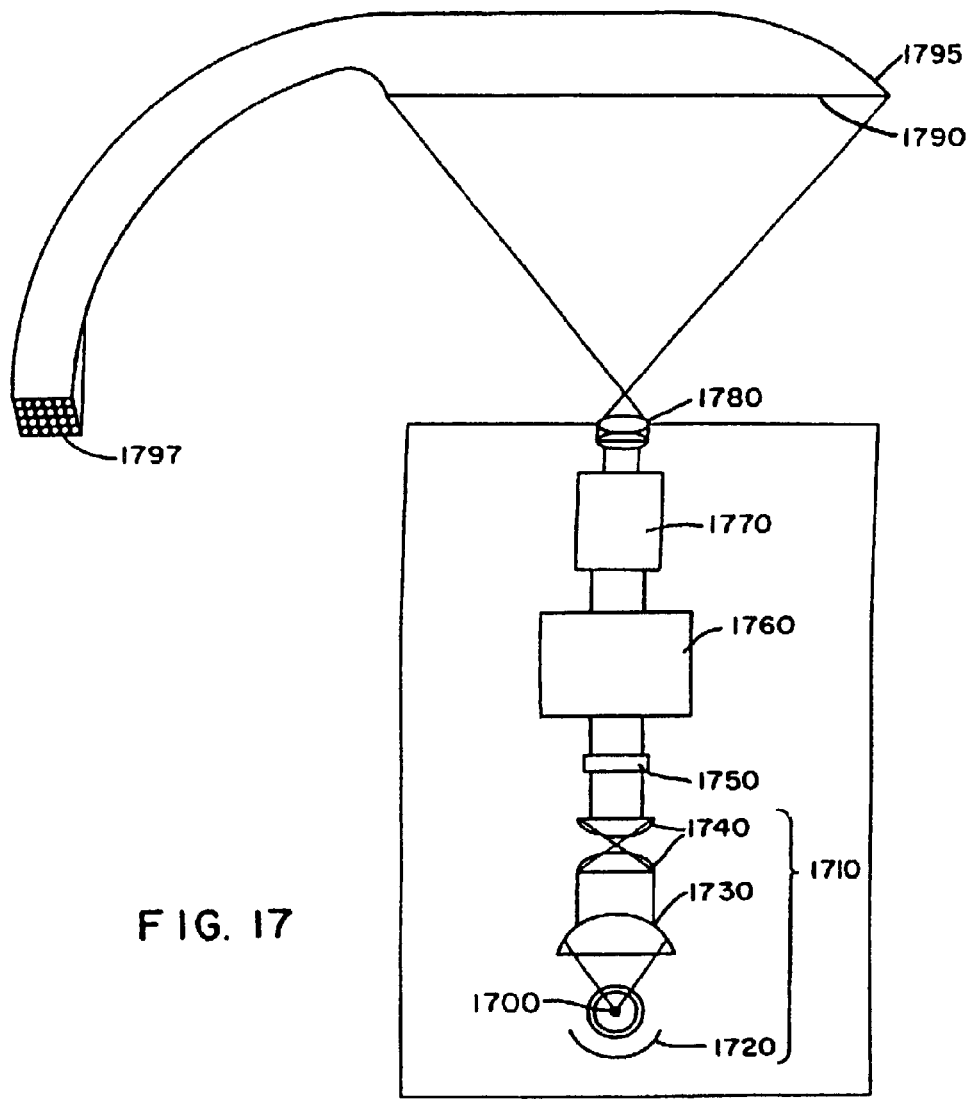
FIG. 17 is a schematic diagram of the preferred embodiment of the invention.

Another method could be used to reduce ambient light reflection. The video projector's image can be focussed onto the input end of a coherent fiber optic bundle. This is shown in FIG. 17 as 1795 which places the input end of the fiber bundle into the projected beam instead of screen 1790. The other end of the fibers 1797 can be flat or polished into lenses or can be coupled to lenses. Thus each fiber, separated from neighboring fibers, can magnify (due to fiber separation and due to the lens) and deliver to a rear-screen a portion of the image (preferably one pixel or part of a pixel per fiber), magnified a predetermined amount. The composite image will appear continuous, creating a very large image, with only a few inches of cabinet thickness since the fibers can bend. This technique also eliminates the need for any other subsystem to fill the spaces between pixels. Using the fiber optic screen with the fibers spread apart at the output end, no lenses, and no screen, in conjunction with black, light absorbing material to fill the spaces between the fibers will produce a bright image in an area with high ambient light such as in an outdoor stadium. This is because a majority of the surface area of the output of the fiber bundle will be absorptive to ambient light, while all of the image bearing light will still be sent to the viewer. However this is done at the cost of creating a pixel-like structure due to the spaces introduced between the fibers. When viewing a large projected image in this situation however, the viewers are generally positioned at some distance from the screen which will make the pixel structure virtually invisible to the viewers.

Figure 14:
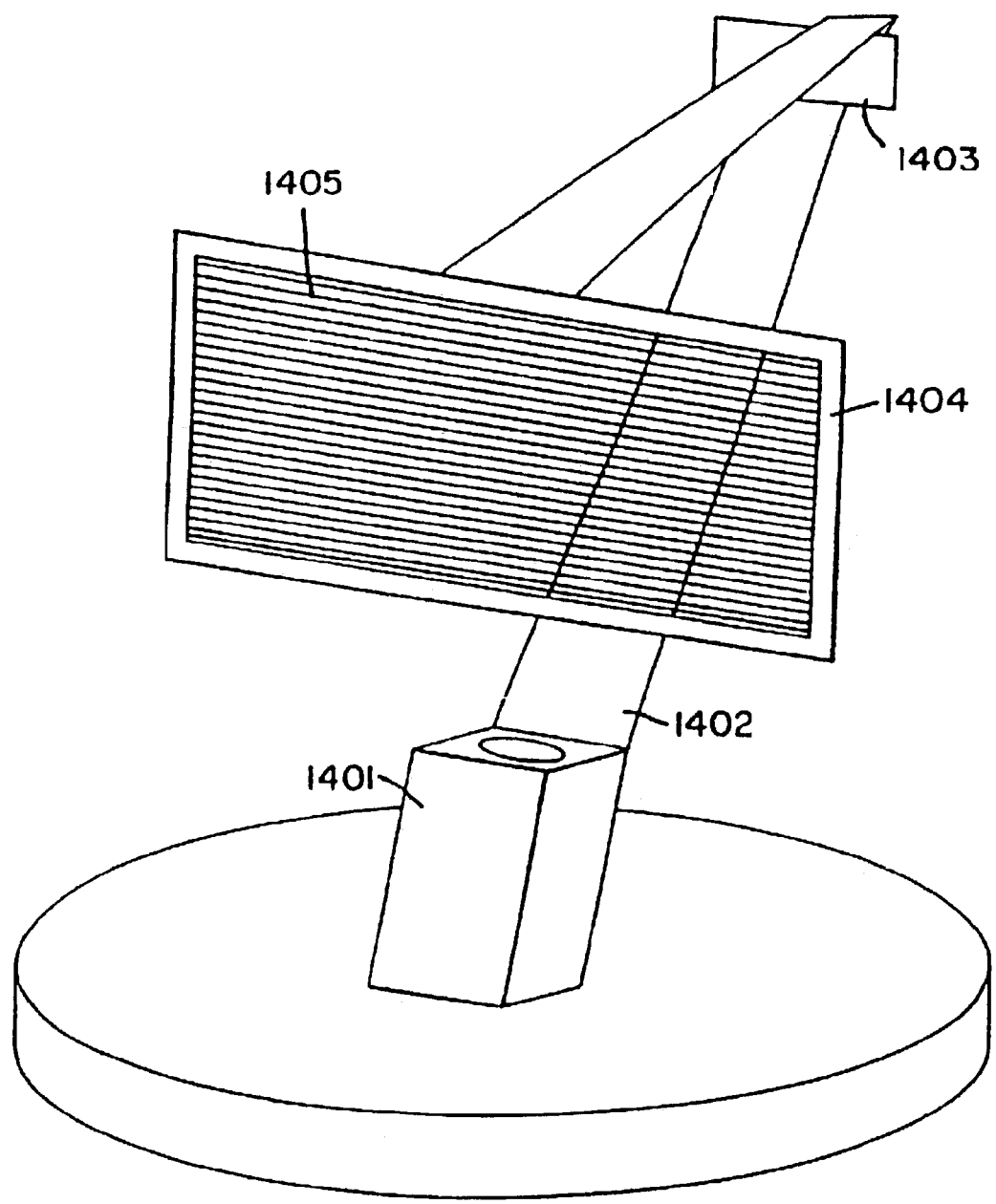
FIG. 14 is a schematic view of a rear-screen projection system utilizing the present invention with a venetian-blind type of rear-projection screen.

An example of an artistic and futuristic projection system is illustrated by FIG. 14. The video projector 1401 can be mounted to an upright 1402 projecting an image onto a mirror 1403. Mirror 1403 can reflect the image to onto a special rear screen 1404 mounted in a frame which appears to be "hanging in space." The screen itself can be made of extremely thin slats 1405 of almost any rear projection material. By mounting an axle onto the ends of each slat with a gear on each, a motor drive can be used to open (slats lying flat and parallel to the floor) and close the slats (lying perpendicular to the floor, creating a solid rear screen for projection). In the open position, the screen will appear as a transparent window in space. When the projection unit is turned on, by remote control for instance, the slats can simultaneously and quickly be closed, creating a "video image in space."

Whatever projection method is used, two other important problems can occur. Unless the surface being projected upon is perpendicular to the optical axis of the projection beam, the image will suffer from keystoning and blurring of the parts of the picture not precisely focussed on the screen surface. This problem is inherent if the projector is mounted on the floor, on a low table, or on the ceiling while the screen is centered on a wall. CRT systems handle keystoning by varying the electromagnetic scan line deflection. Some light-valve based systems, however, have predefined pixel locations and thus cannot utilize this technique.

Consequently a type of anamorphic lens system can be constructed. A zoom lens normally changes the size of a projected image by changing the relative positions between the elements of the projection optics. However this could also be accomplished if lens elements of different curvatures were used. Applicant's system could employ a lens which is shaped as if it has added to it two varying focal length lenses, one above and one below the standard lens molded into one lens. The central area of the lens, large enough to encompass the entire light beam from the valve, creates a rectangular projected image. But if this lens is raised or lowered with respect to the light valve, the magnification varies across the image, causing a trapezoidal image predistortion with either the top or bottom of the image of the light valve being the largest side of the trapezoid. Thus, the lens is adjusted up or down, depending on the angle the video projector is making with the screen and thereby the keystone effect is cancelled.

The variable focus problem can be corrected by a little-known photographic technique known as "Scheimpflug correction." If a scene to be photographed has a large depth and a fairly large aperture is used, the only way to simultaneously focus all elements of the scene is to tilt the lens and film plane such that a line drawn through all objects in the scene intersects the line drawn through the film plane at the same point that it intersects a line drawn through the lens plane. In a camera, this is accomplished by bellows. Using the same logic, a mechanical adjustment that tilts the light valve plane and the plane of the projection optics, creating an intersection with a line passing through the screen plane, will cause the entire image to be in focus, even though the projector's beam is not perpendicularly aimed at the screen.

Science fiction has always portrayed the video display of the future as a thin large screen that hangs on the wall and modern day technologists have been working towards that end for decades. With an image projected onto a wall, the idea is almost realized. However, projection onto a wall mandates that the projection distance be included as part of the system because nothing may be placed between the projection lens and the wall. Applicant has devised a new type of screen which would eliminate this intervening space or projection distance. With this screen, the projector can be placed underneath it or even be built into the screen itself, and yet the entire device thickness need not exceed a few inches. This screen takes advantage of the phenomenon that a beam of light of small diameter shone on a surface at a very oblique angle can be spread over a huge distance. When the propagation direction of the light beam is nearly parallel to a surface, the beam can illuminate the entire surface, even if the surface is hundreds of times larger than the diameter of the beam, with no projection distance necessary before the light hits the surface. Spreading of a light beam by shining on an oblique surface "expands" the light beam's dimensions in one direction. If the surface could then re-direct the very wide beam, onto another surface, again at an oblique angle, but orthogonal to the first surface, the beam could again be spread in the orthogonal direction with no projection distance required.

This re-direction is realized by a surface with saw-tooth shape elements with the sloping side of each saw-tooth mirrored 4700, forming a "Fresnel mirror." As shown in FIG. 47, this will spread the light over a large area, but will create horizontal stripes of light with dark horizontal stripes between them 4710. The smaller these reflectors, the more of them there are, and the less noticeable the black bars in the image. To make the light coverage continuous and eliminate the dark stripes, the sloping surface of each saw-tooth need only be curved slightly to expand the segment of light that hits a given saw-tooth sufficiently to cover half of the dark band on either side of the light band reflected by the saw-tooth. Alternatively, a lenticular lens can be placed between the saw-toothed surface and the imaging area.

An alternate method of producing a surface that will behave as required is to use known techniques to produce a holographic surface that will re-direct the light into the right directions.

Figure 48:
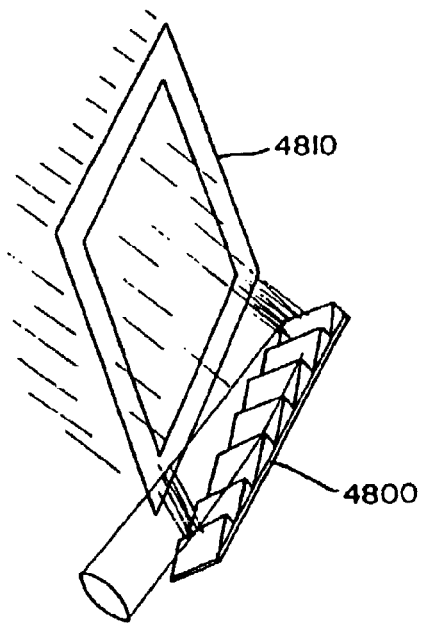
FIG. 48 is a schematic view of the one embodiment of a thin screen section of the electronic image projection system utilizing a Fresnel mirror and a rear screen.
Figure 49:
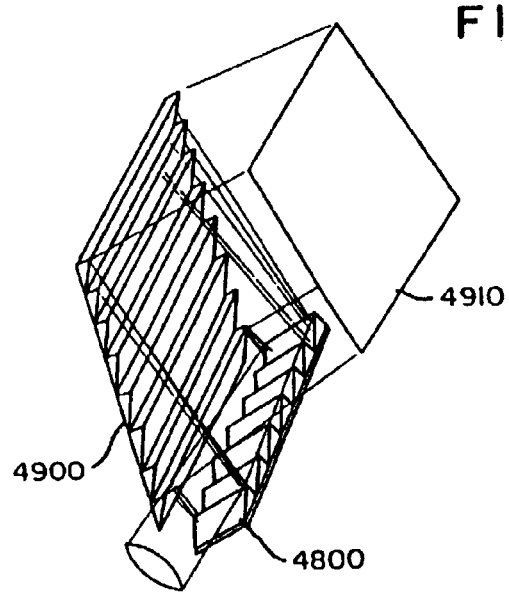
FIG. 49 is a schematic view of a section of the electronic image projection system utilizing two Fresnel mirrors and a rear screen.

If the light beam aimed at such a "Fresnel mirror," contains an image, the image will be spread in one direction onto the surface of the Fresnel mirror. If the Fresnel mirror 4800 is placed at an oblique angle to a rear screen 4810, as is shown in FIG. 48, the image will now be expanded in the orthogonal direction, filling the entire screen. However, since the image viewed from a rear screen appears brightest when looking at the screen towards the source illuminating the screen, the screen would be its brightest only when viewed at an oblique angle. Adding a second Fresnel mirror 4900 to re-direct the light in a direction normal to the screen 4910 makes the image visible on the screen brightest when viewing in a normal fashion. (See FIG. 49.)

Alternatively, instead of utilizing curved saw-tooth surfaces or lenticular lenses after reflection from each Fresnel surface, a spherical lens array can be placed just before the final viewing screen to eliminate spaces between sections of the image.

Two distortions are created by projecting onto a screen by way of Fresnel mirrors. Since the image spreads out in all directions as it propagates, the image will be wider the further it has to go, with the furthest end being wider than the nearest end. This trapezoidal distortion will be repeated in the orthogonal direction when reflecting from the second Fresnel mirror. These two trapezoidal distortions can be corrected by pre-distorting the image trapezoidally in both axes with appropriate lenses in the opposite directions of par the trapezoidal distortions that will be encountered due to spreading. The second distortion is focus distortion due to the widely varying distance from the projection lens to the near part of the image versus the distance from the projection lens to the far part of the image. This focus distortion can be corrected by tilting the projection lens with respect to the light valve plane in the direction opposite to the screen tilt. This tilt uses Scheimpflug correction (described above) so that the entire image is in focus on the screen, even though it is being projected at oblique angles. Such a screen system could be used for the projection of any type of image, including slides and movies as well.

Although projection systems generally project their images on some sort of screen, in some instances it would be advantageous to project directly onto the retina of one's eye. Since a light valve, such as an LCD, can be made very small and lightweight, and using some of the techniques listed herein, an efficient projector can be made which is very compact and lightweight. It then becomes feasible to mount such a system on a headband or pair of glasses so as to give the viewer his own private viewing screen. Because the entire retina can be projected upon, the viewer can see his entire field of view covered with the image. If the image is projected into one eye only, the viewer will be able to see the projected image all around him, but, it will appear superimposed on the real world. This technique could be especially useful for private viewing of a movie or confidential data, without others seeing it, or for providing a computer screen to be connected to a computer in place of a monitor. This application would free the viewer's body and head from being constrained to one position for long periods of time.

In place of a conventional projection lens or condenser system, compact optics such as lens arrays can be used to image each pixel onto the retina with a corresponding lenslet for each pixel. Alternatively, compound holographic optical element could be used or multiple curved reflectors facing each other's reflective surfaces, with on and off-axis elements to reflect and image a light valve onto the retina could be used.

The present invention lends itself to three-dimensional video projection. One method of accomplishing 3-D projection is to use two projection systems with the polarizers of one light valve system perpendicular to the polarizers of the other light valve system. Sending stereoscopic video signals, derived from two displaced cameras for instance, and projecting onto a non-depolarizing screen will allow viewers wearing polarized glasses to see full-color 3-D video. A single lens 3-D video projection system can be constructed by placing both light valve systems in one enclosure. Internally, the two orthogonally polarized stereoscopic images can be joined by a MacNeille prism. Alternatively, instead of using the second mirror 503 of the first "striped mirror pair" 502 and 503 of FIG. 5, the horizontally displaced spaces between the pixels of one light valve can be filled by the pixels of the other light valve through a simple beam splitter set-up, creating a horizontally interlaced, orthogonally polarized 3-D image pair for projection through the single projection lens. Striped mirror 502 can be tilted at a 45 degree angle with respect to the axis of the light from the first light valve. The light from the pixels of this light valve will pass through the clear areas of the striped mirror. The second light valve, whose axis is perpendicular to the axis of the first light valve, reflects its light from the mirrored areas of the striped mirror, causing an interlaced composite image made from both images, with orthogonal polarization.

Another method of 3-D projection which can be used is auto-stereoscopic 3-D projection. This method does not require any special glasses for 3-D viewing. Two identical lenticular lens screens, with their cylinders oriented vertically, placed back-to-back, optionally, with a thin translucent screen between them are projected upon at different angles by two or more video projectors, bearing stereo or multiple-angles-of-view information. The images can be viewed from the opposite side of the screen at various locations in space. As one moves to various locations, around the screen, the images are viewable, one at a time, without image overlap. This creates several orthoscopic as well as pseudoscopic viewing zones in space. If one positions his eyes in an orthoscopic viewing zone such that one image goes to each eye, a 3-D view will be visible. Many viewers will be able to view an orthoscopic 3-D video image from several angles and positions at once. This type of screen can also be used in front projection with a regular screen behind a lenticular lens.

Another method of preparing stereo visual data for 3-D viewing uses half waveplate strips to rotate the plane of polarization 90° for alternating columns of pixels. The columns would be addressed so that every other column would produce a right-eye image and the intervening columns would produce a lefteye image. Alternatively, instead of alternating columns, alternating rows, could be used for the presentation of left and right eye images. Other presentation patterns could be used to present a more uniform integration of left and right eye images such as having each row consist of alternating left and right eye image pixels followed by a row offset by one pixel such that a checkerboard pattern of left and right eye pixel images is produced. All pixels corresponding to one eye's image can be covered with a half waveplate so that one eye's image is polarized orthogonal to the other eye's image. With this arrangement a single projector with three or even one light valve can be used to project onto a non-depolarizing screen for viewing with polarized glasses and the stereo images will always be in registration without requiring alignment.

In using any of the methods described herein for filling in spaces between pixels, the data for each eye's view can be made to overlap the data for the other eye's view on the screen. This will cause each eye's image to appear continuous without holes, lines, pixels or other spaces.

Half waveplates may be made pixel-sized and placed over the correct pixels by photo-lithography technology. A photographic mask, corresponding to the pattern of pixels to be viewed by one eye, is imaged with U.V. onto photoresist which is coated onto birefringent plastic of the proper thickness. Once the photoresist is developed away in the exposed area (or unexposed areas, depending on the resist used), a chemical can be used to dissolve away the plastic that is exposed. Subsequently, the remaining resist is washed away, leaving a mask to be placed on the light valve. Alternatively, a master dye can be similarly made of metal which can then be used to punch out holes in the appropriate places in a sheet of birefringent plastic to produce the mask for the light valve.

A light valve that is addressed in alternating vertical columns of right and left eye views can be projected onto a lenticular lens screen (in front or rear projection) to produce an auto-stereoscopic display which can be viewed without glasses to produce a 3-D image.

With the use of digital circuits and computer capability built into the system, the system can be used to process images so as to turn a two-dimensional image into a three-dimensional image. One method of doing this requires pre-processing of the movie to convert it to 3-D. The conversion need be done only once, with the converted version being stored for projection at a later time. With this technique, objects in a scene which should appear to the viewer to be located somewhere other than in the plane of the screen can be selected during pre-processing and marked. Software can direct a computer to follow the marked object from frame to frame. This allows the operator to select an object only once until it disappears from view, eliminating the need to mark the object in every frame. Once an object in a scene is selected and marked and the depth at which it is to appear is determined and input, the computer can generate a duplicate image of that object at a spacing to the primary image that will cause the eyes to see the merged image at the desired depth. Using, for instance, the stereo system, described above, in which two projection systems have their images perpendicularly polarized, to be viewed by someone wearing polarized glasses, the computer can generate this duplicated image for projection with polarization perpendicular to the first image. The projector will project this duplicate image on the screen next to its counterpart image, separated by a distance, which determines the depth at which a viewer will see the composite image. When an object is selected to change its depth inputting this fact and indicating its new depth will cause the computer to change the distance between the two component images to be projected on the screen. This will cause the viewer to see the composite image formed in his brain by binocular fusion at the new depth.

Another technique can be used to create depth in an image, utilizing the above-described projection systems. With this technique however, conversion to 3-D occurs as the image is projected with no human intervention or preprocessing necessary. The imagery however should be shot with this system in mind if the depth created is to be realistic. By having the projector store, for example, three frames at a time and project, as the stereo frames to be viewed, frames 1 and 4 at any given time (4 being the current frame being shown, for instance, and 1 being the frame which was shown four frames ago), a 3-D view is created using glasses or an autostereo screen as described herein. The faster an object moves, the larger the distance will be between the left and right eye images and thus the further behind or in front of the screen the image will appear to the viewer. Consequently, motion of objects should be coordinated with their depth to provide the most realistic three-dimensional imagery.

Various recently developed technological innovations such as wireless transmission of sound from the projector to speakers, wireless transmission of cable and VCR signals to the projector, a built-in VCR and/or a built-in computer when built into a projection system as described herein will produce a projection system with much broader use than any other system available today.

While the preferred and alternate embodiments of the invention have been illustrated in detail, modifications and adaptations of such embodiments will be apparent to those skilled in the art. However, it is to be expressly understood that such modifications and adaptations are within the spirit and scope of the present invention as set forth in the following claims.

What is claimed is:

1. A display system, comprising: a light source; an electronic image-forming element capable of having an image formed thereon; a light tunnel located between said light source and said electronic image-forming element for sending light from said light source to said electronic image-forming element and having inner light-reflecting surfaces, wherein said light tunnel has an output aperture having an aspect ratio matching an aspect ratio of said electronic image-forming element.

2. The display system of claim 1, wherein said lens increases collimation of light emanating from said light tunnel.

3. The display system of claim 2, wherein said light tunnel acts as a non-imaging concentrator.

4. The display system of claim 1, wherein said light tunnel has an input aperture, said display system further comprising a spherical reflector for forming an image of said light source at said input aperture.

5. The display system of claim 4, wherein said light tunnel is adapted to operate as a non-imaging concentrator.

6. The display system of claim 1, wherein said light tunnel has flat sides in one plane and is curved in another plane such that it operates as a non-imaging concentrator.

7. The display system of claim 6, wherein said light tunnel expands as it gets closer to said electronic image-forming element for decreasing divergence and increasing collimation of light exiting the concentrator.

8. The display system of claim 1, wherein said light tunnel is dimensioned for providing a predetermined number of reflections of the light before it reaches said electronic image-forming element.

9. The display system of claim 1, wherein said surfaces are mirrored.

10. The display system of claim 1, wherein said light tunnel reflects light by total internal reflection.

11. The display system of claim 1, wherein said light tunnel is made from a material other than air.

12. The display system of claim 1, wherein said light tunnel has one of rectangular and square profiles.

13. The display system of claim 1, wherein said light tunnel has a circular profile.

14. The display system of claim 1, wherein said light tunnel has an input aperture, an output aperture and a shape which changes between said input and output apertures.

15. The display system of claim 14, wherein said light tunnel expands between said input and output apertures.

16. The display system of claim 14, wherein said light tunnel contracts between said input and output apertures.

17. The display system of claim 1, further comprising means for magnifying an image of said output aperture positively or negatively.

18. The display system of claim 1, wherein the image of said output aperture has a size which is different from a size of said electronic image-forming element.

19. The display system of claim 1, wherein the image of said output aperture has a size which is the same as a size of said electronic image-forming element.

20. The display system of claim 1, wherein said light tunnel is "folded" and defines at least two light tunnel light paths.

21. The display system of claim 20, further comprising at least one optical element selected from a group including a lens, mirror and prism placed between said light tunnel paths.

22. The display system of claim 1, wherein said at least one lens makes principal rays emanating from said output aperture parallel to an optical axis of said display system.

23. The display system of claim 1, comprising a plurality of light tunnels for sending light to said electronic image-forming element.

24. The display system of claim 23, wherein said light tunnels have means for sending light to said electronic image-forming element at different angles.

25. The display system of claim 1, comprising at least one lens array disposed between said light source and said electronic image-forming element.

26. The display system of claim 25, wherein the pitch of said lens array is different from the pitch of the pixels in said electronic image-forming element.

27. The display system of claim 1 wherein said light tunnel has an output aperture having an aspect ratio matching an aspect ratio of said electronic image-forming element and said electronic image-forming element is illuminated by said output aperture.

28. The display system of claim 27 wherein at least one lens is placed between said light tunnel and said electronic image-forming element.

29. A display system comprising: a light source; an element having pixels, said element being capable of having an image formed thereon; and means for focusing different segments of a light beam emanating from said light source onto said element at proper angles such that light is focused onto the pixels of said element, comprising at least one input lens array located between said light source and said element.

30. The display system of claim 29, further comprising means for bringing light from different sections of the light beam emanating from said light source to foci.

31. The display system of claim 30, further comprising means located near the foci for focusing different segments of the light beam onto said element.

32. The display system of claim 29, wherein the element has a size, wherein a focused image has the same size as said element.

33. The display system of claim 29, further comprising a field lens located near said element.

34. The display system of claim 29, further comprising a light tunnel for passing the light beam therethrough, said light tunnel located between said light source and said focusing means.

35. The display system of claim 34, wherein said focusing means is placed in the beam emanating from the light tunnel after the beam has expanded.

36. The display system of claim 35, further comprising means for bringing different segments of the light beam emanating from said light tunnel to foci.

37. The display system of claim 36, further comprising means for focusing images of said bringing means onto said element.

38. A display system, comprising: a light source; an element, capable of having an image formed thereon; at least one input lens array arranged between said light source and said element; and a light tunnel located between said light source and said at least one input lens array.

39. The display system of claim 38, further comprising means for focusing an output of said light tunnel on said element.

40. The display system of claim 39, wherein said focusing means comprise a lens spaced from said element a distance providing a divergence angle which corresponds to an acceptance angle of a lens array-pixel relationship of said element and said lens array.

41. The display system of claim 39, further comprising a lens close to said element.

42. A display system comprising: a light source; an element capable of having an image formed thereon; and means for enhancing brightness of an image produced by said element, wherein said enhancing means collects more than 60 percent of the light emitted by said light source and sends it towards said element.

43. The display system of claim 42, further comprising means for shaping the beam illuminating said element such that it substantially matches the shape of said element.

44. The display system of claim 43, wherein said enhancing means includes a Fresnel polarizer means.

45. The display system of claim 44, wherein said enhancing means comprises means for splitting the illuminating light into differently colored beams directed to pixels on said image-forming element displaying information of corresponding colors.

46. The display system of claim 45, wherein said enhancing means includes means for increasing light collimation sufficiently to approximate an acceptance angle of input lens array elements located between said light source and said element.

47. A display system comprising: a light source; an electronic image-forming element capable of having an image formed thereon, said electronic image-forming element having a predetermined shape; and means for enhancing brightness of an image by shaping a beam illuminating said electronic image-forming element such that the shape of the beam substantially matches the shape of said electronic image-forming element.

48. The display system of claim 47, wherein said enhancing means also includes a Fresnel polarizer means.

49. A display system comprising: a light source; an element capable of having an image formed thereon, said element having a predetermined shape; means for shaping a light beam emanating from said light source such that it has a shape which substantially matches the shape of said element; lens array elements placed between said element and said light source; and means for providing sufficient collimation of the light beam such that a divergence of the collimated beam approximates an acceptance angle of said lens array elements.

50. An arrangement for enhancing the brightness of an image in a video display system, said arrangement comprising: a light source; an element capable of having an image formed thereon; and a non-imaging concentrator, wherein light sent into the concentrator is funneled down to an opening which is smaller than the size of the input opening.

51. An optical system, comprising: a light source with a certain arc or filament size; and a non-imaging concentrator which funnels light sent into it from the light source to an opening which is smaller than an arc or filament in the light source.

52. The optical system of claim 51, wherein the optical system is an imaging system.

53. A display system comprising: a light source; an element capable of having an image formed thereon; means for enhancing brightness of an image produced by said element, wherein said enhancing means includes means to collect more than 60 percent of the light emitted by said light source and send it towards said element; wherein said enhancing means also includes a Fresnel polarizer means and means for splitting the illuminating light into differently colored beams directed to pixels on said element displaying information of corresponding colors; means for shaping the beam illuminating said image-forming element such that it substantially matches the shape of said image-forming element; and input lens arrays located between said light source and said element.

54. A display system comprising: a light source; an element capable of having an image formed thereon, said element having a predetermined shape; and means for enhancing brightness of an image by shaping a beam illuminating said image-forming element such that the shape of the beam substantially matches the shape of said image-forming element; wherein said enhancing means also includes a Fresnel polarizer means; input lens array elements located between said element and said light source; means for collimating light illuminating said element such that illuminating light divergence substantially matches an acceptance angle of said input lens array elements; and means for splitting the illuminating light into differently colored beams directed to pixels on said element displaying information of different colors.

55. A display system comprising: a light source; an element capable of having an image formed thereon, said element having a predetermined shape; and means for enhancing brightness of an image by shaping a beam illuminating said image-forming element such that the shape of the beam substantially matches the shape of said image-forming element, wherein said enhancing means also includes a Fresnel polarizer means; and input lens array elements located between said element and said light source.

56. A display system comprising: a light source; an element capable of having an image formed thereon, said element having a predetermined shape; means for shaping a light beam emanating from said light source such that it has a shape which substantially matches the shape of said element; lens array elements placed between said element and said light source; and means for providing sufficient collimation of the light beam such that a divergence of the collimated beam approximates an acceptance angle of said lens array elements; and means for splitting the illuminating light into differently colored beams directed to pixels on said element displaying information of different colors.

57. A display system comprising: a light source; an element capable of having an image formed thereon, said element having a predetermined shape; means for shaping a light beam emanating from said light source such that it has a shape which substantially matches the shape of said element; and lens array elements placed between said element and said light source.

58. A display system comprising: a light source; an element capable of having an image formed thereon, said element having a predetermined shape; lens array elements placed between said element and said light source; and means for providing sufficient collimation for the light beam such that a divergence of the collimated beam approximates an acceptance angle of said lens array elements.

59. The display system of claim 58, further comprising: means for splitting the illuminating light into differently colored beams directed to pixels on said element capable of having an image formed thereon displaying information of corresponding colors.

60. An irradiation device comprising a source of radiant energy, a light tunnel having internal walls capable of reflecting therebetween radiant energy from said source, disposed so as to direct such reflected energy through an exit, and a focusing element which focuses the energy exiting from the light tunnel onto an energy-receiving area, and further comprising a collimator near said energy-receiving area to collimate said radiant energy.

61. A display system, comprising: a light source; an element capable of having an image formed thereon; and a light tunnel located between said light source and said element for sending light from said light source to said element and having inner light-reflecting surfaces, wherein said light tunnel has an output aperture having an aspect ratio matching an aspect ratio of said element, and said output aperture is focused onto said element, wherein the image of said output aperture has a size which is the same as a size of said element.

62. A display system, comprising: a light source; an element capable of having an image formed thereon; and a light tunnel located between said light source and said element for sending light from said light source to said element and having inner light-reflecting surfaces, wherein said light tunnel has an output aperture having an aspect ratio matching an aspect ratio of said element, and said output aperture is focused onto said element, wherein said light tunnel is "folded" and defines at least two light tunnel light paths.

63. The display system of claim 62, wherein said light tunnel light paths are not co-linear.

64. A display system, comprising: a light source; an element capable of having an image formed thereon; and a light tunnel located between said light source and said element for sending light from said light source to said element and having inner light-reflecting surfaces, wherein said light tunnel has an output aperture having an aspect ratio matching an aspect ratio of said element, and said output aperture is focused onto said element, comprising at least one lens array disposed between said light source and said element, wherein the pitch of said lens array is different from the pitch of the pixels in said element.

65. The display system of claim 64, wherein the pitch of said lens array is less than the pitch of the pixels in said element.

66. A display system, comprising: a light source; an element capable of having an image formed thereon; and a light tunnel located between said light source and said element for sending light from said light source to said element and having inner light-reflecting surfaces, wherein said light tunnel has an output aperture having an aspect ratio matching an aspect ratio of said element, and said output aperture is focused onto said element, wherein said light tunnel has an input aperture, said display system further comprising a spherical reflector for forming an image of said light source at said input aperture.

67. The display system of claim 66, wherein said light source has a spherical mirror located behind it for sending rearward going light forward to be reflected by said spherical reflector into said input aperture.

68. A display system, comprising: a light source; an element capable of having an image formed thereon; and a light tunnel located between said light source and said element for sending light from said light source to said element and having inner light-reflecting surfaces, wherein said light tunnel has an output aperture having an aspect ratio matching an aspect ratio of said element, and said output aperture is focused onto said element, comprising at least one lens placed between said light tunnel and said element, wherein said lens increases collimation of light emanating from said light tunnel.

69. A display system comprising: a light source; an element capable of having an image formed thereon, said element having a predetermined shape; and means for enhancing brightness of an image by shaping a beam illuminating said image-forming element such that the shape of the beam substantially matches the shape of said image-forming element, wherein said enhancing means also includes a Fresnel polarizer means.

70. The display system of claim 69, further comprising: input lens array elements located between said element and said light source; and means for collimating light illuminating said element such that illuminating light divergence substantially matches an acceptance angle of said input lens array elements.

71. An irradiation device comprising a source of radiant energy, a light tunnel having internal walls capable of reflecting therebetween radiant energy from said source, disposed so as to direct such reflected energy through an exit, and an optical element having at least one lens which directs the energy exiting from the light tunnel exit onto an energy receiving area to produce illumination of the energy receiving area that has enhanced color and brightness uniformity.

72. The irradiation device of claim 71 wherein the optical element is a collimator located between said light tunnel exit and said energy receiving area to collimate said radiant energy.

73. The irradiation device of claim 71 wherein the optical element is a focusing element which focuses the energy exiting from the light tunnel exit onto the energy receiving area.

* * * * *

Disclaimer

7,688,347 B2 — Eugene Dolgoff, Westbury, NY (US). HIGH-EFFICIENCY DISPLAY SYSTEM UTILIZING AN OPTICAL ELEMENT TO RESHAPE LIGHT WITH COLOR AND BRIGHTNESS UNIFORMITY. Patent dated March 30, 2010. Disclaimer filed September 23, 2015, by inventor.

Hereby disclaim complete claims 1, 18, 19, 27, 28, 60, 71, 72, and 73 of said patent.

*(Official Gazette, December 29, 2015)*